(12) United States Patent
Mori

(10) Patent No.: US 11,543,569 B2
(45) Date of Patent: Jan. 3, 2023

(54) OPTICAL FILTER AND OPTICAL SENSOR

(71) Applicant: FUJIFILM Corporation, Tokyo (JP)

(72) Inventor: Masahiro Mori, Haibara-gun (JP)

(73) Assignee: FUJIFILM Corporation, Tokyo (JP)

( * ) Notice: Subject to any disclaimer, the term of this patent is extended or adjusted under 35 U.S.C. 154(b) by 334 days.

(21) Appl. No.: 16/791,642

(22) Filed: Feb. 14, 2020

(65) Prior Publication Data

US 2020/0183064 A1     Jun. 11, 2020

Related U.S. Application Data

(63) Continuation of application No. PCT/JP2018/030459, filed on Aug. 17, 2018.

(30) Foreign Application Priority Data

Aug. 25, 2017     (JP) .............................. JP2017-162319

(51) Int. Cl.
*G02B 5/20* (2006.01)
*G02B 5/28* (2006.01)

(52) U.S. Cl.
CPC ............. *G02B 5/208* (2013.01); *G02B 5/281* (2013.01)

(58) Field of Classification Search
None
See application file for complete search history.

(56) References Cited

U.S. PATENT DOCUMENTS

| 2009/0244711 A1 | 10/2009 | Yokoyama et al. |
| 2012/0145901 A1 | 6/2012 | Kakiuchi et al. |

(Continued)

FOREIGN PATENT DOCUMENTS

| CN | 103460683 A | 12/2013 |
| JP | 61-277903 A | 12/1986 |

(Continued)

OTHER PUBLICATIONS

International Preliminary Report on Patentability, dated Mar. 5, 2020, and English translation of the Written Opinion of the International Searching Authority, dated Nov. 6, 2018, (Forms PCT/IB/326, PCT/IB/338, PCT/IB/373, and PCT/ISA/237) for International Application No. PCT/JP2018/030459.

(Continued)

*Primary Examiner* — Derek S. Chapel
(74) *Attorney, Agent, or Firm* — Birch, Stewart, Kolasch & Birch, LLP

(57) ABSTRACT

Provided are an optical filter having excellent light fastness and moisture resistance and having excellent detection accuracy, a structure, and an optical sensor. An optical filter 10a includes a near infrared transmitting filter 1 and a dielectric multi-layer film 2. In this optical filter, the dielectric multi-layer film 2 and the near infrared transmitting filter 1 are in contact with each other, or an organic layer 3 is provided between the dielectric multi-layer film 2 and the near infrared transmitting filter 3. In the optical filter, at least two wavelengths at which a transmittance in a wavelength range of 600 nm or longer and shorter than 1050 nm is 50% are present, and in a case where a wavelength on a shortest wavelength side is represented by $\lambda 1$ and a wavelength on a longest wavelength side is represented by $\lambda 2$ among the wavelengths at which the transmittance is 50%, predetermined conditions are satisfied.

12 Claims, 1 Drawing Sheet

(56) References Cited

U.S. PATENT DOCUMENTS

| | | |
|---|---|---|
| 2013/0114121 A1 | 5/2013 | Hong et al. |
| 2014/0138519 A1 | 5/2014 | Wang et al. |
| 2017/0010528 A1 | 1/2017 | Takishita et al. |
| 2017/0090083 A1 | 3/2017 | Takishita et al. |
| 2017/0276846 A1 | 9/2017 | Ishido et al. |
| 2018/0149781 A1* | 5/2018 | Ockenfuss ............ G02B 5/285 |
| 2018/0196179 A1 | 7/2018 | Takishita et al. |
| 2019/0227207 A1 | 7/2019 | Nagaya et al. |

FOREIGN PATENT DOCUMENTS

| | | |
|---|---|---|
| JP | 5-122774 A | 5/1993 |
| JP | 2007-264116 A | 10/2007 |
| JP | 2012-137728 A | 7/2012 |
| JP | 2014-103657 A | 6/2014 |
| JP | 2016-146619 A | 8/2016 |
| TW | I388885 B | 3/2013 |
| TW | 201527795 A | 7/2015 |
| WO | WO 2015/166779 A1 | 11/2015 |
| WO | WO 2015/198784 A1 | 12/2015 |
| WO | WO 2016/098810 A1 | 6/2016 |
| WO | WO 2017/056909 A1 | 4/2017 |
| WO | WO 2017/213047 A1 | 12/2017 |

OTHER PUBLICATIONS

International Search Report (Form PCT/ISA/210) for International Application No. PCT/JP2018/030459, dated Nov. 6, 2018, with English translation.

Japanese Office Action and corresponding Japanese Application No. 2019-537593, dated Jan. 19, 2021, with English translation.

Taiwanese Office Action for corresponding Taiwanese Application No. 107129039, dated Jul. 26, 2022, including an English translation.

* cited by examiner

OPTICAL FILTER AND OPTICAL SENSOR

CROSS-REFERENCE TO RELATED APPLICATIONS

This application is a Continuation of PCT International Application No. PCT/JP2018/030459 filed on Aug. 17, 2018, which claims priority under 35 U.S.C. § 119(a) to Japanese Patent Application No. 2017-162319 filed on Aug. 25, 2017. Each of the above application(s) is hereby expressly incorporated by reference, in its entirety, into the present application.

BACKGROUND OF THE INVENTION

1. Field of the Invention

The present invention relates to an optical filter including a near infrared transmitting filter. In addition, the present invention relates to an optical sensor including the above-described optical filter.

2. Description of the Related Art

Near infrared light is less likely to be scattered than visible light due to its longer wavelength and can be used in, for example, distance measurement or three-dimensional measurement. In addition, near infrared light is invisible to persons or animals. Therefore, even in a case where a subject is irradiated with light emitted from a near infrared light source at night, the subject cannot recognize the near infrared light. Thus, near infrared light can be used for imaging a nocturnal wild animal or imaging a subject without provoking the subject for a security reason. This way, an optical sensor that detects near infrared light can be used in various applications. In this optical sensor that detects near infrared light, a near infrared transmitting filter is used as described in JP2016-146619A, WO2015/166779A, and JP2014-103657A.

SUMMARY OF THE INVENTION

Near infrared light is likely to include noise generated from visible light or the like. In addition, in general, as the wavelength of light used for detection increases, the sensitivity of an optical sensor is likely to decrease. Accordingly, a component other than light having a desired wavelength becomes a noise such that the detection accuracy of the optical sensor may decrease.

In addition, various performance of an optical sensor such as accuracy is maintained over a long period of time. Therefore, it is desirable to improve light fastness or moisture resistance of a near infrared transmitting filter used for an optical sensor.

Accordingly, an object of the present invention is to provide an optical filter and an optical sensor having excellent light fastness and moisture resistance and having excellent detection accuracy.

As a result of thorough investigation under the above-described circumstances, the present inventors found that the object of the present invention can be achieved with a configuration described below, thereby completing the present invention. Accordingly, the present invention provides the following.

<1> An optical filter comprising:
a near infrared transmitting filter; and
a dielectric multi-layer film that is provided on the near infrared transmitting filter,
in which the dielectric multi-layer film and the near infrared transmitting filter are in contact with each other, or an organic layer having one surface in contact with the dielectric multi-layer film and having another surface in contact with the near infrared transmitting filter is provided between the dielectric multi-layer film and the near infrared transmitting filter,
at least two wavelengths at which a transmittance in a wavelength range of 600 nm or longer and shorter than 1050 nm is 50% are present, and
in a case where a wavelength on a shortest wavelength side is represented by $\lambda 1$ and a wavelength on a longest wavelength side is represented by $\lambda 2$ among the wavelengths at which the transmittance is 50%, characteristics of the following conditions 1 to 3 are satisfied,
Condition 1: a light transmittance at a wavelength of $(\lambda 1-100)$ nm is 5% or lower,
Condition 2: a maximum value of a light transmittance at a wavelength of $\lambda 1$ to $\lambda 2$ is 70% or higher, and
Condition 3: a maximum value of a light transmittance at a wavelength of $(\lambda 2+50)$ nm to 1100 nm is 30% or lower.
<2> The optical filter according to <1>,
in which a difference between $\lambda 2$ and $\lambda 1$ is 120 nm or lower.
<3> The optical filter according to <1> or <2>,
in which a maximum value of a light transmittance in a wavelength range of 400 to 830 nm is 5% or lower,
a light transmittance at a wavelength of 940 nm is 70% or higher, and a maximum value of a light transmittance in a wavelength range of 1050 to 1100 nm is 30% or lower.
<4> The optical filter according to any one of <1> to <3>,
in which a ratio Amin/Bmax of a minimum value Amin of an absorbance of the near infrared transmitting filter in a wavelength range of 400 to 830 nm to a maximum value Bmax of an absorbance of the near infrared transmitting filter in a wavelength range of 1000 to 1100 nm is 4.5 or higher.
<5> The optical filter according to <1> or <2>,
in which a maximum value of a light transmittance in a wavelength range of 400 to 750 nm is 5% or lower,
a light transmittance at a wavelength of 850 nm is 70% or higher, and a maximum value of a light transmittance in a wavelength range of 940 to 1100 nm is 30% or lower.
<6> The optical filter according to <1>, <2>, or <5>,
in which a ratio Amin/Bmax of a minimum value Amin of an absorbance of the near infrared transmitting filter in a wavelength range of 400 to 750 nm to a maximum value Bmax of an absorbance of the near infrared transmitting filter in a wavelength range of 900 to 1100 nm is 4.5 or higher.
<7> The optical filter according to any one of <1> to <6>,
in which the dielectric multi-layer film is a film that blocks at least a part of light having a wavelength shorter than $\lambda 1$ and at least a part of light having a wavelength longer than $\lambda 2$ in a wavelength range of 400 to 1100 nm.
<8> The optical filter according to any one of <1> to <7>,
in which a maximum value of a light transmittance of the dielectric multi-layer film in a wavelength range of 1050 to 1100 nm is 30% or lower.
<9> The optical filter according to any one of <1> to <8>,
in which the near infrared transmitting filter includes a color material.

<10> The optical filter according to <9>,
in which the color material includes two or more chromatic colorants and forms black using a combination of the two or more chromatic colorants.

<11> The optical filter according to <9> or <10>,
in which the color material includes an organic black colorant.

<12> The optical filter according to any one of <9> to <11>,
in which the near infrared transmitting filter further includes a near infrared absorber.

<13> The optical filter according to <12>,
in which the near infrared absorber includes at least one selected from a pyrrolopyrrole compound, a squarylium compound, or a cyanine compound.

<14> An optical sensor comprising: the optical filter according to any one of <1> to <13>.

According to the present invention, it is possible to provide an optical filter and an optical sensor having excellent light fastness and moisture resistance and having excellent detection accuracy.

DESCRIPTION OF THE PREFERRED EMBODIMENTS

Figure 1:
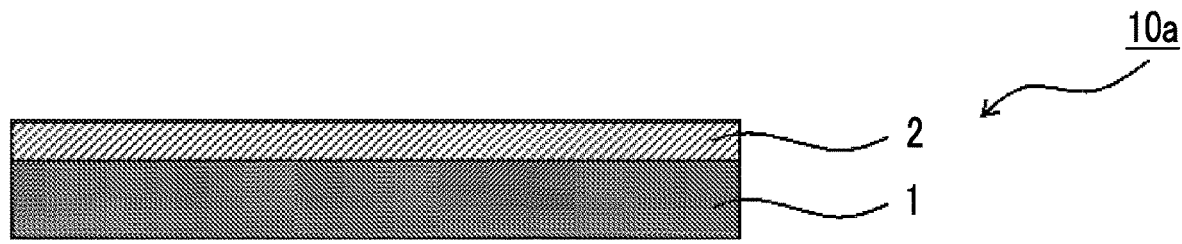
FIG. 1 is a diagram illustrating one embodiment of an optical filter according to the present invention.

Hereinafter, the details of the present invention will be described.

In this specification, numerical ranges represented by "to" include numerical values before and after "to" as lower limit values and upper limit values.

In this specification, unless specified as a substituted group or as an unsubstituted group, a group (atomic group) denotes not only a group (atomic group) having no substituent but also a group (atomic group) having a substituent. For example, "alkyl group" denotes not only an alkyl group having no substituent (unsubstituted alkyl group) but also an alkyl group having a substituent (substituted alkyl group).

In this specification, unless specified otherwise, "exposure" denotes not only exposure using light but also drawing using a corpuscular beam such as an electron beam or an ion beam. Examples of the light used for exposure include an actinic ray or radiation, for example, a bright light spectrum of a mercury lamp, a far ultraviolet ray represented by excimer laser, an extreme ultraviolet ray (EUV ray), an X-ray, or an electron beam.

In this specification, "(meth)acrylate" denotes either or both of acrylate or methacrylate, "(meth)acryl" denotes either or both of acryl and methacryl, and "(meth)acryloyl" denotes either or both of acryloyl and methacryloyl.

In this specification, a weight-average molecular weight and a number-average molecular weight are defined as values in terms of polystyrene obtained by gel permeation chromatography (GPC).

In this specification, the weight-average molecular weight (Mw) and the number-average molecular weight (Mn) can be obtained, for example, by using HLC-8220GPC (manufactured by Tosoh Corporation), using a column in which TOSOH TSK gel Super HZM-H, TOSOH TSK gel Super HZ4000, and TOSOH TSK gel Super HZ2000 are linked to each other, and using tetrahydrofuran as a developing solvent.

In this specification, in a chemical formula, Me represents a methyl group, Et represents an ethyl group, Bu represents a butyl group, and Ph represents a phenyl group.

In this specification, "near infrared light" denotes light (electromagnetic wave) in a wavelength range of 700 to 2500 nm.

In this specification, a total solid content denotes the total mass of all the components of the composition excluding a solvent.

In this specification, the term "step" denotes not only an individual step but also a step which is not clearly distinguishable from another step as long as an effect expected from the step can be achieved.

<Optical Filter>

According to an embodiment of the present invention, there is provided an optical filter including:
a near infrared transmitting filter; and
a dielectric multi-layer film that is provided on the near infrared transmitting filter,
in which the dielectric multi-layer film and the near infrared transmitting filter are in contact with each other, or an organic layer having one surface in contact with the dielectric multi-layer film and having another surface in contact with the near infrared transmitting filter is provided between the dielectric multi-layer film and the near infrared transmitting filter,
at least two wavelengths at which a transmittance in a wavelength range of 600 nm or longer and shorter than 1050 nm is 50% are present, and
in a case where a wavelength on a shortest wavelength side is represented by $\lambda 1$ and a wavelength on a longest wavelength side is represented by $\lambda 2$ among the wavelengths at which the transmittance is 50%, characteristics of the following conditions 1 to 3 are satisfied, Condition 1: a light transmittance at a wavelength of $(\lambda 1-100)$ nm is 5% or lower,
Condition 2: a maximum value of a light transmittance at a wavelength of $\lambda 1$ to $\lambda 2$ is 70% or higher, and
Condition 3: a maximum value of a light transmittance at a wavelength of $(\lambda 2+50)$ nm to 1100 nm is 30% or lower.

The optical filter according to the embodiment of the present invention has the characteristics of the above-described conditions 1 to 3. As a result, light having a wavelength shorter than $\lambda 1$ or light having a wavelength longer than $\lambda 2$ is shielded such that transmission of light having a wavelength in a range of about $\lambda 1$ to about $\lambda 2$ can be selectively allowed. Therefore, the optical filter according to the embodiment of the present invention blocks light having a wavelength shorter or longer than that of light having a desired wavelength used for sensing or image recognition and can selectively allow transmission of the light having a desired wavelength in which the amount of noise is small. As a result, by incorporating the optical filter according to the embodiment of the present invention into an optical sensor, the detection accuracy of the optical sensor such as sensing accuracy or image recognition accuracy can be improved.

In addition, in a case where a near infrared transmitting filter is continuously irradiated with light in a state where the near infrared transmitting filter is in contact with oxygen, the near infrared transmitting filter is attached by an oxygen radical generated by light irradiation such that spectral characteristics or the like may vary. However, in the optical filter according to the embodiment of the present invention, the dielectric multi-layer film and the near infrared transmitting filter are in contact with each other, or an organic layer having one surface in contact with the dielectric multi-layer film and having another surface in contact with the near infrared transmitting filter is provided between the dielectric multi-layer film and the near infrared transmitting filter. Therefore, contact between the near infrared transmitting filter and oxygen can be effectively suppressed by the dielectric multi-layer film provided as described above, and thus excellent light fastness can be obtained. In addition, in the optical filter according to the embodiment of the present invention, permeation of moisture into the near infrared transmitting filter can also be suppressed by the dielectric multi-layer film, and thus excellent moisture resistance can be obtained.

Figure 2:
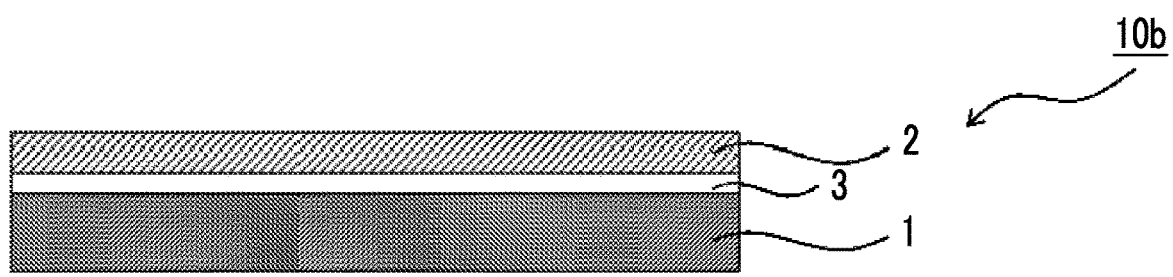
FIG. 2 is a diagram illustrating another embodiment of the optical filter according to the present invention.

FIGS. 1 and 2 are diagrams illustrating schematic configurations of the optical filter according to the embodiment of the present invention. In an optical filter 10a illustrated in FIG. 1, a dielectric multi-layer film 2 is directly formed on a surface of a near infrared transmitting filter 1. That is, the optical filter 10a illustrated in FIG. 1 is an optical filter in an aspect where the dielectric multi-layer film 2 and the near infrared transmitting filter 1 are in contact with each other. In an optical filter 10b illustrated in FIG. 2, an organic layer 3 is formed on a surface of the near infrared transmitting filter 1, and the dielectric multi-layer film 2 is directly formed on a surface of the organic layer 3. That is, the optical filter 10b illustrated in FIG. 2 is an optical filter in an aspect where the organic layer 3 having one surface in contact with the dielectric multi-layer film 2 and having another surface in contact with the near infrared transmitting filter 1 is further provided between the dielectric multi-layer film 2 and the near infrared transmitting filter 1. In the optical filter illustrated in FIG. 1, the dielectric multi-layer film 2 is directly formed on the surface of the near infrared transmitting filter 1. Therefore, contact between the near infrared transmitting filter 1 and oxygen or permeation of moisture into the near infrared transmitting filter 1 can be effectively suppressed, and excellent light fastness or moisture resistance can be obtained. In addition, in the optical filter illustrated in FIG. 2, the organic layer 3 is provided between the near infrared transmitting filter 1 and the dielectric multi-layer film 2. Therefore, film forming properties or adhesiveness of the dielectric multi-layer film 2 can be improved.

In FIGS. 1 and 2, the dielectric multi-layer film 2 is provided on only one surface of the near infrared transmitting filter 1. However, the dielectric multi-layer film 2 is provided on both surfaces of the near infrared transmitting filter 1. From the viewpoint of costs, it is preferable that the dielectric multi-layer film 2 is provided on only one surface of the near infrared transmitting filter 1.

In addition, in the optical filter according to the embodiment of the present invention, in a case where the dielectric multi-layer film 2 is provided on only one surface of the near infrared transmitting filter 1, it is preferable that the dielectric multi-layer film 2 is provided on a side where light is incident into the near infrared transmitting filter 1 from the viewpoints of light fastness and moisture resistance. That is, in the optical filter according to the embodiment of the present invention, it is preferable that the dielectric multi-layer film 2 is provided on the near infrared transmitting filter 1 on the side where light is incident into the near infrared transmitting filter 1. In addition, in the optical filter according to the embodiment of the present invention, in a case where the dielectric multi-layer film 2 is provided on only one surface of the near infrared transmitting filter 1, it is preferable that the dielectric multi-layer film 2 is laminated on a support such that a surface of the near infrared transmitting filter 1 opposite to a side where the dielectric multi-layer film 2 is provided is a support side.

In the optical filter according to the embodiment of the present invention, at least two (preferably two) wavelengths at which a transmittance in a wavelength range of 600 nm or longer and shorter than 1050 nm is 50% are present. Hereinafter, in the optical filter, among the wavelengths at which the transmittance is 50%, a wavelength on a shortest wavelength side is represented by λ1, and a wavelength on a longest wavelength side is represented by λ2. The wavelengths λ1 and λ2 at which the transmittance is 50% can be appropriately selected depending on the applications. Examples of a preferable aspect include the following (λ1) to (λ3).

(λ1) An aspect where λ1 is present in a wavelength range of 650 to 740 nm (preferably a wavelength range of 670 to 740 nm and more preferably a wavelength range of 680 to 740 nm) and λ2 is present in a wavelength range of 760 to 840 nm (preferably a wavelength range of 760 to 820 nm and more preferably a wavelength range of 760 to 810 nm).

(λ2) An aspect where λ1 is present in a wavelength range of 750 to 840 nm (preferably a wavelength range of 770 to 840 nm and more preferably a wavelength range of 780 to 840 nm) and λ2 is present in a wavelength range of 860 to 940 nm (preferably a wavelength range of 860 to 920 nm and more preferably a wavelength range of 860 to 910 nm).

(λ3) An aspect where 1 is present in a wavelength range of 840 to 930 nm (preferably a wavelength range of 860 to 930 nm and more preferably a wavelength range of 870 to 930 nm), and λ2 is present in a wavelength range of 950 to 1030 nm (preferably a wavelength range of 950 to 1020 nm and more preferably a wavelength range of 950 to 1010 nm).

In the optical filter according to the embodiment of the present invention, a difference (λ2−λ1) between λ2 and λ1 is preferably 120 nm or lower, more preferably 100 nm or lower, still more preferably 90 nm or less, and still more preferably 85 nm or lower. In this aspect, transmission of desired light having a small amount of noise can be allowed, and the detection accuracy of the optical sensor can be further improved. The lower limit is, for example, 1 nm or more.

In the optical filter according to the embodiment of the present invention, the light transmittance at a wavelength of (λ1−100) nm is 5% or lower, preferably 3% or lower, and more preferably 1% or lower. In this aspect, transmission of light in which the amount of noise on a short wavelength side is reduced can be allowed.

In the optical filter according to the embodiment of the present invention, the maximum value of the light transmittance at a wavelength of λ1 to λ2 is 70% or higher, preferably 80% or higher, more preferably 90% or higher, and still more preferably 93% or higher. In this aspect, transmittance of light having a desired wavelength is excellent, and the sensitivity of the optical sensor can be improved.

In the optical filter according to the embodiment of the present invention, the maximum value of the light transmittance at a wavelength of (λ2+50) nm to 1100 nm is 30% or lower, preferably 20% or lower, and more preferably 15% or lower. In this aspect, transmission of light in which the amount of noise on a long wavelength side is reduced can be allowed.

In the optical filter according to the embodiment of the present invention, a maximum value of a light transmittance at a wavelength of 400 nm to (λ1−100) nm is preferably 5% or lower, more preferably 3% or lower, still more preferably 1% or lower, and still more preferably 0.5% or lower. In addition, a light transmittance at a wavelength of (λ1−50) nm is preferably 5% or lower, more preferably 3% or lower, and still more preferably 1% or lower. In addition, a light transmittance at a wavelength of (λ1−25) nm is preferably 15% or lower, more preferably 10% or lower, and still more preferably 5% or lower. In addition, a light transmittance at a wavelength of (λ1−10) nm is preferably 40% or lower, more preferably 30% or lower, and still more preferably 25% or lower. In this aspect, transmission of light in which the amount of noise on a short wavelength side is further reduced can be allowed.

In the optical filter according to the embodiment of the present invention, a maximum value of a light transmittance at a wavelength of (λ2+10) nm or longer and shorter than (λ2+20) nm is preferably 40% or lower, more preferably 35% or lower, and still more preferably 0.30% or lower. In addition, a maximum value of a light transmittance at a wavelength of (λ2+20) nm or longer and shorter than (λ2+30) nm is preferably 35% or lower, more preferably 30% or lower, and still more preferably 25% or lower. In addition, a maximum value of a light transmittance at a wavelength of (λ2+30) nm or longer and shorter than (λ2+40) nm is preferably 30% or lower, more preferably 25% or lower, and still more preferably 20% or lower. In addition, a maximum value of a light transmittance at a wavelength of (λ2+40) nm or longer and shorter than (λ2+50) nm is preferably 30% or lower, more preferably 20% or lower, and still more preferably 15% or lower. In this aspect, transmission of light in which the amount of noise on a long wavelength side is further reduced can be allowed.

Examples of preferable spectral characteristics of the optical filter according to the embodiment of the present invention include the following (Y1) to (Y3).

(Y1) A maximum value of a light transmittance in a wavelength range of 400 to 640 nm is 5% or lower (preferably 3% or lower, more preferably 1% or lower, and still more preferably 0.5% or lower), a light transmittance at a wavelength of 750 nm is 70% or higher (preferably 80% or higher, more preferably 90% or higher, and still more preferably 93% or higher), and a maximum value of a light transmittance in a wavelength range of 800 to 1100 nm is 30% or lower (preferably 20% or lower, more preferably 15% or lower, and still more preferably 10% or lower). The optical filter can selectively allow transmission of light having a wavelength of about 750 nm. In this optical filter, it is preferable that λ1 is present in a wavelength range of 650 to 740 nm (preferably a wavelength range of 670 to 740 nm and more preferably a wavelength range of 680 to 740 nm), and λ2 is present in a wavelength range of 760 to 840 nm (preferably a wavelength range of 760 to 820 nm and more preferably a wavelength range of 760 to 810 nm).

(Y2) A maximum value of a light transmittance in a wavelength range of 400 to 750 nm is 5% or lower (preferably 3% or lower, more preferably 1% or lower, and still more preferably 0.5% or lower), a light transmittance at a wavelength of 850 nm is 70% or higher (preferably 80% or higher, more preferably 90% or higher, and still more preferably 93% or higher), and a maximum value of a light transmittance in a wavelength range of 940 to 1100 nm is 30% or lower (preferably 20% or lower, more preferably 15% or lower, and still more preferably 10% or lower). The optical filter can selectively allow transmission of light having a wavelength of about 850 nm. In this optical filter, it is preferable that 1 is present in a wavelength range of 750 to 840 nm (preferably a wavelength range of 770 to 840 nm and more preferably a wavelength range of 780 to 840 nm) and λ2 is present in a wavelength range of 860 to 940 nm (preferably a wavelength range of 860 to 920 nm and more preferably a wavelength range of 860 to 910 nm).

(Y3) A maximum value of a light transmittance in a wavelength range of 400 to 830 nm is 5% or lower (preferably 3% or lower, more preferably 1% or lower, and still more preferably 0.5% or lower), a light transmittance at a wavelength of 940 nm is 70% or higher (preferably 80% or higher, more preferably 90% or higher, and still more preferably 93% or higher), and a maximum value of a light transmittance in a wavelength range of 1050 to 1100 nm is 30% or lower (preferably 20% or lower, more preferably 15% or lower, and still more preferably 10% or lower). The optical filter can selectively allow transmission of light having a wavelength of about 940 nm. In this optical filter, it is preferable that λ1 is present in a wavelength range of 840 to 930 nm (preferably a wavelength range of 860 to 930 nm and more preferably a wavelength range of 870 to 930 nm), and λ2 is present in a wavelength range of 950 to 1030 nm (preferably a wavelength range of 950 to 1020 nm and more preferably a wavelength range of 950 to 1010 nm).

The optical filter according to the embodiment of the present invention includes the near infrared transmitting filter 1. The near infrared transmitting filter is not particularly limited as long as it is a filter having spectral characteristics in which at least a part of visible light is shielded and transmission of at least a part of near infrared light is allowed. In addition, the near infrared transmitting filter 1 may be configured as one-layer film (single-layer film) or as a laminate (multi-layer film) including two or more-layer films. In addition, in a case where the near infrared transmitting filter 1 is configured as a multi-layer film, the multi-layer film as a whole may have the above-described spectral characteristics or each of the single-layer films may not have the above-described spectral characteristics. Preferable examples of the near infrared transmitting filter include filters having any one of the following spectral characteristics (IR1) to (IR3).

(IR1): A ratio Amin1/Bmax1 of a minimum value Amin1 of an absorbance of the near infrared transmitting filter-forming composition in a wavelength range of 400 to 640 nm to a maximum value Bmax1 of an absorbance of the near infrared transmitting filter-forming composition in a wavelength range of 800 to 1100 nm is 4.5 or higher, preferably 7.5 or higher, more preferably 15 or higher, and still more preferably 30 or higher. According to this aspect, a near infrared transmitting filter that blocks light in a wavelength range of 400 to 640 nm and allows transmission of light having a wavelength of longer than 670 nm can be formed. In addition, in the near infrared transmitting filter, a maximum value of a light transmittance in a wavelength range of 400 to 640 nm is preferably 20% or lower, (preferably 15% or lower and more preferably 10% or lower), a light transmittance at a wavelength of 750 nm is 70% or higher (preferably 80% or higher), and a minimum value in a wavelength range of 800 to 1100 nm is 70% or higher (preferably 75% or higher and more preferably 80% or higher).

(IR2): A ratio Amin2/Bmax2 of a minimum value Amin2 of an absorbance of the near infrared transmitting filter-forming composition in a wavelength range of 400 to 750 nm to a maximum value Bmax2 of an absorbance of the near infrared transmitting filter-forming composition in a wavelength range of 900 to 1100 nm is 4.5 or higher, preferably 7.5 or higher, more preferably 15 or higher, and still more preferably 30 or higher. According to this aspect, a near infrared transmitting filter that blocks light in a wavelength range of 400 to 750 nm and allows transmission of light having a wavelength of longer than 800 nm can be formed. In addition, in the near infrared transmitting filter, a maximum value of a light transmittance in a wavelength range of 400 to 750 nm is preferably 20% or lower, (preferably 15% or lower and more preferably 10% or lower), a light transmittance at a wavelength of 850 nm is 70% or higher (preferably 80% or higher), and a minimum value in a wavelength range of 900 to 1100 nm is 70% or higher (preferably 75% or higher and more preferably 80% or higher).

(IR3): A ratio Amin3/Bmax3 of a minimum value Amin3 of an absorbance of the near infrared transmitting filter-forming composition in a wavelength range of 400 to 830 nm to a maximum value Bmax3 of an absorbance of the near infrared transmitting filter-forming composition in a wavelength range of 1000 to 1100 nm is 4.5 or higher, preferably 7.5 or higher, more preferably 15 or higher, and still more preferably 30 or higher. According to this aspect, a near infrared transmitting filter that blocks light in a wavelength range of 400 to 830 nm and allows transmission of light having a wavelength of longer than 900 nm can be formed. In addition, in the near infrared transmitting filter, a maximum value of a light transmittance in a wavelength range of 400 to 830 nm is preferably 20% or lower, (preferably 15% or lower and more preferably 10% or lower), a light transmittance at a wavelength of 940 nm is 70% or higher (preferably 80% or higher), and a minimum value in a wavelength range of 1050 to 1100 nm is 70% or higher (preferably 75% or higher and more preferably 80% or higher).

The thickness of the near infrared transmitting filter 1 is not particularly limited. For example, the thickness is preferably 100 µm or less, more preferably 15 µm or less, still more preferably 5 µm or less, and still more preferably 1 µm or less. For example, the lower limit value is preferably 0.1 µm or more, more preferably 0.2 µm or more, and still more preferably 0.3 µm or more.

In the optical filter according to the embodiment of the present invention the near infrared transmitting filter 1 may be a film having a pattern or a film (flat film) not having a pattern. In a case where the optical filter according to the embodiment of the present invention is used in combination with a color filter, it is preferable that the near infrared transmitting filter has a pattern and a pixel of a color filter is formed in a portion of the near infrared transmitting filter not including the pattern (refer to FIG. 3 described below).

It is preferable that the near infrared transmitting filter 1 used in the optical filter according to the embodiment of the present invention includes a color material. In this aspect, a near infrared transmitting filter as a thin film having desired spectral characteristics is likely to be manufactured. In addition, in a near infrared transmitting filter including a color material, the color material tends to deteriorate due to light irradiation or moisture such that spectral characteristics are likely to vary. The optical filter according to the embodiment of the present invention includes the dielectric multi-layer film on the near infrared transmitting filter. As a result, even in a case where the near infrared transmitting filter including the color material is used, light fastness or moisture resistance is excellent, and the effects of the present invention are more significant.

It is preferable that the near infrared transmitting filter 1 used in the optical filter according to the embodiment of the present invention further includes a near infrared absorber.

In the near infrared transmitting filter, the near infrared absorber has a function of limiting light to be transmitted (near infrared light) to a longer wavelength side. Accordingly, by including the near infrared absorber, the near infrared transmitting filter can adjust light (near infrared light) transmitted through the optical filter.

The color material and the near infrared absorber will be described. The near infrared transmitting filter can be formed using a near infrared transmitting filter-forming composition described below.

The optical filter according to the embodiment of the present invention includes the dielectric multi-layer film 2. In the optical filter according to the embodiment of the present invention, the dielectric multi-layer film 2 may be provided on the surface of the near infrared transmitting filter 1 (refer to FIG. 1), or may be provided on the near infrared transmitting filter 1 through the organic layer 3 (refer to FIG. 2).

The dielectric multi-layer film is a film that blocks infrared light using a light interference effect. That is, the dielectric multi-layer film refers to a film having an ability to reflect infrared light. The dielectric multi-layer film can be prepared by alternately laminating a plurality of dielectric thin films (high refractive index material layers) having a high refractive index and a plurality of dielectric thin films (low refractive index material layers) having a low refractive index. The number of the dielectric thin films laminated in the dielectric multi-layer film is preferably 2 to 100, more preferably 4 to 60, and still more preferably 6 to 40.

As a material for forming the high refractive index material layer, a material having a refractive index of 1.7 to 2.5 is preferable. Specific examples of the material include $Sb_2O_3$, $Sb_2S_3$, $Bi_2O_3$, $CeO_2$, $CeF_3$, $HfO_2$, $La_2O_3$, $Nd_2O_3$, $Pr_6O_{11}$, $Sc_2O_3$, $SiO$, $Ta_2O_5$, $TiO_2$, $TlCl$, $Y_2O_3$, $ZnSe$, $ZnS$, and $ZrO_2$. As a material for forming the low refractive index material layer, a material having a refractive index of 1.2 to 1.6 is preferable. Specific examples of the material include $Al_2O_3$, $BiF_3$, $CaF_2$, $LaF_3$, $PbCl_2$, $PbF_2$, $LiF$, $MgF_2$, $MgO$, $NdF_3$, $SiO_2$, $Si_2O_3$, $NaF$, $ThO_2$, $ThF_4$, and $Na_3AlF_6$.

A method of forming the dielectric multi-layer film is not particularly limited, and examples thereof include a vacuum deposition method such as ion plating or ion beam, a physical vapor deposition method (PVD method) such as sputtering, and a chemical vapor deposition method (CVD method).

The thickness of each of the high refractive index material layer and the low refractive index material layer is preferably $0.1\lambda$ to $0.5\lambda$ of a wavelength $\lambda$ (nm) of infrared light to be shielded. By adjusting the thickness to be in the above-described range, the blocking and transmission of light having a specific wavelength can be easily controlled.

It is preferable that the dielectric multi-layer film 2 used in the optical filter according to the embodiment of the present invention blocks at least a part of light having a wavelength longer than $\lambda 2$.

In addition, in the dielectric multi-layer film 2 used in the optical filter according to the embodiment of the present invention, a light transmittance at a wavelength of $(\lambda 2+50)$ nm is preferably 30% or lower, more preferably 20% or lower, and still more preferably 15% or lower.

In addition, in the dielectric multi-layer film 2 used in the optical filter according to the embodiment of the present invention, a maximum value of a light transmittance at a wavelength of $(\lambda 2+50)$ nm to 1100 nm is preferably 30% or lower, more preferably 20% or lower, and still more preferably 15% or lower.

In addition, in the dielectric multi-layer film 2 used in the optical filter according to the embodiment of the present invention, a difference (Tmin−Tmax1) between a minimum value Tmin of a light transmittance at a wavelength of λ1 to λ2 and a maximum value Tmax1 of a light transmittance at a wavelength of (λ2+50) nm to 1100 nm is preferably 40% or higher, more preferably 50% or higher, and still more preferably 60% or higher.

In addition, in the dielectric multi-layer film 2 used in the optical filter according to the embodiment of the present invention, a maximum value of a light transmittance in a wavelength range of 1050 to 1100 nm is preferably 30% or lower, more preferably 20% or lower, and still more preferably 15% or lower.

In the dielectric multi-layer film 2 used in the optical filter according to the embodiment of the present invention, transmission of light having a wavelength shorter than 11 may be allowed. However, since transmission of light in which the amount of noise is further reduced can be easily reduced, it is preferable that at least a part of light having a wavelength shorter than λ1 is shielded. More specifically, it is preferable that the dielectric multi-layer film 2 blocks at least a part of light having a wavelength shorter than 0.1 and at least a part of light having a wavelength longer than λ2 in a wavelength range of 400 to 1100 nm.

In a case where the dielectric multi-layer film 2 blocks at least a part of light having a wavelength shorter than 11, a light transmittance of the dielectric multi-layer film at a wavelength of (λ1−100) nm is preferably 30% or lower, more preferably 20% or lower, and still more preferably 15% or lower. In addition, a light transmittance at a wavelength of (λ1−50) nm is preferably 40% or lower, more preferably 30% or lower, and still more preferably 20% or lower. In addition, a maximum value of a light transmittance at a wavelength of 400 nm to (λ1−100) nm is preferably 30% or lower, more preferably 20% or lower, and still more preferably 15% or lower. In addition, a difference (Tmin−Tmax2) between a minimum value Tmin of a light transmittance at a wavelength of λ1 to λ2 and a maximum value Tmax2 of a light transmittance at a wavelength of 400 nm to (λ1−100) nm is preferably 40% or higher, more preferably 50% or higher, and still more preferably 60% or higher. In addition, a difference (Tmin−Tmax1) between a minimum value Tmin of a light transmittance at a wavelength of λ1 to λ2 and a maximum value Tmax1 of a light transmittance at a wavelength of (λ2+50) nm to 1100 nm is preferably 40% or higher, more preferably 50% or higher, and still more preferably 60% or higher.

As illustrated in FIG. 2, in the optical filter according to the embodiment of the present invention, in a case where the organic layer 3 is provided between the dielectric multi-layer film 2 and the near infrared transmitting filter 1, the thickness of the organic layer 3 is preferably 10 to 1000 nm. The lower limit is preferably 20 nm or longer, and more preferably 30 nm or longer. The upper limit is preferably 500 nm or shorter and more preferably 300 nm or shorter. In a case where the thickness of the organic layer 3 is in the above-described range, the dielectric multi-layer film is likely to be formed on a film surface having high flatness, and film forming properties or adhesiveness of the dielectric multi-layer film is excellent. It is preferable that the organic layer 3 is a film having high light transmittance at a wavelength of λ1 to λ2, and the minimum value of the light transmittance in the above-described range is more preferably 90% or higher, still more preferably 95% or higher, and still more preferably 98% or higher. The organic layer 3 can be formed using an organic layer-forming composition described below.

The optical filter according to the embodiment of the present invention can be laminated on the support to be used. The support is not particularly limited, and can be appropriately selected according to the use. Examples of the support include a substrate formed of a material such as silicon, non-alkali glass, soda glass, PYREX (registered trade name) glass, or quartz glass. In addition, for example, an InGaAs substrate is preferably used. In addition, a charge coupled device (CCD), a complementary metal-oxide semiconductor (CMOS), a transparent conductive film, or the like may be formed on the support. In addition, a black matrix that separates pixels from each other may be formed on the support. In addition, an undercoat layer may be provided on the support to improve adhesiveness with a layer above the support, to prevent diffusion of materials, or to make a surface of the substrate flat.

The optical filter according to the embodiment of the present invention can be used in combination with a color filter that includes a chromatic colorant. The color filter can be manufactured using a coloring composition including a chromatic colorant. Examples of the color filter include a filter having at least one colored pixel of selected from a red pixel, a blue pixel, a green pixel, a yellow pixel, a magenta pixel, or a cyan pixel. In addition, the color filter may further include a transparent pixel in addition to the above-described colored pixel.

Figure 3:
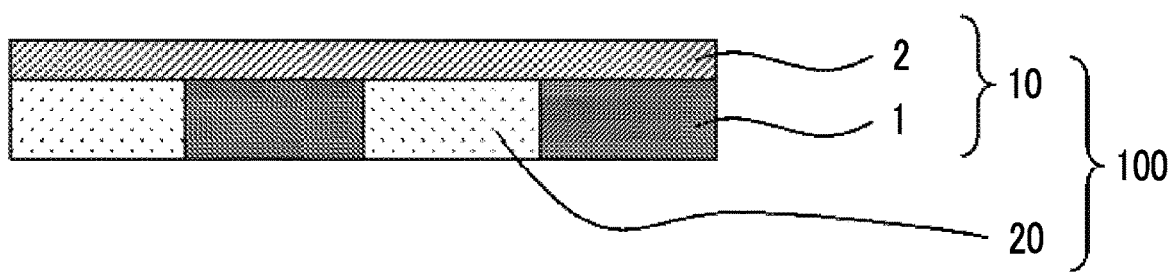
FIG. 3 is a diagram illustrating one embodiment of a structure including a combination of the optical filter according to the present invention and a color filter.

FIG. 3 is a diagram illustrating one embodiment of a structure including a combination of the optical filter according to the present invention and the color filter. In a structure 100, a color filter 20 is formed in a portion of the near infrared transmitting filter 1 not including a pattern. The dielectric multi-layer film 2 is formed on a surface of the near infrared transmitting filter 1 and the color filter 20. In FIG. 3, a laminate 10 including the near infrared transmitting filter 1 and the dielectric multi-layer film 2 is the optical filter according to the embodiment of the present invention. In FIG. 3, the organic layer may be provided between the near infrared transmitting filter 1 and the dielectric multi-layer film 2 and/or between the color filter 20 and the dielectric multi-layer film 2. In addition, in FIG. 3, differences in height between the upper surfaces of the filters adjacent to each other are substantially the same. However, the differences in height between the upper surfaces of the filters adjacent to each other may be different from each other. In addition, in a case where the differences in height between the upper surfaces of the filters adjacent to each other are different from each other, it is preferable that the level differences are filled with the organic layer or the like.

The optical filter according to the embodiment of the present invention can be used in a state where it is incorporated into various optical sensors such as a solid image pickup element or an image display device (for example, a liquid crystal display device or an organic electroluminescence (organic EL) display device). For example, an optical sensor into which the optical filter according to the embodiment of the present invention is incorporated can e preferably used for applications, for example, for iris recognition, for distance measurement, for a proximity sensor, for a gesture sensor, for a motion sensor, a Time-of-Flight (TOF) sensor, for a vein sensor, for blood vessel visualization, for sebum amount measurement, for fluorescent labeling, or for a surveillance camera.

<Near Infrared Transmitting Filter-Forming Composition>

Next, the composition (near infrared transmitting filter-forming composition) used for forming the near infrared transmitting filter in the optical filter according to the embodiment of the present invention will be described. In the near infrared transmitting filter-forming composition, a ratio Amin/Bmax of a minimum value Amin of an absorbance of the composition in a wavelength range of 400 to 640 nm to a maximum value Bmax of an absorbance of the composition in a wavelength range of 1000 to 1100 nm is preferably 4.5 or higher, more preferably 7.5 or higher, still more preferably 15 or higher, and still more preferably 30 or higher.

An absorbance A1 at a wavelength 1 is defined by the following Expression (1).

$$A\lambda = -\log(T\lambda/100) \quad (1)$$

A$\lambda$ represents the absorbance at the wavelength $\lambda$, and T$\lambda$ represents a transmittance (%) at the wavelength $\lambda$.

In the present invention, a value of the absorbance may be a value measured in the form of a solution or a value of a film which is formed using the near infrared transmitting filter-forming composition. In a case where the absorbance is measured in the form of the film, it is preferable that the absorbance is measured using a film that is formed by applying the near infrared transmitting filter-forming composition to a glass substrate using a method such as spin coating such that the thickness of the dried film is a predetermined value, and drying the applied near infrared transmitting filter-forming composition using a hot plate at 100° C. for 120 seconds. The thickness of the film can be obtained by measuring the thickness of the substrate including the film using a stylus surface profilometer (DEKTAK 150, manufactured by ULVAC Inc.).

In addition, the absorbance can be measured using a well-known spectrophotometer of the related art. Measurement conditions of the absorbance are not particularly limited. It is preferable that the maximum value Bmax of the absorbance in a wavelength range of 1000 to 1100 nm is measured under conditions which are adjusted such that the minimum value Amin of the absorbance in a wavelength range of 400 to 640 nm is 0.1 to 3.0. By measuring the absorbance under the above-described conditions, a measurement error can be further reduced. A method of adjusting the minimum value Amin of the absorbance in a wavelength range of 400 to 640 nm to be 0.1 to 3.0 is not particularly limited. For example, in a case where the absorbance is measured in the form of a solution, for example, a method of adjusting the optical path length of a sample cell can be used. In addition, in a case where the absorbance is measured in the form of the film, for example, a method of adjusting the thickness of the film can be used.

In addition, it is more preferable that the near infrared transmitting filter-forming composition satisfies at least one of the following spectral characteristics (1) to (3).

(1) A ratio Amin1/Bmax1 of a minimum value Amin1 of an absorbance of the near infrared transmitting filter-forming composition in a wavelength range of 400 to 640 nm to a maximum value Bmax1 of an absorbance of the near infrared transmitting filter-forming composition in a wavelength range of 800 to 1100 nm is 4.5 or higher, preferably 7.5 or higher, more preferably 15 or higher, and still more preferably 30 or higher. According to this aspect, a film that can block light in a wavelength range of 400 to 640 nm and allows transmission of light having a wavelength of longer than 670 nm can be formed.

(2) A ratio Amin2/Bmax2 of a minimum value Amin2 of an absorbance of the near infrared transmitting filter-forming composition in a wavelength range of 400 to 750 nm to a maximum value Bmax2 of an absorbance of the near infrared transmitting filter-forming composition in a wavelength range of 900 to 1100 nm is 4.5 or higher, preferably 7.5 or higher, more preferably 15 or higher, and still more preferably 30 or higher. According to this aspect, a film that can block light in a wavelength range of 400 to 750 nm and allows transmission of light having a wavelength of longer than 800 nm can be formed.

(3) A ratio Amin3/Bmax3 of a minimum value Amin3 of an absorbance of the near infrared transmitting filter-forming composition in a wavelength range of 400 to 830 nm to a maximum value Bmax3 of an absorbance of the near infrared transmitting filter-forming composition in a wavelength range of 1000 to 1100 nm is 4.5 or higher, preferably 7.5 or higher, more preferably 15 or higher, and still more preferably 30 or higher. According to this aspect, a film that can block light in a wavelength range of 400 to 830 nm and allows transmission of light having a wavelength of longer than 900 nm can be formed.

Hereinafter, each of components which can form the near infrared transmitting filter-forming composition will be described.

<<Color Material>>

It is preferable that the near infrared transmitting filter-forming composition includes a color material. In the present invention, it is preferable that the color material is a material that allows transmission of at least a part of light in a near infrared range and blocks light in a visible range. In the present invention, it is preferable that the color material is a material that absorbs light in a wavelength range of violet to red. In addition, in the present invention, it is preferable that the color material is a coloring material that blocks light in a wavelength range of 400 to 640 nm. In addition, it is preferable that the color material is a material that allows transmission of light in a wavelength range of 1000 to 1100 nm. In the present invention, it is preferable that the color material satisfies at least one of the following requirement (A) or (B).

(1): The light blocking material includes two or more chromatic colorants, and a combination of the two or more chromatic colorants forms black.

(2) The light blocking material includes an organic black colorant. In the aspect (2), it is preferable that the light blocking material further includes a chromatic colorant.

In the present invention, the chromatic colorant denotes a colorant other than a white colorant and a black colorant. In addition, in the present invention, the organic black colorant denotes a material that absorbs visible light and allows transmission of at least a part of infrared light. Accordingly, in the present invention, the organic black colorant does not denote a black colorant that absorbs both visible light and infrared light, for example, carbon black or titanium black. It is preferable that the organic black colorant is a colorant having a maximum absorption wavelength in a wavelength range of 400 nm to 700 nm.

It is preferable that the color material is a material in which the ratio A/B of the minimum value Amin of the absorbance in a wavelength range of 400 to 640 nm to the maximum value Bmax of the absorbance in a wavelength range of 1000 to 1100 nm is 4.5 or higher.

The above-described characteristics may be satisfied using one material alone or using a combination of a plurality of materials. For example, in the aspect (1), it is preferable that the spectral characteristics are satisfied using a combination of a plurality of chromatic colorants. In addition, in the aspect (2), the spectral characteristics may be satisfied using an organic black colorant. In addition, the spectral characteristics may be satisfied using a combination of an organic black colorant and a chromatic colorant.

(Chromatic Colorant)

In the present invention, it is preferable that the chromatic colorant is selected from a red colorant, a green colorant, a blue colorant, a yellow colorant, a violet colorant, and an orange colorant. In the present invention, the chromatic colorant may be a pigment or a dye. It is preferable that the chromatic colorant is a pigment. It is preferable that an average particle size (r) of the pigment satisfies preferably 20 nm≤s≤300 nm, more preferably 25 nm≤r≤250 nm, and still more preferably 30 nm≤s≤200 nm. "Average particle size" described herein denotes the average particle size of secondary particles which are aggregates of primary particles of the pigment. In addition, regarding a particle size distribution of the secondary particles of the pigment (hereinafter, simply referred to as "particle size distribution") which can be used, secondary particles having a particle size of (average particle size±100) nm account for preferably 70% by mass or higher and more preferably 80% by mass or higher in the pigment. The particle size distribution of the secondary particles can be measured using a scattering intensity distribution.

It is preferable that the pigment is an organic pigment. Preferable examples of the organic pigment are as follows: Color Index (C.I.) Pigment Yellow 1, 2, 3, 4, 5, 6, 10, 11, 12, 13, 14, 15, 16, 17, 18, 20, 24, 31, 32, 34, 35, 35:1, 36, 36:1, 37, 37:1, 40, 42, 43, 53, 55, 60, 61, 62, 63, 65, 73, 74, 77, 81, 83, 86, 93, 94, 95, 97, 98, 100, 101, 104, 106, 108, 109, 110, 113, 114, 115, 116, 117, 118, 119, 120, 123, 125, 126, 127, 128, 129, 137, 138, 139, 147, 148, 150, 151, 152, 153, 154, 155, 156, 161, 162, 164, 166, 167, 168, 169, 170, 171, 172, 173, 174, 175, 176, 177, 179, 180, 181, 182, 185, 187, 188, 193, 194, 199, 213, and 214 (all of which are yellow pigments);

C.I. Pigment Orange 2, 5, 13, 16, 17:1, 31, 34, 36, 38, 43, 46, 48, 49, 51, 52, 55, 59, 60, 61, 62, 64, 71, and 73 (all of which are orange pigments);

C.I. Pigment Red 1, 2, 3, 4, 5, 6, 7, 9, 10, 14, 17, 22, 23, 31, 38, 41, 48:1, 48:2, 48:3, 48:4, 49, 49:1, 49:2, 52:1, 52:2, 53:1, 57:1, 60:1, 63:1, 66, 67, 81:1, 81:2, 81:3, 83, 88, 90, 105, 112, 119, 122, 123, 144, 146, 149, 150, 155, 166, 168, 169, 170, 171, 172, 175, 176, 177, 178, 179, 184, 185, 187, 188, 190, 200, 202, 206, 207, 208, 209, 210, 216, 220, 224, 226, 242, 246, 254, 255, 264, 270, 272, and 279 (all of which are red pigments);

C.I. Pigment Green 7, 10, 36, 37, 58, and 59 (all of which are green pigments);

C.I. Pigment Violet 1, 19, 23, 27, 32, 37, and 42 (all of which are violet pigments); and C.I. Pigment Blue 1, 2, 15, 15:1, 15:2, 15:3, 15:4, 15:6, 16, 22, 60, 64, 66, 79, and 80 (all of which are blue pigments).

Among these organic pigments, one kind may be used alone, or two or more kinds may be used in combination.

As the dye, well-known dyes can be used without any particular limitation. In terms of a chemical structure, a dye such as a pyrazole azo dye, an anilino azo dye, a triarylmethane dye, an anthraquinone dye, an anthrapyridone dye, a benzylidene dye, an oxonol dye, a pyrazolotriazole azo dye, a pyridone azo dye, a cyanine dye, a phenothiazine dye, a pyrrolopyrazoleazomethine dye, a xanthene dye, a phthalocyanine dye, a benzopyran dye, an indigo dye, or a pyrromethene dye can be used. In addition, a polymer of the above-described dyes may be used. In addition, dyes described in JP2015-028144A and JP2015-034966A can also be used.

It is preferable that the color material includes two or more selected from a red colorant, a blue colorant, a yellow colorant, a violet colorant, and a green colorant. Examples of preferable combinations include the following, (2), (3) or (4) are preferable, and (3) is more preferable.

(1) An aspect in which the light blocking material includes a red colorant and a blue colorant.

(2) An aspect in which the light blocking material includes a red colorant, a blue colorant, and a yellow colorant.

(3) An aspect in which the light blocking material includes a red colorant, a blue colorant, a yellow colorant, and a violet colorant.

(4) An aspect in which the light blocking material includes a red colorant, a blue colorant, a yellow colorant, a violet colorant, and a green colorant.

(5) An aspect in which the light blocking material includes a red colorant, a blue colorant, a yellow colorant, and a green colorant.

(6) An aspect in which the light blocking material includes a red colorant, a blue colorant, and a green colorant.

(7) An aspect in which the light blocking material includes a yellow colorant and a violet colorant.

In the aspect (1), a mass ratio red colorant:blue colorant between the red colorant and the blue colorant is preferably 20 to 80:20 to 80, more preferably 20 to 60:40 to 80, and more preferably 20 to 50:50 to 80.

In the aspect (2), a mass ratio red colorant:blue colorant: yellow colorant between the red colorant, the blue colorant, and the yellow colorant is preferably 10 to 80:20 to 80:10 to 40, more preferably 10 to 60:30 to 80:10 to 30, and still more preferably 10 to 40:40 to 80:10 to 20.

In the aspect (3), a mass ratio red colorant:blue colorant: yellow colorant:violet colorant between the red colorant, the blue colorant, the yellow colorant, and the violet colorant is preferably 10 to 80:20 to 80:5 to 40:5 to 40, more preferably 10 to 60:25 to 80:5 to 30:5 to 30, and still more preferably 10 to 40:25 to 50:10 to 30:10 to 30.

In the aspect (4), a mass ratio red colorant:blue colorant: yellow colorant:violet colorant:green colorant between the red colorant, the blue colorant, the yellow colorant, the violet colorant, and the green colorant is preferably 10 to 80:20 to 80:5 to 40:5 to 40:5 to 40, more preferably 10 to 60:30 to 80:5 to 30:5 to 30:5 to 30, and still more preferably 10 to 40:40 to 80:5 to 20:5 to 20:5 to 20.

In the aspect (5), a mass ratio red colorant:blue colorant: yellow colorant:green colorant between the red colorant, the blue colorant, the yellow colorant, and the green colorant is preferably 10 to 80:20 to 80:5 to 40:5 to 40, more preferably 10 to 60:30 to 80:5 to 30:5 to 30, and still more preferably 10 to 40:40 to 80:5 to 20:5 to 20.

In the aspect (6), a mass ratio red colorant:blue colorant: green colorant between the red colorant, the blue colorant, and the green colorant is preferably 10 to 80:20 to 80:10 to 40, more preferably 10 to 60:30 to 80:10 to 30, and still more preferably 10 to 40:40 to 80:10 to 20.

In the aspect (7), a mass ratio yellow colorant:violet colorant between the yellow colorant and the violet colorant is preferably 10 to 50:40 to 80, more preferably 20 to 40:50 to 70, and still more preferably 30 to 40:60 to 70.

As the yellow colorant, C.I. Pigment Yellow 139, 150, or 185 is preferable, C.I. Pigment Yellow 139 or 150 is more preferable, and C.I. Pigment Yellow 139 is still more preferable. As the blue colorant, C.I. Pigment Blue 15:6 is preferable. As the violet colorant, for example, C.I. Pigment Violet 23 is preferable. As the red colorant, C.I. Pigment Red 122, 177, 224, or 254 is preferable, C.I. Pigment Red 122, 177, or 254 is more preferable, and C.I. Pigment Red 254 is still more preferable. As the green colorant, C.I. Pigment Green 7, 36, 58, or 59 is preferable.

(Organic Black Colorant)

In the present invention, examples of the organic black colorant include a bisbenzofuranone compound, an azomethine compound, a perylene compound, and an azo compound. Among these, a bisbenzofuranone compound or a perylene compound is preferable. Examples of the bisbenzofuranone compound include a compound described in JP2010-534726A, JP2012-515233A, JP2012-515234A, WO2014/208348A, and JP 2015-525260A. For example, "Irgaphor Black" (manufactured by BASF SE) is available. Examples of the perylene compound include C.I. Pigment Black 31 and 32. Examples of the azomethine compound include compounds described in JP1989-170601A (JP-H1-170601A) and JP1990-034664A (JP-H2-034664A). For example, "CHROMOFINE BLACK A1103" (manufactured by Dainichiseika Color & Chemicals Mfg. Co., Ltd.) is available.

In the present invention, it is preferable that the bisbenzofuranone compound is one of the following compounds represented by the following formulae or a mixture thereof.

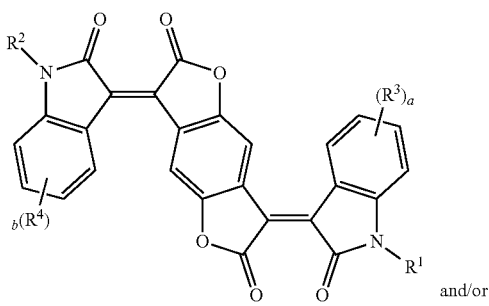

and/or

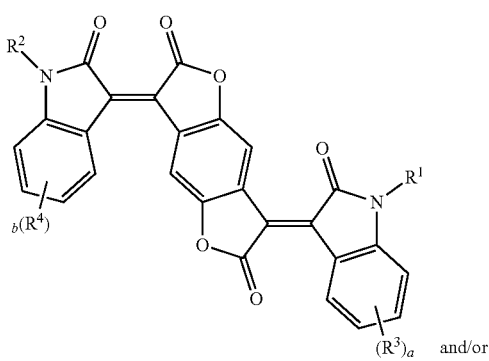

and/or

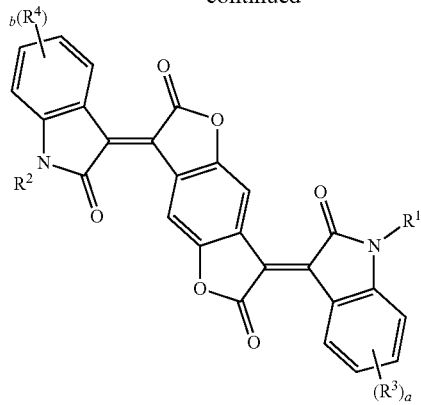

In the formulae, $R^1$ and $R^2$ each independently represent a hydrogen atom or a substituent, $R^3$ and $R^4$ each independently represent a substituent, a and b each independently represent an integer of 0 to 4, in a case where a is 2 or more, a plurality of $R^3$'s may be the same as or different from each other, a plurality of $R^3$'s may be bonded to each other to form a ring, in a case where b is 2 or more, a plurality of $R^4$'s may be the same as or different from each other, and a plurality of $R^4$'s may be bonded to each other to form a ring.

The substituent represented by $R^1$ to $R^4$ is a halogen atom, a cyano group, a nitro group, an alkyl group, an alkenyl group, an alkynyl group, an aralkyl group, an aryl group, a heteroaryl group, $-OR^{301}$, $-COR^{302}$, $-COOR^{303}$, $-OCOR^{304}$, $-NR^{305}R^{306}$, $-NHCOR^{307}$, $-CONR^{308}R^{309}$, $-NHCONR^{310}R^{311}$, $-NHCOOR^{312}$, $-SR^{313}$, $-SO_2R^{314}$, $-SO_2OR^{315}$, $-NHSO_2R^{316}$, or $-SO_2NR^{317}R^{318}$. $R^{301}$ to $R^{318}$ each independently represent a hydrogen atom, an alkyl group, an alkenyl group, an alkynyl group, an aryl group, or a heteroaryl group.

The details of the bisbenzofuranone compound can be found in paragraphs "0014" to "0037" of JP2010-534726A, the content of which is incorporated herein by reference.

In the present invention, in a case where an organic black colorant is used as the color material, it is preferable that the organic black colorant is used in combination with a chromatic colorant. By using the organic black colorant in combination with a chromatic colorant, excellent spectral characteristics are likely to be obtained. Examples of the chromatic colorant which can be used in combination with the organic black colorant include a red colorant, a blue colorant, and a violet colorant. Among these, a red colorant or a blue colorant is preferable. Among these colorants, one kind may be used alone, or two or more kinds may be used in combination. In addition, regarding a mixing ratio between the chromatic colorant and the organic black colorant, the amount of the chromatic colorant is preferably 10 to 200 parts by mass and more preferably 15 to 150 parts by mass with respect to 100 parts by mass of the organic black colorant.

The content of the pigment in the color material is preferably 95% by mass or higher, more preferably 97% by mass or higher, and still more preferably 99% by mass or higher with respect to the total mass of the color material.

The content of the color material is preferably 10 to 70% by mass with respect to the total solid content of the near infrared transmitting filter-forming composition. The lower limit is preferably 30% by mass or higher and more preferably 40% by mass or higher.

<<Near Infrared Absorber>>

The near infrared transmitting filter-forming composition may further include a near infrared absorber. In the near infrared transmitting filter, the near infrared absorber has a function of limiting light to be transmitted (near infrared light) to a longer wavelength side.

In the present invention, as the near infrared absorber, a compound having a maximum absorption wavelength in an near infrared range (preferably a wavelength of 700 to 1100 nm, more preferably a wavelength of 700 to 1000 nm) can be preferably used. As the near infrared absorber, a pigment or a dye may be used. In this specification, "having a maximum absorption wavelength in a wavelength range of 700 to 1100 nm" denotes having a maximum absorbance in a wavelength range of 700 to 1100 nm in an absorption spectrum of the near infrared absorber in a solution. Examples of a measurement solvent include chloroform, methanol, dimethyl sulfoxide, ethyl acetate, and tetrahydrofuran. In a case where the near infrared absorber is a compound which is soluble in chloroform, chloroform is used as the measurement solvent. In a case where the near infrared absorber is not soluble in chloroform, methanol is used. In addition, in a case where the near infrared absorber is a compound which is not soluble in chloroform and methanol, dimethyl sulfoxide is used.

In the present invention, as the near infrared absorber, a compound (near infrared absorbing compound) that includes a π-conjugated plane having a monocyclic or fused aromatic ring can be preferably used. The number of atoms constituting the p-conjugated plane included in the near infrared absorbing compound other than hydrogen is preferably 14 or more, more preferably 20 or more, still more preferably 25 or more, and still more preferably 30 or more. For example, the upper limit is preferably 80 or less and more preferably 50 or less.

The number of monocyclic or fused aromatic rings in the p-conjugated plane included in the near infrared absorbing compound is preferably 2 or more, more preferably 3 or more, still more preferably 4 or more, and still more preferably 5 or more. The upper limit is preferably 100 or less, more preferably 50 or less, and still more preferably 30 or less. Examples of the aromatic ring include a benzene ring, a naphthalene ring, an indene ring, an azulene ring, a heptalene ring, an indacene ring, a perylene ring, a pentacene ring, a quaterrylene ring, an acenaphthene ring, a phenanthrene ring, an anthracene ring, a naphthacene ring, a chrysene ring, a triphenylene ring, a fluorene ring, a pyridine ring, a quinoline ring, an isoquinoline ring, an imidazole ring, a benzimidazole ring, a pyrazole ring, a thiazole ring, a benzothiazole ring, a triazole ring, a benzotriazole ring, an oxazole ring, a benzoxazole ring, an imidazoline ring, a pyrazine ring, a quinoxaline ring, a pyrimidine ring, a quinazoline ring, a pyridazine ring, a triazine ring, a pyrrole ring, an indole ring, an isoindole ring, a carbazole ring, and a fused ring including the above-described ring.

In the present invention, as the near infrared absorber, at least one selected from a pyrrolopyrrole compound, a cyanine compound, a squarylium compound, a phthalocyanine compound, a naphthalocyanine compound, a quaterrylene compound, a merocyanine compound, a croconium compound, an oxonol compound, a diimmonium compound, a dithiol compound, a triarylmethane compound, a pyrromethene compound, an azomethine compound, an anthraquinone compound, or a dibenzofuranone compound is preferable, at least one selected from a pyrrolopyrrole compound, a cyanine compound, a squarylium compound, a phthalocyanine compound, a naphthalocyanine compound, or a diimmonium compound is more preferable, at least one selected from a pyrrolopyrrole compound, a cyanine compound, and a squarylium compound is still more preferable, or a pyrrolopyrrole compound is still more preferable. Examples of the diimmonium compound include a compound described in JP2008-528706A, the content of which is incorporated herein by reference. Examples of the phthalocyanine compound include a compound described in paragraph "0093" of JP2012-077153A, oxytitaniumphthalocyanine described in JP2006-343631A, a compound described in paragraphs "0013" to "0029" of JP2013-195480A, and vanadium phthalocyanine described in JP6081771B, the contents of which are incorporated herein by reference. As the phthalocyanine compound, for example, a compound having the following structure can also be used. Examples of the naphthalocyanine compound include a compound described in paragraph "0093" of JP2012-077153A, the content of which is incorporated herein by reference. In addition, as the cyanine compound, the phthalocyanine compound, the naphthalocyanine compound, the diimmonium compound, or the squarylium compound, for example, a compound described in paragraphs "0010" to "0081" of JP2010-111750A may be used, the content of which is incorporated herein by reference. In addition, the details of the cyanine compound can be found in, for example, "Functional Colorants by Makoto Okawara, Masaru Matsuoka, Teijiro Kitao, and TsuneokaHirashima, published by Kodansha Scientific Ltd.", the content of which is incorporated herein by reference. In addition, a compound described in paragraphs JP2016-146619A can also be used as the near infrared absorbing compound, the content of which is incorporated herein by reference.

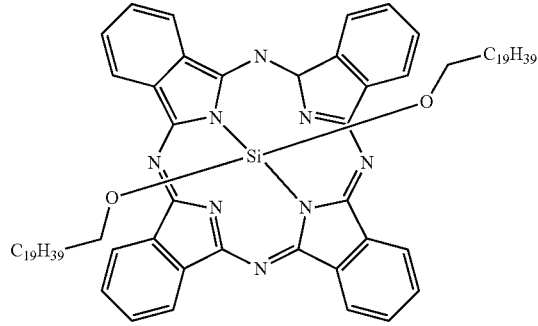

As the pyrrolopyrrole compound, a compound represented by Formula (PP) is preferable.

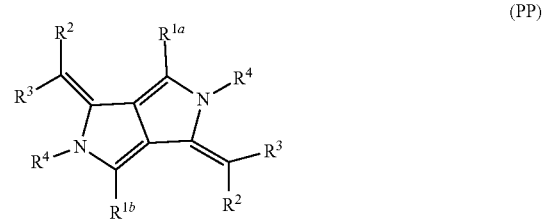

(PP)

In the formula, $R^{1a}$ and $R^{1b}$ each independently represent an alkyl group, an aryl group, or a heteroaryl group, $R^2$ and $R^3$ each independently represent a hydrogen atom or a substituent, $R^2$ and $R^3$ may be bonded to each other to form a ring, $R^4$'s each independently represent a hydrogen atom, an alkyl group, an aryl group, a heteroaryl group, —$BR^{4A}R^{4B}$, or a metal atom, $R^4$ may form a covalent bond or a coordinate bond with at least one selected from $R^{1a}$, $R^{1b}$, or $R^3$, and $R^{4A}$ and $R^{4B}$ each independently represent a substituent. The details of Formula (PP) can be found in paragraphs "0017" to "0047" of JP2009-263614A, paragraphs "0011" to "0036" of JP2011-068731A, and paragraphs "0010" to "0024" of WO2015/166873A, the contents of which are incorporated herein by reference.

In Formula (PP), $R^{1a}$ and $R^{1b}$ each independently represent preferably an aryl group or a heteroaryl group, and more preferably an aryl group. In addition, the alkyl group, the aryl group, and the heteroaryl group represented by $R^{1a}$ to $R^{1b}$ may have a substituent or may be unsubstituted. Examples of the substituent include substituents described in paragraphs "0020" to "0022" of 2009-263614A and the following substituent T. In addition, in a case where the alkyl group, the aryl group, and the heteroaryl group represented by $R^{1a}$ and $R^{1b}$ has two or more substituents, the substituents may be bonded to each other to form a ring.

(Substituent T)

The substituent T includes an alkyl group (preferably an alkyl group having 1 to 30 carbon atoms), an alkenyl group (preferably an alkenyl group having 2 to 30 carbon atoms), an alkynyl group (preferably an alkynyl group having 2 to 30 carbon atoms), an aryl group (preferably an aryl group having 6 to 30 carbon atoms), an amino group (preferably an amino group having 0 to 30 carbon atoms), an alkoxy group (preferably an alkoxy group having 1 to 30 carbon atoms), an aryloxy group (preferably an aryloxy group having 6 to 30 carbon atoms), a heteroaryloxy group, an acyl group (preferably having an acyl group 1 to 30 carbon atoms), an alkoxycarbonyl group (preferably an alkoxycarbonyl group having 2 to 30 carbon atoms), an aryloxycarbonyl group (preferably an aryloxycarbonyl group having 7 to 30 carbon atoms), an acyloxy group (preferably an acyloxy group having 2 to 30 carbon atoms), an acylamino group (preferably an acylamino group having 2 to 30 carbon atoms), an alkoxycarbonylamino group (preferably an alkoxycarbonylamino group having 2 to 30 carbon atoms), an aryloxycarbonylamino group (preferably an aryloxycarbonylamino group having 7 to 30 carbon atoms), a sulfamoyl group (preferably a sulfamoyl group having 0 to 30 carbon atoms), a carbamoyl group (preferably a carbamoyl group having 1 to 30 carbon atoms), an alkylthio group (preferably an alkylthio group having 1 to 30 carbon atoms), an arylthio group (preferably an arylthio group having 6 to 30 carbon atoms), a heteroarylthio group (preferably having 1 to 30 carbon atoms), an alkylsulfonyl group (preferably having 1 to 30 carbon atoms), an arylsulfonyl group (preferably having 6 to 30 carbon atoms), a heteroarylsulfonyl group (preferably having 1 to 30 carbon atoms), an alkylsulfinyl group (preferably having 1 to 30 carbon atoms), an arylsulfinyl group (preferably having 6 to 30 carbon atoms), a heteroarylsulfinyl group (preferably having 1 to 30 carbon atoms), a ureido group (preferably having 1 to 30 carbon atoms), a hydroxyl group, a carboxyl group, a sulfo group, a phosphate group, a carboxylic acid amide group (preferably a group represented by —$NHCOR^{41}$. $R^{41}$ represents a hydrocarbon group or a heterocyclic group, and the hydrocarbon group and the heterocyclic group may further have a substituent. As the substituent, a halogen atom is preferable, and a fluorine atom is more preferable), a sulfonic acid amide group (preferably a group represented by —$NHSO_2R^{42}$. $R^{42}$ represents a hydrocarbon group or a heterocyclic group, and the hydrocarbon group and the heterocyclic group may further have a substituent. As the substituent, a halogen atom is preferable, and a fluorine atom is more preferable), an imide acid group (preferably a group represented by —$SO_2NHSO_2R^{43}$, —$CONHSO_2R^{44}$, —$CONHCOR^{45}$, or —$SO_2NHCOR^{46}$. $R^{43}$ to $R^{46}$ each independently represent a hydrocarbon group or a heterocyclic group. The hydrocarbon group and the heterocyclic group may further have a substituent), a mercapto group, a halogen atom, a cyano group, an alkylsulfino group, an arylsulfino group, a hydrazino group, an imino group, and a heteroaryl group (preferably having 1 to 30 carbon atoms).

In a case where the above-described groups can be further substituted, the groups may further have a substituent. Examples of the substituent include the groups described above regarding the substituent T.

Specific examples of the group represented by $R^{1a}$ and $R^{1b}$ include an aryl group which has an alkoxy group as a substituent, an aryl group which has a hydroxyl group as a substituent, and an aryl group which has an acyloxy group as a substituent.

In Formula (PP), $R^2$ and $R^3$ each independently represent a hydrogen atom or a substituent. Examples of the substituent include the above-described substituent T. It is preferable that at least one of $R^2$ or $R^3$ represents an electron-withdrawing group. A substituent having a positive Hammett's substituent constant σ value (sigma value) acts as an electron-withdrawing group. Here, the substituent constant obtained by Hammett's rule includes a σp value and a σm value. The values can be found in many common books. In the present invention, a substituent having the Hammett's substituent constant σ value of 0.2 or more can be exemplified as the electron-withdrawing group. σ value is preferably 0.25 or more, more preferably 0.3 or more, and still more preferably 0.35 or more. The upper limit is not particularly limited, but preferably 0.80 or less. Specific examples of the electron-withdrawing group include a cyano group (σp value=0.66), a carboxyl group (—COOH: σp value=0.45), an alkoxycarbonyl group (for example, —COOMe: σp value=0.45), an aryloxycarbonyl group (for example, —COOPh: σp value=0.44), a carbamoyl group (for example, —$CONH_2$: σp value=0.36), an alkylcarbonyl group (for example, —COMe: σp value=0.50), an arylcarbonyl group (for example, —COPh: σp value=0.43), an alkylsulfonyl group (for example, —$SO_2$Me: σp value=0.72), and an arylsulfonyl group (for example, —$SO_2$Ph: σp value=0.68). Among these, a cyano group is preferable. Here, Me represents a methyl group, and Ph represents a phenyl group. For example, the Hammett's substituent constant σ value can be found in the description of paragraphs "0017" and "0018" of JP2011-068731A, the content of which is incorporated herein by reference.

In Formula (PP), it is preferable that $R^2$ represents an electron-withdrawing group (preferably a cyano group) and $R^3$ represents a heteroaryl group. It is preferable that the heteroaryl group is a 5- or 6-membered ring. In addition, the heteroaryl group is preferably a monocycle or a fused ring, more preferably a monocycle or a fused ring composed of 2 to 8 rings, and still more preferably a monocycle or a fused ring composed of 2 to 4 rings. The number of heteroatoms constituting the heteroaryl group is preferably 1 to 3 and more preferably 1 or 2. Examples of the heteroatom include a nitrogen atom, an oxygen atom, and a sulfur atom. It is preferable that the heteroaryl group has one or more nitrogen atoms. Two $R^2$'s in Formula (PP) may be the same as or different from each other. In addition, two $R^3$'s in Formula (PP) may be the same as or different from each other.

In the Formula (PP), $R^4$ represents preferably a hydrogen atom, an alkyl group, an aryl group, a heteroaryl group, or a group represented by —$BR^{4A}R^{4B}$, more preferably a hydrogen atom, an alkyl group, an aryl group, or a group represented by —$BR^{4A}R^{4B}$, and still more preferably a group represented by —$BR^{4A}R^{4B}$. As the substituent represented by $R^{4A}$ and $R^{4B}$, a halogen atom, an alkyl group, an alkoxy group, an aryl group, or a heteroaryl group is preferable, an alkyl group, an aryl group, or a heteroaryl group is more preferable, and an aryl group is still more preferable. Each of the groups may further have a substituent. Two $R^4$'s in Formula (PP) may be the same as or different from each other. $R^{4A}$ and $R^{4B}$ may be bonded to each other to form a ring.

Specific examples of the compound represented by Formula (PP) include the following compounds. In the following structural formulae, Me represents a methyl group, and Ph represents a phenyl group. In addition, Examples of the pyrrolopyrrole compound include compounds described in paragraphs "0016" to "0058" of JP2009-263614A, compounds described in paragraphs "0037" to "0052" of JP2011-068731A, compounds described in paragraphs "0010" to "0033" of WO2015/166873A, the contents of which are incorporated herein by reference.

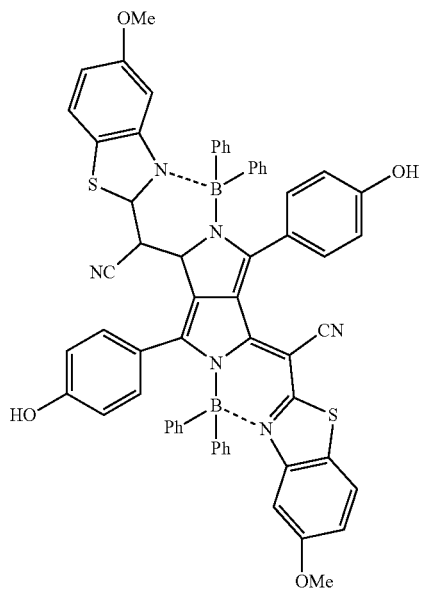

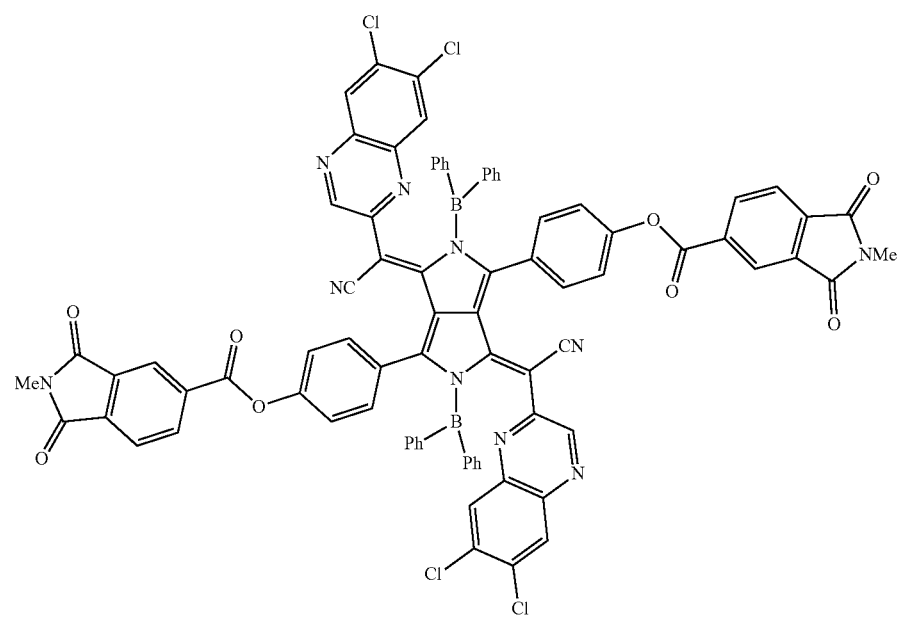

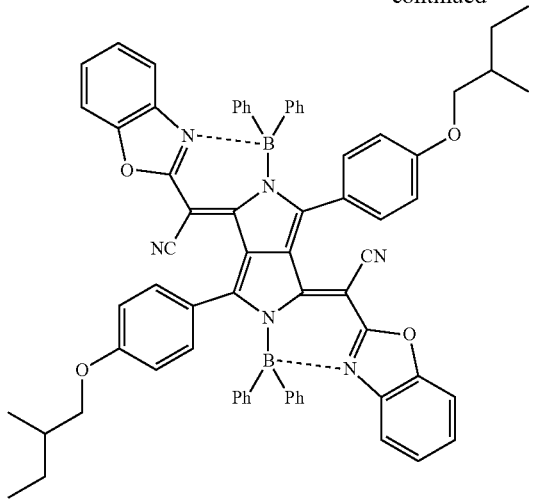
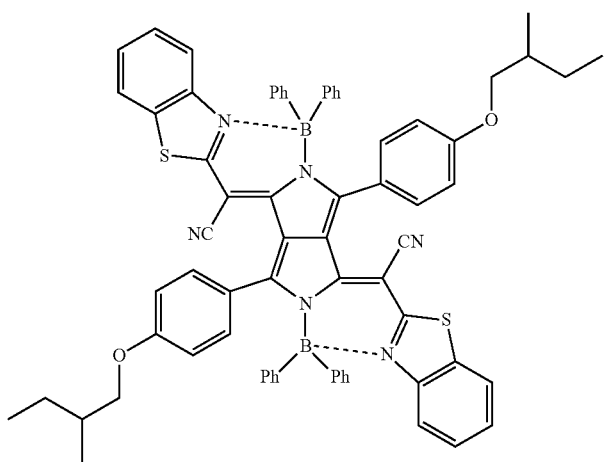
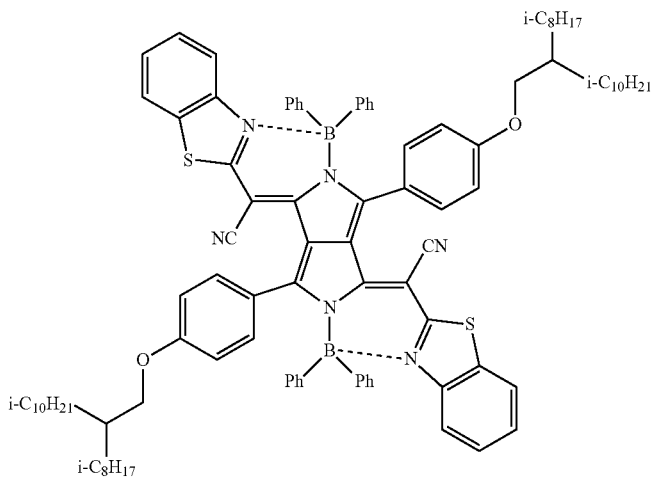
As the squarylium compound, a compound represented by the following Formula (SQ) is preferable.

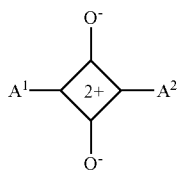

(SQ)

In Formula (SQ), $A^1$ and $A^2$ each independently represent an aryl group, a heteroaryl group, or a group represented by the following Formula (A-1).

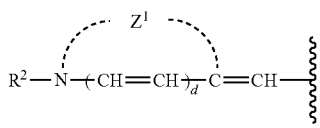

(A-1)

In Formula (A-1), $Z^1$ represents a non-metal atomic group for forming a nitrogen-containing heterocycle, $R^2$ represents an alkyl group, an alkenyl group, or an aralkyl group, d represents 0 or 1, and a wave line represents a direct bond. The details of Formula (SQ) can be found in paragraphs "0020" to "0049" of JP2011-208101A, paragraphs "0043" to "0062" of JP6065169B, and paragraphs "0024" to "0040" of WO2016/181987A, the contents of which are incorporated herein by reference.

As shown below, cations in Formula (SQ) are present without being localized.

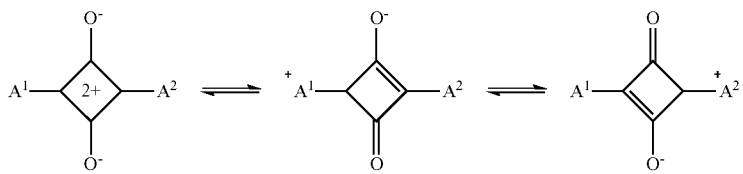

Examples of the squarylium compound include a compound having the following structure. In addition, examples of the squarylium compound include a compound described in paragraphs "0044" to "0049" of JP2011-208101A, a compound described in paragraphs "0060" and "0061" of JP6065169B, a compound described in paragraph "0040" of WO2016/181987A, a compound described in WO2013/133099A, a compound described in WO2014/088063A, a compound described in JP2014-126642A, a compound described in JP2016-146619A, a compound described in JP2015-176046A, a compound described in JP2017-025311A, a compound described in WO2016/154782A, a compound described in JP5884953B, a compound described in JP6036689B, a compound described in JP5810604B, and a compound described in JP2017-068120A, the contents of which are incorporated herein by reference.

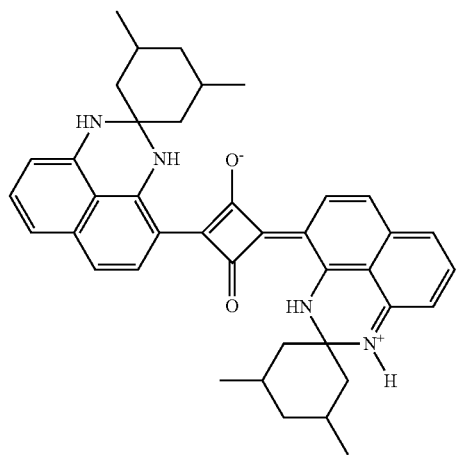 [SMILES: CC1CC(C)CC2(C1)Nc1cccc3ccc(C4=C([O-])/C(=c5\ccc6cccc7c6c5NC5(CC(C)CC(C)C5)[NH+]=7)C4=O)c(c13)N2]

As the cyanine compound, a compound represented by Formula (C) is preferable.

Formula (C)

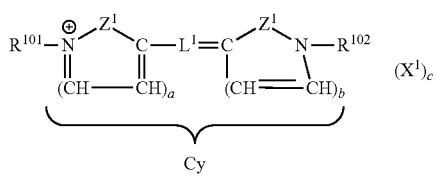

In the formula, $Z^1$ and $Z^2$ each independently represent a non-metal atomic group for forming a 5- or 6-membered nitrogen-containing heterocycle which may be fused, $R^{101}$ and $R^{102}$ each independently represent an alkyl group, an alkenyl group, an alkynyl group, an aralkyl group, or an aryl group, $L^1$ represents a methine chain including an odd number of methine groups, a and b each independently represent 0 or 1, in a case where a represents 0, a carbon atom and a nitrogen atom are bonded through a double bond. In a case where b represents 0, a carbon atom and a nitrogen atom are bonded through a single bond, and in a case where a site represented by Cy in the formula is a cation site, $X^1$ represents an anion, and c represents the number of $X^1$'s for balancing charge. In a case where a site represented by Cy in the formula is an anion site, $X^1$ represents a cation, and c represents the number of $X^1$'s for balancing charge. In a case where charge of a site represented by Cy in the formula is neutralized in a molecule, c represents 0.

Examples of the cyanine compound include a compound described in paragraphs "0044" and "0045" of JP2009-

108267A, a compound described in paragraphs "0026" to "0030" of JP2002-194040, a compound described in JP2015-172004A, a compound described in JP2015-172102A, a compound described in JP2008-088426A, and a compound described in JP 2017-031394A, the contents of which are incorporated herein by reference.

In the present invention, as the near infrared absorber, a commercially available product can also be used. Examples of the commercially available product include SDO-C33 (manufactured by Arimoto Chemical Co., Ltd.); EXCOLOR IR-14, EXCOLOR IR-10A, EXCOLOR TX-EX-801B, and EXCOLOR TX-EX-805K (manufactured by Nippon Shokubai Co., Ltd.); Shigenox NIA-8041, Shigenox NIA-8042, Shigenox NIA-814, Shigenox NIA-820, and Shigenox NIA-839 (manufactured by Hakkol Chemical Co., Ltd.); Epolite V-63, Epolight 3801, and Epolight3036 (manufactured by Epolin Inc.); PRO-JET 825LD1 (manufactured by Fujifilm Corporation); NK-3027 and NK-5060 (manufactured by Hayashibara Co., Ltd.); and YKR-3070 (manufactured by Mitsui Chemicals, Inc.).

In the present invention, as the near infrared absorber, inorganic particles can also be used. The shape of the inorganic particles is not particularly limited and may have a sheet shape, a wire shape, or a tube shape irrespective of whether or not the shape is spherical or non-spherical. As the inorganic particles, metal oxide particles or metal particles are preferable. Examples of the metal oxide particles include indium tin oxide (ITO) particles, antimony tin oxide (ATO) particles, zinc oxide (ZnO) particles, Al-doped zinc oxide (Al-doped ZnO) particles, fluorine-doped tin dioxide (F-doped $SnO_2$) particles, and niobium-doped titanium dioxide (Nb-doped $TiO_2$) particles. Examples of the metal particles include silver (Ag) particles, gold (Au) particles, copper (Cu) particles, and nickel (Ni) particles. In addition, as the inorganic particles, a tungsten oxide compound can also be used. As the tungsten oxide compound, cesium tungsten oxide is preferable. The details of the tungsten oxide compound can be found in paragraph "0080" of JP2016-006476A, the content of which is incorporated herein by reference.

In a case where the near infrared transmitting filter-forming composition includes a near infrared absorber, the content of the near infrared absorber is preferably 1 to 30% by mass with respect to the total solid content of the near infrared transmitting filter-forming composition. The upper limit is preferably 20% by mass or lower, and more preferably 10% by mass or lower. The lower limit is preferably 3% by mass or higher and more preferably 5% by mass or higher.

In addition, the total content of the near infrared absorber and the color material is preferably 10 to 70% by mass with respect to the total solid content of the near infrared transmitting filter-forming composition. The lower limit is preferably 20% by mass or higher and more preferably 25% by mass or higher.

In addition, the content of the near infrared absorber is preferably 5 to 40% by mass with respect to the total content of the near infrared absorber and the color material. The upper limit is preferably 30% by mass or lower and more preferably 25% by mass or lower. The lower limit is preferably 10% by mass or higher and more preferably 15% by mass or higher.

In the near infrared transmitting filter-forming composition, as the near infrared absorber, one infrared absorber may be used alone, or two or more infrared absorbers may be used in combination. In a case where two or more near infrared absorbers are used in combination, it is preferable that the total content of the near infrared absorbers is in the above-described range.

<<Curable Compound>>

It is preferable that the near infrared transmitting filter-forming composition includes a curable compound. As the curable compound, a well-known compound which is cross-linkable by a radical, an acid, or heat can be used. Examples of the crosslinking compound include a compound which has a group having an ethylenically unsaturated bond and a compound having a cyclic ether group. Examples of the group having an ethylenically unsaturated bond include a vinyl group, a (meth)allyl group, and a (meth)acryloyl group. Examples of the cyclic ether group include an epoxy group and an oxetanyl group. In the present invention, as the curable compound, a radically polymerizable compound or a cationically polymerizable compound is preferable, and a radically polymerizable compound is more preferable.

The content of the curable compound is preferably 0.1 to 40% by mass with respect to the total solid content of the near infrared transmitting filter-forming composition. For example, the lower limit is preferably 0.5% by mass or higher and more preferably 1% by mass or higher. For example, the upper limit is more preferably 30% by mass or lower and still more preferably 20% by mass or lower. As the curable compound, one kind may be used alone, or two or more kinds may be used in combination. In a case where two or more curable compounds are used in combination, it is preferable that the total content of the two or more curable compounds is in the above-described range.

(Radically Polymerizable Compound)

The radically polymerizable compound is not particularly limited as long as it is a compound that is polymerizable by the action of a radical. As the radically polymerizable compound, a compound having one or more groups having an ethylenically unsaturated bond is preferable, a compound having two or more groups having an ethylenically unsaturated bond is more preferable, and a compound having three or more groups having an ethylenically unsaturated bond is still more preferable. The upper limit of the number of the groups having an ethylenically unsaturated bond is, for example, preferably 15 or less and more preferably 6 or less. Examples of the group having an ethylenically unsaturated bond include a vinyl group, a (meth)allyl group, and a (meth)acryloyl group. Among these, a (meth)acryloyl group is preferable. The radically polymerizable compound is preferably a (meth)acrylate compound having 3 to 15 functional groups and more preferably a (meth)acrylate compound having 3 to 6 functional groups.

The radically polymerizable compound may be in the form of a monomer or a polymer and is preferably a monomer. The molecular weight of the monomer type radically polymerizable compound is preferably 200 to 3000. The upper limit of the molecular weight is preferably 2500 or lower and more preferably 2000 or lower. The lower limit of the molecular weight is preferably 250 or higher and more preferably 300 or higher.

Examples of the radically polymerizable compound can be found in paragraphs "0033" and "0034" of JP2013-253224A, the content of which is incorporated herein by reference.

As the polymerizable compound, ethyleneoxy-modified pentaerythritoltetraacrylate (as a commercially available product, NK ESTER ATM-35E manufactured by Shin-Nakamura Chemical Co., Ltd.), dipentaerythritoltriacrylate (as a commercially available product, KAYARAD D-330 manufactured by Nippon Kayaku Co., Ltd.), dipentaerythritoltetraacrylate (as a commercially available product, KAYARAD D-320 manufactured by Nippon Kayaku Co., Ltd.), dipentaerythritolpenta(meth)acrylate (as a commercially available product, KAYARAD D-310 manufactured by Nippon Kayaku Co., Ltd.), dipentaerythritolhexa(meth) acrylate (as a commercially available product, KAYARAD DPHA manufactured by Nippon Kayaku Co., Ltd., A-DPH-12E, manufactured by Shin-Nakamura Chemical Co., Ltd.), or a structure in which the (meth)acryloyl group is bonded through an ethylene glycol residue and/or a propylene glycol residue is preferable. In addition, oligomers of the above-described examples can be used. For example, the details of the polymerizable compound can be found in paragraphs "0034" to "0038" of JP2013-253224A, the content of which is incorporated herein by reference. Examples of the compound having an ethylenically unsaturated bond include a polymerizable monomer in paragraph "0477" of JP2012-208494A (corresponding to paragraph "0585" of US2012/0235099A), the contents of which are incorporated herein by reference. In addition, diglycerin ethylene oxide (EO)-modified (meth)acrylate (as a commercially available product, M-460 manufactured by Toagosei Co., Ltd.), pentaerythritoltetraacrylate (A-TMMT manufactured by Shin-Nakamura Chemical Co., Ltd.), or 1,6-hexanediol diacrylate (KAYARAD HDDA manufactured by Nippon Kayaku Co., Ltd.) is also preferable. Oligomers of the above-described examples can be used. For example, RP-1040 (manufactured by Nippon Kayaku Co., Ltd.) is used. In addition, as the radically polymerizable compound, ARONIX M-350 or TO-2349 (manufactured by Toagosei Co., Ltd.) can also be used.

The radically polymerizable compound may have an acid group such as a carboxyl group, a sulfo group, or a phosphate group. Examples of the radically polymerizable compound having an acid group include an ester of an aliphatic polyhydroxy compound and an unsaturated carboxylic acid. A polymerizable compound having an acid group obtained by causing a nonaromatic carboxylic anhydride to react with an unreacted hydroxy group of an aliphatic polyhydroxy compound is preferable. In particular, it is more preferable that, in this ester, the aliphatic polyhydroxy compound is pentaerythritol and/or dipentaerythritol. Examples of a commercially available product of the monomer having an acid group include M-305, M-510, and M-520 of ARONIX series as polybasic acid-modified acrylic oligomer (manufactured by Toagosei Co., Ltd.). The acid value of the radically polymerizable compound having an acid group is preferably 0.1 to 40 mgKOH/g. The lower limit is preferably 5 mgKOH/g or higher. The upper limit is preferably 30 mgKOH/g or lower.

In addition, it is also preferable that the radically polymerizable compound is a compound having a caprolactone structure. The radically polymerizable compound having a caprolactone structure is not particularly limited as long as it has a caprolactone structure in the molecule thereof, and examples thereof include e-caprolactone-modified polyfunctional (meth)acrylate obtained by esterification of a polyhydric alcohol, (meth)acrylic acid, and e-caprolactone, the polyhydric alcohol being, for example, trimethylolethane, ditrimethylolethane, trimethylolpropane, ditrimethylolpropane, pentaerythritol, dipentaerythritol, tripentaerythritol, glycerin, diglycerol, or trimethylolmelamine. Examples of the polymerizable compound having a caprolactone structure can be found in paragraphs "0042" to "0045" of JP2013-253224A, the content of which is incorporated herein by reference. As the compound having a caprolactone structure, for example, KAYARAD DPCA series (manufactured by Nippon Kayaku Co., Ltd.) is commercially available, and examples thereof include DPCA-20, DPCA-30, DPCA-60, and DPCA-120.

As the radically polymerizable compound, a compound which has a group having an ethylenically unsaturated bond and an alkyleneoxy group can also be used. As the compound which has a group having an ethylenically unsaturated bond and an alkyleneoxy group, a compound which has a group having an ethylenically unsaturated bond, an ethyleneoxy group, and/or a propyleneoxy group is preferable, a compound which has a group having an ethylenically unsaturated bond and an ethyleneoxy group is more preferable, and a trifunctional to hexafunctional (meth)acrylate compound having 4 to 20 ethyleneoxy groups is still more preferable. Examples of a commercially available product of the compound which has a group having an ethylenically unsaturated bond and an alkyleneoxy group include SR-494 (manufactured by Sartomer) which is a tetrafunctional (meth)acrylate having four ethyleneoxy groups, and KAYARAD TPA-330 (manufactured by Nippon Kayaku Co., Ltd.) which is a trifunctional (meth)acrylate having three isobutyleneoxy groups.

As the radically polymerizable compound, a urethane acrylate described in JP1973-041708B (JP-S48-041708B), JP1976-037193A (JP-S51-037193A), JP1990-032293B (JP-H2-032293B), or JP1990-016765B (JP-H2-016765B), or a urethane compound having an ethylene oxide skeleton described in JP 1983-049860B (JP-S58-049860B), JP1981-017654B (JP-S56-017654B), JP1987-039417B (JP-S62-039417B), or JP1987-039418B (JP-S62-039418B) is also preferable. In addition, an addition-polymerizable compound having an amino structure or a sulfide structure in the molecules described in JP1988-277653A (JP-S63-277653A), JP1988-260909A (JP-S63-260909A), or JP1989-105238A (JP-H1-105238A) can be used. Examples of a commercially available product of the polymerizable compound include UA-7200 (manufactured by Shin-Nakamura Chemical Co., Ltd.), DPHA-40H (manufactured by Nippon Kayaku Co., Ltd.), and UA-306H, UA-306T, UA-3061, AH-600, T-600 and AI-600 (manufactured by Kyoeisha Chemical Co., Ltd.).

In addition, as the radically polymerizable compound, a compound described in JP2017-048367A, JP6057891B, or JP6031807B can also be used.

In addition, as the radically polymerizable compound, for example, 8UH-1006 or 8UH-1012 (manufactured by Taisei Fine Chemical Co., Ltd.) or LIGHT ACRYLATE POB-A0 (manufactured by Kyoeisha Chemical Co., Ltd.) is also preferably used.

In a case where the near infrared transmitting filter-forming composition includes the radically polymerizable compound, the content of the radically polymerizable compound is preferably 0.1 to 40% by mass with respect to the total solid content of the near infrared transmitting filter-forming composition. For example, the lower limit is preferably 0.5% by mass or higher and more preferably 1% by mass or higher. For example, the upper limit is more preferably 30% by mass or lower and still more preferably 20% by mass or lower. As the radically polymerizable compound, one kind may be used alone, or two or more kinds may be used in combination. In a case where two or more radically polymerizable compounds are used in combination, it is preferable that the total content of the two or more radically polymerizable compounds is in the above-described range.

(CationicallyPolymerizable Compound) Examples of the cationicallypolymerizable compound include a compound having a cationicallypolymerizable group. Examples of the cationicallypolymerizable group include a cyclic ether group such as an epoxy group or an oxetanyl group and an unsaturated carbon double bond group such as a vinyl ether group or an isobutene group. As the cationicallypolymerizable compound, a compound having a cyclic ether group is preferable, and a compound having an epoxy group is more preferable.

Examples of the compound having an epoxy group include a compound having one or more epoxy groups in one molecule. In particular, a compound having two or more epoxy groups in one molecule is preferable. The number of epoxy groups in one molecule is preferably 1 to 100. The upper limit of the number of epoxy groups is, for example, 10 or less or 5 or less. The lower limit of the number of epoxy groups is preferably 2 or more.

The compound having an epoxy group may be a low molecular weight compound (for example, molecular weight:lower than 2000 or lower than 1000) or a high molecular weight compound (macromolecule; for example, molecular weight: 1000 or higher, and in the case of a polymer, weight-average molecular weight: 1000 or higher). The weight-average molecular weight of the compound having an epoxy group is preferably 200 to 100000 and more preferably 500 to 50000. The upper limit of the weight-average molecular weight is preferably 10000 or lower, more preferably 5000 or lower, and still more preferably 3000 or lower.

In a case where the compound having an epoxy group is a low molecular weight compound, the compound having an epoxy group is, for example, a compound represented by the following Formula (EP1).

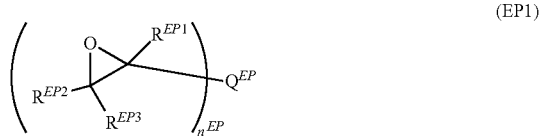
(EP1)

In Formula (EP1), $R^{EP1}$ to $R^{EP3}$ each independently represent a hydrogen atom, a halogen atom, or an alkyl group. The alkyl group may have a cyclic structure or may have a substituent. In addition, $R^{EP1}$ and $R^{EP2}$, or $R^{EP}2$ and $R^{EP3}$ may be bonded to each other to form a ring structure. $Q^{EP}$ represents a single bond or a $n^{EP}$-valent organic group. $R^{EP1}$ to $R^{EP3}$ may be bonded to $Q^{EP}$ to form a ring structure. $n^{EP}$ represents an integer of 2 or more, preferably 2 to 10, and more preferably 2 to 6. In a case where $Q^{EP}$ represents a single bond, $n^{EP}$ represents 2.

The details of $R^{EP1}$ to $R^{EP3}$ and $Q^{EP}$ can be found in paragraphs "0087" and "0088" of JP2014-089408A, the content of which is incorporated herein by reference. Specific examples of the compound represented by Formula (EP1) include a compound described in paragraph "0090" of JP2014-089408A and a compound described in paragraph "0151" of JP2010-054632A, the content of which is incorporated herein by reference.

As the low molecular weight compound, a commercially available product can also be used. Examples of the commercially available product include ADEKA GLYCILOL series manufactured by Adeka Corporation (for example, ADEKA GLYCILOL ED-505) and EPOLEAD series manufactured by Daicel Corporation (for example, EPOLEAD GT401).

As the compound having an epoxy group, an epoxy resin can be preferably used. Examples of the epoxy resin include an epoxy resin which is a glycidyl-etherified product of a phenol compound, an epoxy resin which is a glycidyl-etherified product of various novolac resins, an alicyclic epoxy resin, an aliphatic epoxy resin, a heterocyclic epoxy resin, a glycidyl ester epoxy resin, a glycidyl amine epoxy resin, an epoxy resin which is a glycidylated product of a halogenated phenol, a condensate of a silicon compound having an epoxy group and another silicon compound, and a copolymer of a polymerizable unsaturated compound having an epoxy group and another polymerizable unsaturated compound.

The epoxy equivalent of the epoxy resin is preferably 310 to 3300 g/eq, more preferably 310 to 1700 g/eq, and still more preferably 310 to 1000 g/eq.

As the epoxy resin, a commercially available product can also be used. Examples of the commercially available product include EHPE 3150 (manufactured by Daicel Corporation), EPICLON N-695 (manufactured by DIC Corporation), and MARPROOF G-0150M, G-0105SA, G-0130SP, G-0250SP, G-1005S, G-1005SA, G-1010S, G-2050M, G-01100, or G-01758 (manufactured by NOF Corporation, an epoxy group-containing polymer).

In the present invention, as the compound having an epoxy group, compounds described in paragraphs "0034" to "0036" of JP2013-011869A, paragraphs "0147" to "0156" of JP2014-043556A, and paragraphs "0085" to "0092" of JP2014-089408A can also be used. The contents of this specification are incorporated herein by reference.

In a case where the near infrared transmitting filter-forming composition includes the cationicallypolymerizable compound, the content of the cationicallypolymerizable compound is preferably 0.1 to 40% by mass with respect to the total solid content of the near infrared transmitting filter-forming composition. For example, the lower limit is preferably 0.5% by mass or higher and more preferably 1% by mass or higher. For example, the upper limit is more preferably 30% by mass or lower and still more preferably 20% by mass or lower. As the cationicallypolymerizable compound, one kind may be used alone, or two or more kinds may be used in combination. In a case where two or more cationicallypolymerizable compounds are used in combination, it is preferable that the total content of the two or more cationicallypolymerizable compounds is in the above-described range.

In addition, in a case where the near infrared transmitting filter-forming composition includes the radically polymerizable compound and the cationicallypolymerizable compound, a mass ratio radically polymerizable compound:cationicallypolymerizable compound is preferably 100:1 to 100:400 and more preferably 100:1 to 100:100.

<<Photoinitiator>>

The near infrared transmitting filter-forming composition may further include a photoinitiator. Examples of the photoinitiator include a photoradical polymerization initiator and a photocationic polymerization initiator. It is preferable that the photoinitiator is selected and used according to the kind of the curable compound. In a case where the radically polymerizable compound is used as the curable compound, it is preferable that the photoradical polymerization initiator is used as the photoinitiator. In a case where the cationicallypolymerizable compound is used as the curable compound, it is preferable that the photocationic polymerization initiator is used as the photoinitiator. The photoinitiator is not particularly limited and can be appropriately selected from well-known photoinitiators. For example, a compound having photosensitivity to light in a range from an ultraviolet range to a visible range is preferable.

The content of the photoinitiator is preferably 0.1 to 50% by mass, more preferably 0.5 to 30% by mass, and still more preferably 1 to 20% by mass with respect to the total solid content of the near infrared transmitting filter-forming composition. In a case where the content of the photoinitiator is in the above-described range, higher sensitivity and pattern formability can be obtained. The near infrared transmitting filter-forming composition may include one photoinitiator or two or more photoinitiators. In a case where the composition includes two or more photoinitiators, it is preferable that the total content of the photopolymerization initiators is in the above-described range.

(Photoradical Polymerization Initiator)

Examples of the photoradical polymerization initiator include a halogenated hydrocarbon derivative (for example, a compound having a triazine skeleton or a compound having an oxadiazole skeleton), an acylphosphine compound, a hexaarylbiimidazole, an oxime compound, an organic peroxide, a thio compound, a ketone compound, an aromatic onium salt, an a-hydroxyketone compound, and an a-aminoketone compound. In addition, from the viewpoint of exposure sensitivity, as the photopolymerization initiator, a trihalomethyltriazine compound, a benzyldimethylketal compound, an a-hydroxyketone compound, an a-aminoketone compound, an acylphosphine compound, a phosphine oxide compound, a metallocene compound, an oxime compound, a triarylimidazole dimer, an onium compound, a benzothiazole compound, a benzophenone compound, an acetophenone compound, a cyclopentadiene-benzene-iron complex, a halomethyloxadiazole compound, or a 3-aryl-substituted coumarin compound is preferable, a compound selected from an oxime compound, an a-hydroxy ketone compound, an a-aminoketone compound, and an acylphosphine compound is more preferable, and an oxime compound is still more preferable. The details of the photoradical polymerization initiator can be found in paragraphs "0065" to "0111" of JP2014-130173A, the content of which is incorporated herein by reference.

Examples of a commercially available product of the a-hydroxyketone compound include IRGACURE-184, DAROCUR-1173, IRGACURE-500, IRGACURE-2959, and IRGACURE-127 (all of which are manufactured by BASF SE). Examples of a commercially available product of the a-aminoketone compound include IRGACURE-907, IRGACURE-369, IRGACURE-379, and IRGACURE-379EG (all of which are manufactured by BASF SE). Examples of a commercially available product of the acylphosphine compound include IRGACURE-819, and DAROCUR-TPO (all of which are manufactured by BASF SE).

Examples of the oxime compound include a compound described in JP2001-233842A, a compound described in JP2000-080068A, a compound described in JP2006-342166A, a compound described in J. C. S. Perkin II (1979, pp. 1653 to 1660), a compound described in J. C. S. Perkin II (1979, pp. 156 to 162), a compound described in Journal of Photopolymer Science and Technology (1995, pp. 202 to 232), a compound described in JP2000-066385A, a compound described in JP2000-080068A, a compound described in JP2004-534797A, a compound described in JP2006-342166A, a compound described in JP2017-019766A, a compound described in JP6065596B, a compound described in WO2015/152153A, and a compound described in WO2017/051680A. Specific examples of the oxime compound include 3-benzoyloxyiminobutane-2-one, 3-acetoxyiminobutane-2-one, 3-propionyloxyiminobutane-2-one, 2-acetoxyiminopentane-3-one, 2-acetoxyimino-1-phenylpropane-1-one, 2-benzoyloxyimino-1-phenylpropane-1-one, 3-(4-toluene sulfonyloxy)iminobutane-2-one, and 2-ethoxycarbonyloxyimino-1-phenylpropane-1-one. Examples of a commercially available product of the oxime compound include IRGACURE-OXE01, IRGACURE-OXE02, IRGACURE-OXE03, or IRGACURE-OXE04 (all of which are manufactured by BASF SE), TR-PBG-304 (manufactured by Changzhou Tronly New Electronic Materials Co., Ltd.), and ADEKA OPTOMER N-1919 (manufactured by Adeka Corporation, a photopolymerization initiator 2 described in JP2012-014052A). As the oxime compound, a compound having no colorability or a compound having high transparency that is not likely to be discolored can also be preferably used. Examples of a commercially available product of the oxime compound include ADEKA ARKLS NCI-730, NCI-831, and NCI-930 (all of which are manufactured by Adeka Corporation).

In the present invention, an oxime compound having a fluorene ring can also be used as the photopolymerization initiator. Specific examples of the oxime compound having a fluorene ring include a compound described in JP2014-137466A. The content of this specification is incorporated herein by reference.

In the present invention, an oxime compound having a fluorine atom can also be used as the photoradical polymerization initiator. Specific examples of the oxime compound having a fluorine atom include a compound described in JP2010-262028A, Compound 24 and 36 to 40 described in JP2014-500852A, and Compound (C-3) described in JP2013-164471A. The content of this specification is incorporated herein by reference.

In the present invention, as the photoradical polymerization initiator, an oxime compound having a nitro group can be used. It is preferable that the oxime compound having a nitro group is a dimer. Specific examples of the oxime compound having a nitro group include a compound described in paragraphs "0031" to "0047" of JP2013-114249A and paragraphs "0008" to "0012" and "0070" to "0079" of JP2014-137466A, a compound described in paragraphs "0007" to "0025" of JP4223071B, and ADEKA ARKLS NCI-831 (manufactured by Adeka Corporation).

In the present invention, an oxime compound having a benzofuran skeleton can also be used as the photoradical polymerization initiator. Specific examples include OE-01 to OE-75 described in WO2015/036910A.

Specific examples of the oxime compound which are preferably used in the present invention are shown below, but the present invention is not limited thereto.

(C-1)

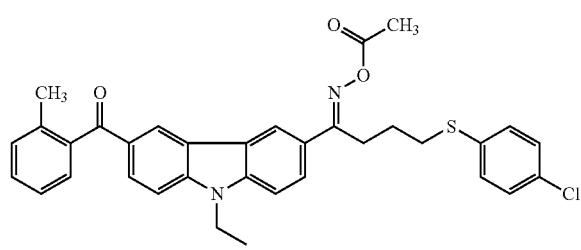

-continued
(C-2)
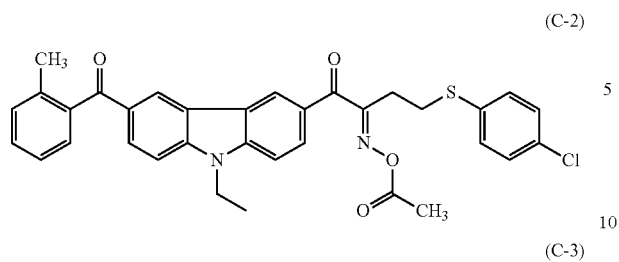
(C-3)
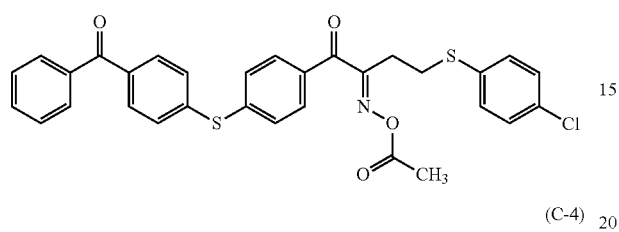
(C-4)
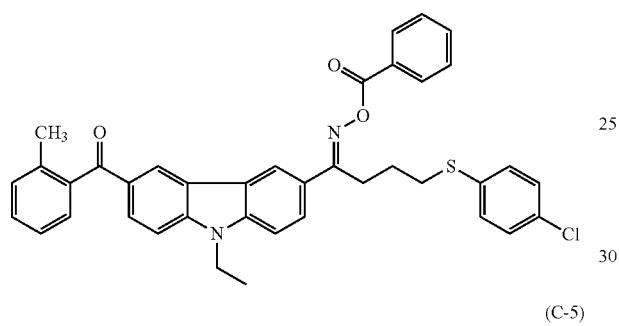
(C-5)
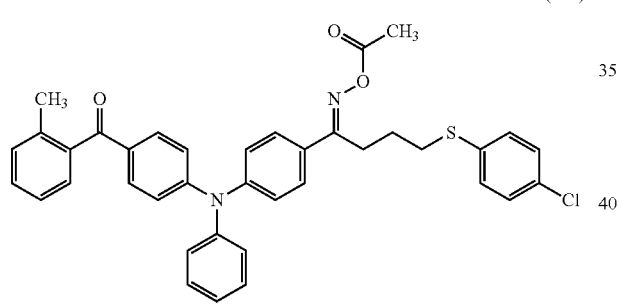
(C-6)
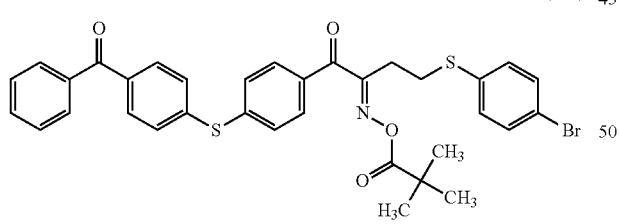
(C-7)
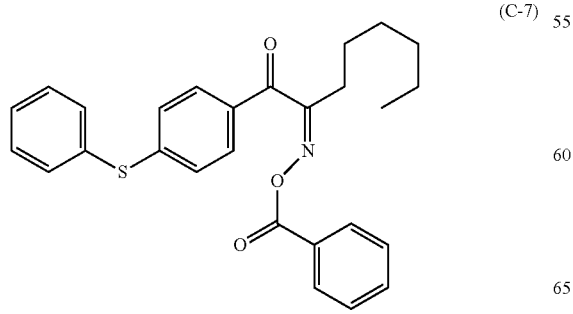
-continued
(C-8)
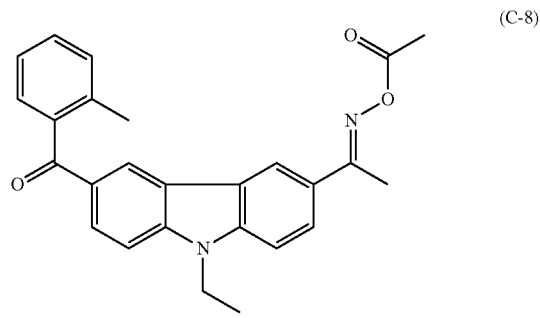
(C-9)
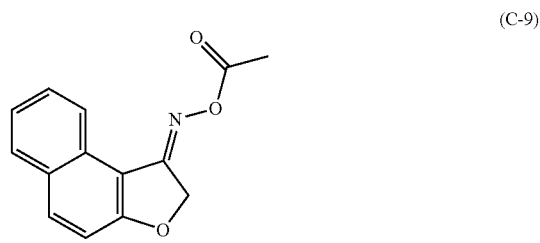
(C-10)
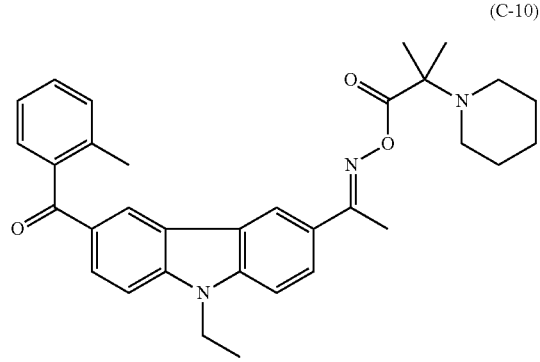
(C-11)
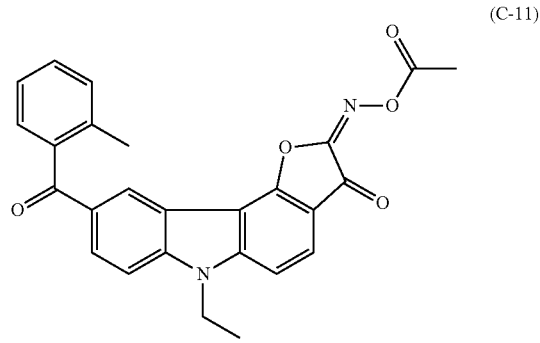
(C-12)
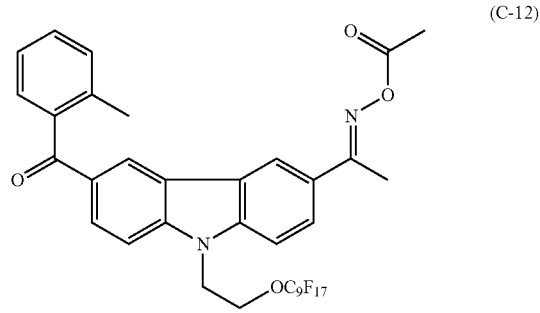

-continued (C-13)

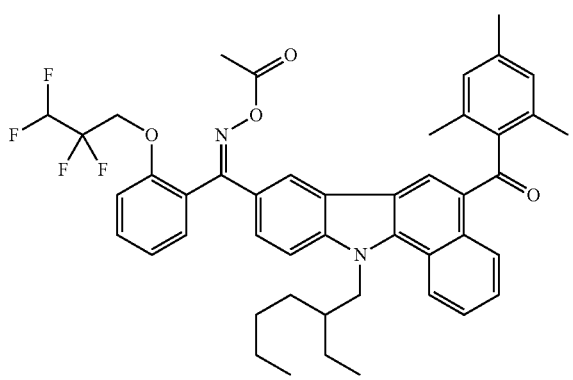

(C-14)

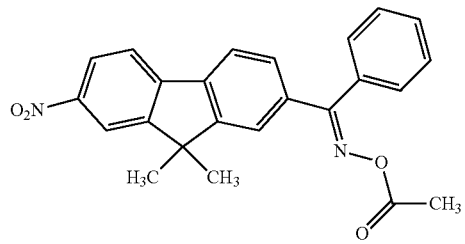

(C-15)

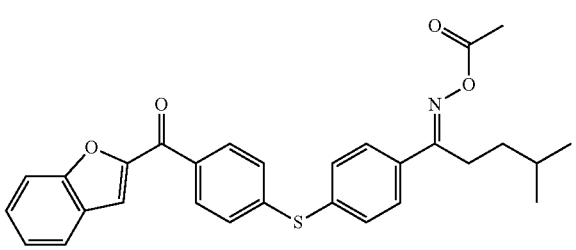

(C-16)

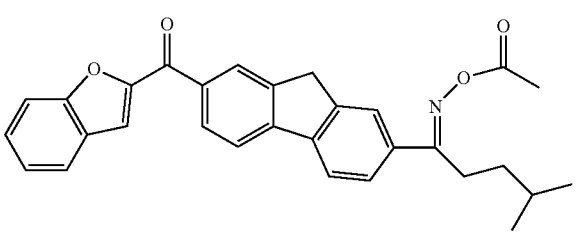

The oxime compound is preferably a compound having a maximum absorption wavelength in a wavelength range of 350 to 500 nm and more preferably a compound having a maximum absorption wavelength in a wavelength range of 360 to 480 nm. In addition, the molar absorption coefficient of the oxime compound at a wavelength of 365 nm or a wavelength of 405 nm is preferably high, more preferably 1,000 to 300,000, still more preferably 2,000 to 300,000, and still more preferably 5,000 to 200,000 from the viewpoint of sensitivity. The molar absorption coefficient of the compound can be measured using a well-known method. For example, it is preferable that the molar absorption coefficient can be measured using a spectrophotometer (Cary-5 spectrophotometer, manufactured by Varian Medical Systems, Inc.) and ethyl acetate as a solvent at a concentration of 0.01 g/L.

In the present invention, as the photoradical polymerization initiator, a photoradical polymerization initiator having two functional groups or three or more functional groups may be used. Specific examples of the photoradical polymerization initiator include a dimer of an oxime compound described in JP2010-527339A, JP2011-524436A, WO2015/004565A, paragraphs "0417" to "0412" of JP2016-532675A, or paragraphs "0039" to "0055" of WO2017/033680A, a compound (E) and a compound (G) described in JP2013-522445A, and Cmpd 1 to 7 described in WO2016/034963A.

It is preferable that the photoradical polymerization initiator includes an oxime compound and an a-aminoketone compound. By using the oxime compound and the a-aminoketone compound in combination, the developability is improved, and a pattern having excellent rectangularity is likely to be formed. In a case where the oxime compound and the a-aminoketone compound are used in combination, the content of the a-aminoketone compound is preferably 50 to 600 parts by mass and more preferably 150 to 400 parts by mass with respect to 100 parts by mass of the oxime compound.

The content of the photoradical polymerization initiator is preferably 0.1 to 50% by mass, more preferably 0.5 to 30% by mass, and still more preferably 1 to 20% by mass with respect to the total solid content of the near infrared transmitting filter-forming composition.

In a case where the content of the photoradical polymerization initiator is in the above-described range, higher sensitivity and pattern formability can be obtained. The near infrared transmitting filter-forming composition may include only one photoradical polymerization initiator or two or more photoradical polymerization initiators. In a case where the composition includes two or more photoradical polymerization initiators, it is preferable that the total content of the photoradical polymerization initiators is in the above-described range.

(Photocationic Polymerization Initiator)

Examples of the photocationic polymerization initiator include a photoacid generator. Examples of the photoacid generator include compounds which are decomposed by light irradiation to generate an acid including: an onium salt compound such as a diazonium salt, a phosphonium salt, a sulfonium salt, or an iodonium salt; and a sulfonate compound such as imidosulfonate, oximesulfonate, diazodisulfone, disulfone, or o-nitrobenzyl sulfonate. The details of the photocationic polymerization initiator can be found in paragraphs "0139" to "0214" of JP2009-258603A, the content of which is incorporated herein by reference.

The content of the photocationic polymerization initiator is preferably 0.1 to 50% by mass, more preferably 0.5 to 30% by mass, and still more preferably 1 to 20% by mass with respect to the total solid content of the near infrared transmitting filter-forming composition. In a case where the content of the photocationic polymerization initiator is in the above-described range, higher sensitivity and pattern formability can be obtained. The near infrared transmitting filter-forming composition may include only one photocationic polymerization initiator or two or more photocationic polymerization initiators. In a case where the composition includes two or more photocationic polymerization initiators, it is preferable that the total content of the two or more photocationic polymerization initiators is in the above-described range.

<<Polyfunctional Thiol>>

The near infrared transmitting filter-forming composition may further include a polyfunctional thiol. The polyfunctional thiol is a compound having two or more thiol (SH) groups. By using the above-described photoradical polymerization initiator in combination, the polyfunctional thiol functions as a chain transfer agent in the process of radical polymerization after light irradiation such that a thiyl radical that is not likely to undergo polymerization inhibition due to oxygen is generated. Therefore, the sensitivity of the near infrared transmitting filter-forming composition can be improved. In particular, it is preferable that the SH group is a polyfunctional aliphatic thiol that is bonded to an aliphatic group such as an ethylene group.

Examples of the polyfunctional thiol include hexanedithiol, decanedithiol, 1,4-butanediol bisthio propionate, 1,4-butanediolbisthioglycolate, ethylene glycol bisthioglycolate, ethylene glycol bisthiopropionate, trimethylolpropane tristhioglycolate, trimethylolpropane tristhiopropionate, trimethylolethane tris(3-mercaptobutyrate), trimethylolpropane tris(3-mercaptobutyrate), trimethylolpropane tris(3-mercaptopropionate), pentaerythritol tetrakisthioglycolate, pentaerythritol tetrakisthiopropionate, pentaerythritol tetrakis(3-mercaptopropionate), dipentaerythritol hexakis(3-mercaptopropionate), trimercaptopropionic acid tris(2-hydroxyethyl)isocyanurate, 1,4-dimethylmercaptobenzene, 2,4,6-trimercapto-s-triazine, and 2-(N,N-dibutylamino)-4,6-dimercapto-s-triazine. In addition, for example, a compound having the following structure can also be used.

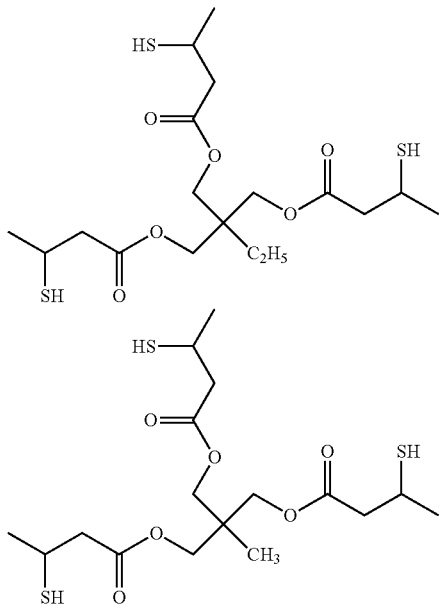

The content of the polyfunctional thiol is preferably 0.1 to 20% by mass, more preferably 0.1 to 15% by mass, and still more preferably 0.1 to 10% by mass with respect to the total solid content of the near infrared transmitting filter-forming composition. The near infrared transmitting filter-forming composition may include one polyfunctional thiol or two or more polyfunctional thiols. In a case where the composition includes two or more, it is preferable that the total content is in the above-described range.

<<Resin>>

It is preferable that the near infrared transmitting filter-forming composition includes a resin. The resin is mixed, for example, in order to disperse the pigment and the like in the composition or to be used as a binder. The resin which is mainly used to disperse the pigments and the like will also be called a dispersant. However, the above-described uses of the resin are merely exemplary, and the resin can be used for purposes other than the uses.

The weight-average molecular weight (Mw) of the resin is preferably 2,000 to 2,000,000. The upper limit is preferably 1,000,000 or lower and more preferably 500,000 or lower. The lower limit is preferably 3,000 or higher and more preferably 5,000 or higher.

Examples of the resin include a (meth)acrylic resin, an epoxy resin, an enethiol resin, a polycarbonate resin, a polyether resin, a polyarylate resin, a polysulfone resin, a polyethersulfone resin, a polyphenylene resin, a polyarylene ether phosphine oxide resin, a polyimide resin, a polyamide imide resin, a polyolefin resin, a cyclic olefin resin, a polyester resin, and a styrene resin. Among these resins, one kind may be used alone, or a mixture of two or more kinds may be used. In addition, as the resin, a resin described in Examples of WO2016/088645A, a resin described in JP2017-057265A, a resin described in JP2017-032685A, a resin described in JP2017-075248A, or a resin described in JP2017-066240A can also be used, the contents of which are incorporated herein by reference. In addition, a resin having a fluorene skeleton can also be preferably used. Examples of the resin having a fluorene skeleton include a resin having the following structure. In the following structural formula, A represents a residue of a carboxylic dianhydride selected from pyromellitic dianhydride, benzophenone tetracarboxylic dianhydride, biphenyl tetracarboxylic dianhydride, or diphenyl ether tetracarboxylic dianhydride, and M represents a phenyl group or a benzyl group. The details of the resin having a fluorene skeleton can be found in US2017/0102610A, the content of which is incorporated herein by reference.

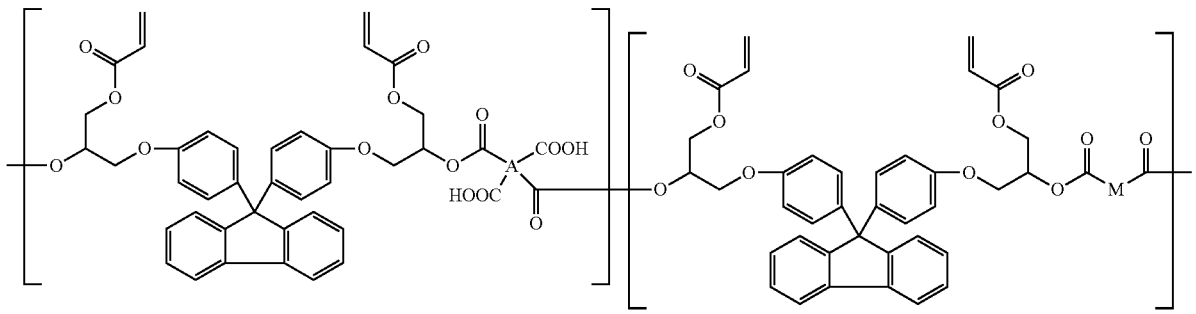

The resin used in the present invention may have an acid group. Examples of the acid group include a carboxyl group, a phosphate group, a sulfo group, and a phenolic hydroxy group. Among these, a carboxyl group is preferable. These acid groups, one kind may be used alone, or two or more kinds may be used in combination. The resin having an acid group can be used as an alkali-soluble resin.

As the resin having an acid group, a polymer having a carboxyl group at a side chain is preferable. Specific examples of the resin include an alkali-soluble phenol resin such as a methacrylic acid copolymer, an acrylic acid copolymer, an itaconic acid copolymer, a crotonic acid copolymer, a maleic acid copolymer, a partially esterified maleic acid copolymer, or a novolac resin, an acidic cellulose derivative having a carboxyl group at a side chain thereof, and a resin obtained by adding an acid anhydride to a polymer having a hydroxy group. In particular, a copolymer of (meth)acrylic acid and another monomer which is copolymerizable with the (meth)acrylic acid is preferable as the alkali-soluble resin. Examples of the monomer which is copolymerizable with the (meth)acrylic acid include an alkyl (meth)acrylate, an aryl (meth)acrylate, and a vinyl compound. Examples of the alkyl (meth)acrylate and the aryl (meth)acrylate include methyl (meth)acrylate, ethyl (meth) acrylate, propyl (meth)acrylate, butyl (meth)acrylate, isobutyl (meth)acrylate, pentyl (meth)acrylate, hexyl (meth) acrylate, octyl (meth)acrylate, phenyl (meth)acrylate, benzyl (meth)acrylate, tolyl (meth)acrylate, naphthyl (meth)acrylate, and cyclohexyl (meth)acrylate. Examples of the vinyl compound include styrene, a-methylstyrene, vinyl toluene, glycidyl methacrylate, acrylonitrile, vinyl acetate, N-vinylpyrrolidone, tetrahydrofurfuryl methacrylate, a polystyrene macromonomer, and a polymethyl methacrylate macromonomer. Examples of other monomers include a N-position-substituted maleimide monomer described in JP1998-300922A (JP-H10-300922A) such as N-phenylmaleimide or N-cyclohexylmaleimide. Among these monomers which are copolymerizable with the (meth)acrylic acid, one kind may be used alone, or two or more kinds may be used in combination.

The resin having an acid group may further have a polymerizable group. Examples of the polymerizable group include an allyl group, a methallyl group, and a (meth) acryloyl group. Examples of a commercially available product of the resin include DIANAL NR series (manufactured by Mitsubishi Rayon Co., Ltd.), PHOTOMER 6173 (a carboxyl group-containing polyurethane acrylate oligomer; manufactured by Diamond Shamrock Co., Ltd.), VISCOAT R-264 and KS Resist 106 (both of which are manufactured by Osaka Organic Chemical Industry Ltd.), CYCLOMER P series (for example, ACA230AA, ACA250, and the like) and PLAKCEL CF200 series (both of which manufactured by Daicel Corporation), EBECRYL 3800 (manufactured by Daicel-UCB Co., Ltd.), and ACRYCURE RD-F8 (manufactured by Nippon Shokubai Co., Ltd.).

As the resin having an acid group, a copolymer including benzyl (meth)acrylate and (meth)acrylic acid; a copolymer including benzyl (meth)acrylate, (meth)acrylic acid, and 2-hydroxyethyl (meth)acrylate; or a multi-component copolymer including benzyl (meth)acrylate, (meth)acrylic acid, and another monomer can be preferably used. In addition, copolymers described in JP1995-140654A (JP-H7-140654A) obtained by copolymerization of 2-hydroxyethyl (meth)acrylate can be preferably used, and examples thereof include: a copolymer including 2-hydroxypropyl (meth) acrylate, a polystyrene macromonomer, benzyl methacrylate, and methacrylic acid; a copolymer including 2-hydroxy-3-phenoxypropyl acrylate, a polymethyl methacrylate macromonomer, benzyl methacrylate, and methacrylic acid; a copolymer including 2-hydroxyethyl methacrylate, a polystyrene macromonomer, methyl methacrylate, and methacrylic acid; or a copolymer including 2-hydroxyethyl methacrylate, a polystyrene macromonomer, benzyl methacrylate, and methacrylic acid.

As the resin having an acid group, a polymer that includes a repeating unit derived from monomer components including a compound represented by the following Formula (ED1) and/or a compound represented by the following Formula (ED2) (hereinafter, these compounds will also be referred to as "ether dimer") is also preferable.

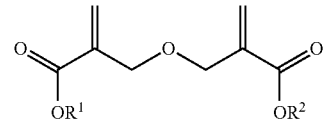
(ED1)

In Formula (ED1), $R^1$ and $R^2$ each independently represent a hydrogen atom or a hydrocarbon group having 1 to 25 carbon atoms which may have a substituent.

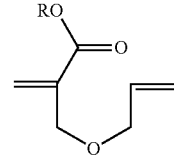
(ED2)

In Formula (ED2), R represents a hydrogen atom or an organic group having 1 to 30 carbon atoms. Specific examples of Formula (ED2) can be found in the description of JP2010-168539A.

Specific examples of the ether dimer can be found in paragraph "0317" of JP2013-029760A, the content of which is incorporated herein by reference. Among these ether dimers, one kind may be used alone, or two or more kinds may be used in combination.

The resin having an acid group may include a repeating unit which is derived from a compound represented by the following Formula (X).

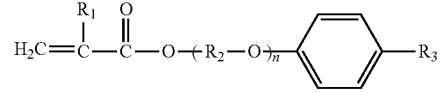
(X)

In Formula (X), $R_1$ represents a hydrogen atom or a methyl group, $R_2$ represents an alkylene group having 2 to 10 carbon atoms, and $R_3$ represents a hydrogen atom or an alkyl group having 1 to 20 carbon atoms which may have a benzene ring. n represents an integer of 1 to 15.

The details of the resin having an acid group can be found in paragraphs "0558" to "0571" of JP2012-208494A (corresponding to paragraphs "0685" to "0700" of US2012/0235099A) and paragraphs "0076" to "0099" of JP2012-198408A, the contents of which are incorporated herein by reference. In addition, as the resin having an acid group, a commercially available product may also be used. Examples of the commercially available product include ACRYBASE FF-426 (manufactured by Fujikura Kasei Co., Ltd.).

The acid value of the resin having an acid group is preferably 30 to 200 mgKOH/g. The lower limit is preferably 50 mgKOH/g or higher and more preferably 70 mgKOH/g or higher. The upper limit is preferably 150 mgKOH/g or lower and more preferably 120 mgKOH/g or lower.

Examples of the resin having an acid group include resins having the following structures. In the following structural formulae, Me represents a methyl group.

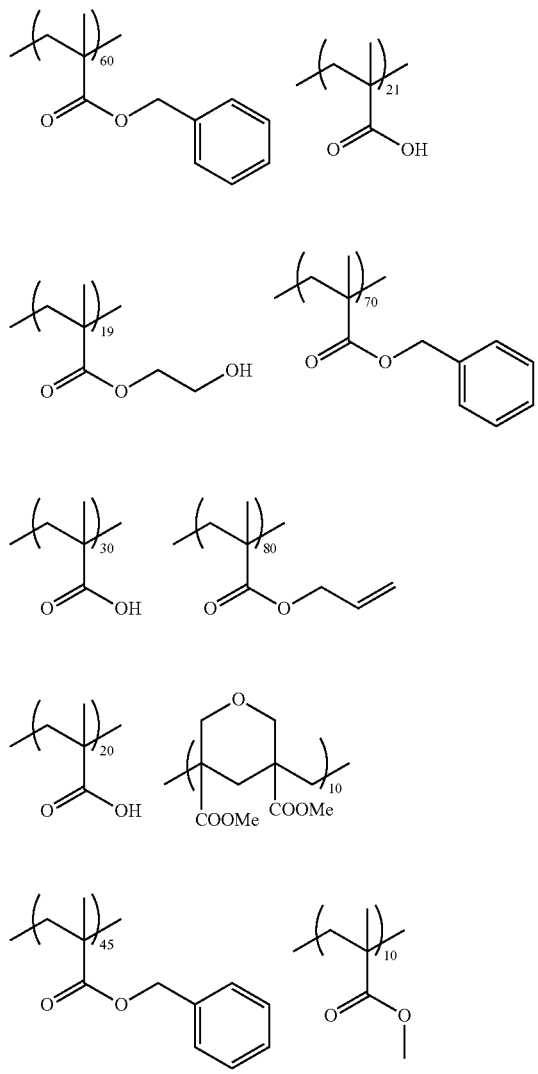

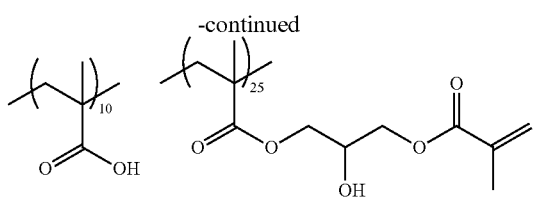

The near infrared transmitting filter-forming composition may include a resin as a dispersant. Examples of the dispersant include an acidic dispersant (acidic resin) and a basic dispersant (basic resin). Here, the acidic dispersant (acidic resin) refers to a resin in which the amount of an acid group is more than the amount of a basic group. In a case where the sum of the amount of an acid group and the amount of a basic group in the acidic dispersant (acidic resin) is represented by 100 mol %, the amount of the acid group in the acidic resin is preferably 70 mol % or higher and more preferably substantially 100 mol %. The acid group in the acidic dispersant (acidic resin) is preferably a carboxyl group. An acid value of the acidic dispersant (acidic resin) is preferably 40 to 105 mgKOH/g, more preferably 50 to 105 mgKOH/g, and still more preferably 60 to 105 mgKOH/g. In addition, the basic dispersant (basic resin) refers to a resin in which the amount of a basic group is more than the amount of an acid group. In a case where the sum of the amount of an acid group and the amount of a basic group in the basic dispersant (basic resin) is represented by 100 mol %, the amount of the basic group in the basic resin is preferably higher than 50 mol %. The basic group in the basic dispersant is preferably an amino group.

It is preferable that the resin A used as the dispersant further includes a repeating unit having an acid group. By the resin, which is used as the dispersant, including the repeating unit having an acid group, in a case where a pattern is formed using a photolithography method, the amount of residues formed in an underlayer of a pixel can be reduced.

It is preferable that the resin used as the dispersant is a graft copolymer. Since the graft copolymer has affinity to the solvent due to the graft chain, the pigment dispersibility and the dispersion stability over time are excellent. The details of the graft copolymer can be found in the description of paragraphs "0025" to "0094" of JP2012-255128A, the content of which is incorporated herein by reference. In addition, specific examples of the graft copolymer include the following resins. The following resin may also be a resin having an acid group (alkali-soluble resin). In addition, other examples of the graft copolymer include resins described in paragraphs "0072" to "0094" of JP2012-255128A, the content of which is incorporated herein by reference.

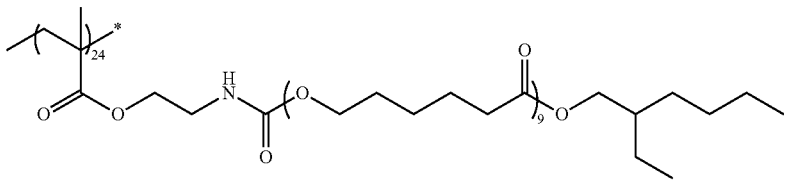

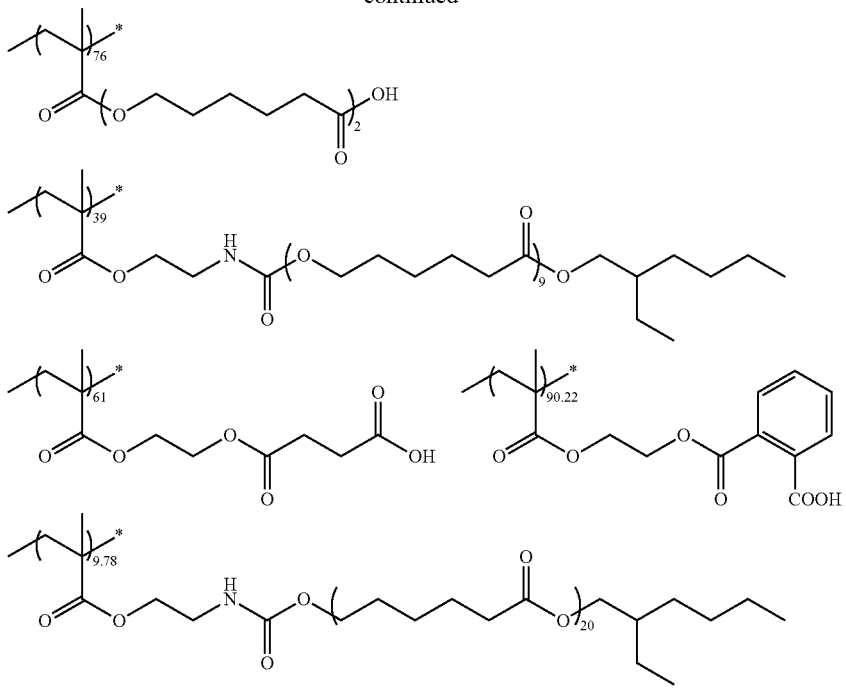

In addition, in the present invention, as the resin (dispersant), an oligoimine dispersant having a nitrogen atom at at least either a main chain or a side chain is also preferably used. As the oligoimine dispersant, a resin, which includes a structural unit having a partial structure X with a functional group (pKa: 14 or lower) and a side chain including a side chain Y having 40 to 10000 atoms and has a basic nitrogen atom at at least either a main chain or a side chain, is preferable. The basic nitrogen atom is not particularly limited as long as it is a nitrogen atom exhibiting basicity. The oligoimine dispersant can be found in the description of paragraphs "0102" to "0166" of JP2012-255128A, the content of which is incorporated herein by reference. As the oligoimine dispersant, a resin having the following structure or a resin described in paragraphs "0168" to "0174" of JP2012-255128A can be used.

The dispersant is available as a commercially available product, and specific examples thereof include BYK 2000 (manufactured by BYK Chemie). In addition, a pigment dispersant described in paragraphs "0041" to "0130" of JP2014-130338A can also be used, the content of which is incorporated herein by reference. In addition, the resin having an acid group or the like can also be used as a dispersant.

In a case where the near infrared transmitting filter-forming composition includes a resin, the content of the resin is preferably 1 to 50% by mass with respect to the total solid content of the near infrared transmitting filter-forming composition. The lower limit is preferably 2% by mass or higher, more preferably 3% by mass or higher, still more preferably 5% by mass or higher, and still more preferably 10% by mass or higher. The upper limit is more preferably

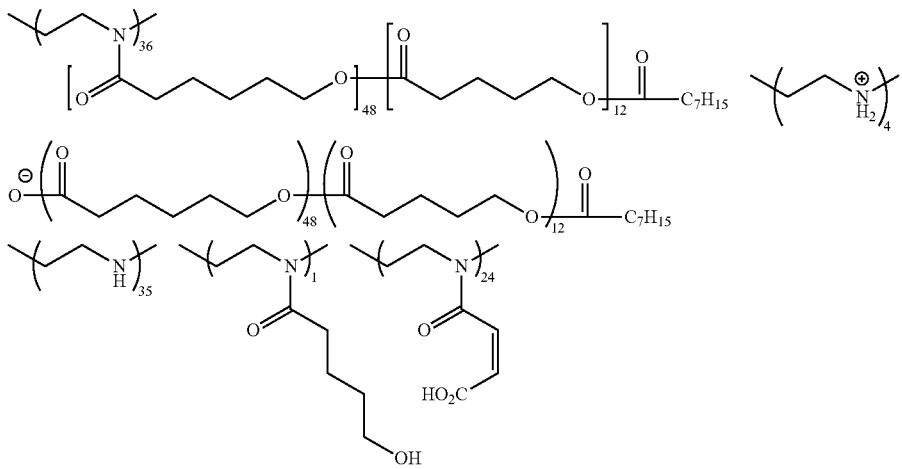

40% by mass or lower and still more preferably 30% by mass or lower. In addition, the content of the resin having an acid group is preferably 1 to 50% by mass with respect to the total solid content of the near infrared transmitting filter-forming composition. The lower limit is preferably 2% by mass or higher, more preferably 3% by mass or higher, still more preferably 5% by mass or higher, and still more preferably 10% by mass or higher. The upper limit is more preferably 40% by mass or lower and still more preferably 30% by mass or lower. The near infrared transmitting filter-forming composition may include one resin or two or more resins. In a case where the composition includes two or more, it is preferable that the total content is in the above-described range.

In a case where the near infrared transmitting filter-forming composition includes the radically polymerizable compound and the resin, a mass ratio radically polymerizable compound/resin of the radically polymerizable compound to the resin is preferably 0.4 to 1.4. The lower limit of the mass ratio is preferably 0.5 or higher and more preferably 0.6 or higher. The upper limit of the mass ratio is preferably 1.3 or lower and more preferably 1.2 or lower. In a case where the mass ratio is in the above-described range, a pattern having more excellent rectangularity can be formed.

In addition, it is preferable that a mass ratio radically polymerizable compound/resin having an acid group of the radically polymerizable compound to the resin having an acid group is 0.4 to 1.4. The lower limit of the mass ratio is preferably 0.5 or higher and more preferably 0.6 or higher. The upper limit of the mass ratio is preferably 1.3 or lower and more preferably 1.2 or lower. In a case where the mass ratio is in the above-described range, a pattern having more excellent rectangularity can be formed.

<<Pigment Derivative>>

The near infrared transmitting filter-forming composition may further include a pigment derivative. Examples of the pigment derivative include a compound having a structure in which a portion of a pigment is substituted with an acid group, a basic group, a group having a salt structure, or a phthalimidomethyl group. As the pigment derivative, a compound represented by Formula (B1) is preferable.

In Formula (B1), P represents a colorant structure, L represents a single bond or a linking group, X represents an acid group, a basic group, a group having a salt structure, or a phthalimidomethyl group, m represents an integer of 1 or more, n represents an integer of 1 or more, in a case where m represents 2 or more, a plurality of L's and a plurality of X's may be different from each other, and in a case where n represents 2 or more, a plurality of X's may be different from each other.

As the colorant structure represented by P, preferably at least one selected from a pyrrolopyrrole colorant structure, a diketopyrrolopyrrole colorant structure, a quinacridone colorant structure, an anthraquinone colorant structure, a dianthraquinone colorant structure, a benzoisoindole colorant structure, a thiazine indigo colorant structure, an azo colorant structure, a quinophthalone colorant structure, a phthalocyanine colorant structure, a naphthalocyanine colorant structure, a dioxazine colorant structure, a perylene colorant structure, a perinone colorant structure, a benzimidazolone colorant structure, a benzothiazole colorant structure, a benzimidazole colorant structure, or a benzoxazole colorant structure, more preferably at least one selected from a pyrrolopyrrole colorant structure, a diketopyrrolopyrrole colorant structure, a quinacridone colorant structure, or a benzimidazolone colorant structure, and still more preferably a pyrrolopyrrole colorant structure.

Examples of the linking group represented by L include a hydrocarbon group, a heterocyclic group, —NR—, —SO$_2$—, —S—, —O—, —CO—, and a group of a combination thereof. R represents a hydrogen atom, an alkyl group, or an aryl group.

Examples of the acid group represented by X include a carboxyl group, a sulfo group, a carboxylic acid amide group, a sulfonic acid amide group, and an imide acid group. As the carboxylic acid amide group, a group represented by —NHCOR$^{X1}$ is preferable. As the sulfonic acid amide group, a group represented by —NHSO$_2$R$^{X2}$ is preferable. As the imide acid group, a group represented by —SO$_2$NHSO$_2$R$^{X3}$, —CONHSO$_2$R$^{X4}$, —CONHCOR$^{X5}$, or —SO$_2$NHCOR$^{X6}$ is preferable. R$^{X1}$ to R$^{X6}$ each independently represent a hydrocarbon group or a heterocyclic group. The hydrocarbon group and the heterocyclic group represented by R$^{X1}$ to R$^{X6}$ may further have a substituent. Examples of the substituent which may be further included include the substituent T described above regarding Formula (PP). Among these, a halogen atom is preferable and a fluorine atom is more preferable. Examples of the basic group represented by X include an amino group. Examples of the salt structure represented by X include a salt of the acid group or the basic group described above.

Examples of the pigment derivative include compounds having the following structures. In addition, for example, compounds described in JP1981-118462A (JP-S56-118462A), JP1988-264674A (JP-S63-264674A), JP1989-217077A (JP-H1-217077A), JP1991-009961A (JP-H3-009961A), JP1991-026767A (JP-H3-026767A), JP1991-153780A (JP-H3-153780A), JP1991-045662A (JP-H3-045662A), JP 1992-285669A (JP-H4-285669A), JP 1994-145546A (JP-H6-145546A), JP1994-212088A (JP-H6-212088A), JP1994-240158A (JP-H6-240158A), JP 1998-030063A (JP-H10-030063A), JP 1998-195326A (JP-H10-195326A), paragraphs "0086" to "0098" of WO2011/024896A, paragraphs "0063" to "0094" of WO2012/102399A, paragraphs "0082" of WO2017/038252A, and JP 5299151B can be used, the content of which is incorporated herein by reference.

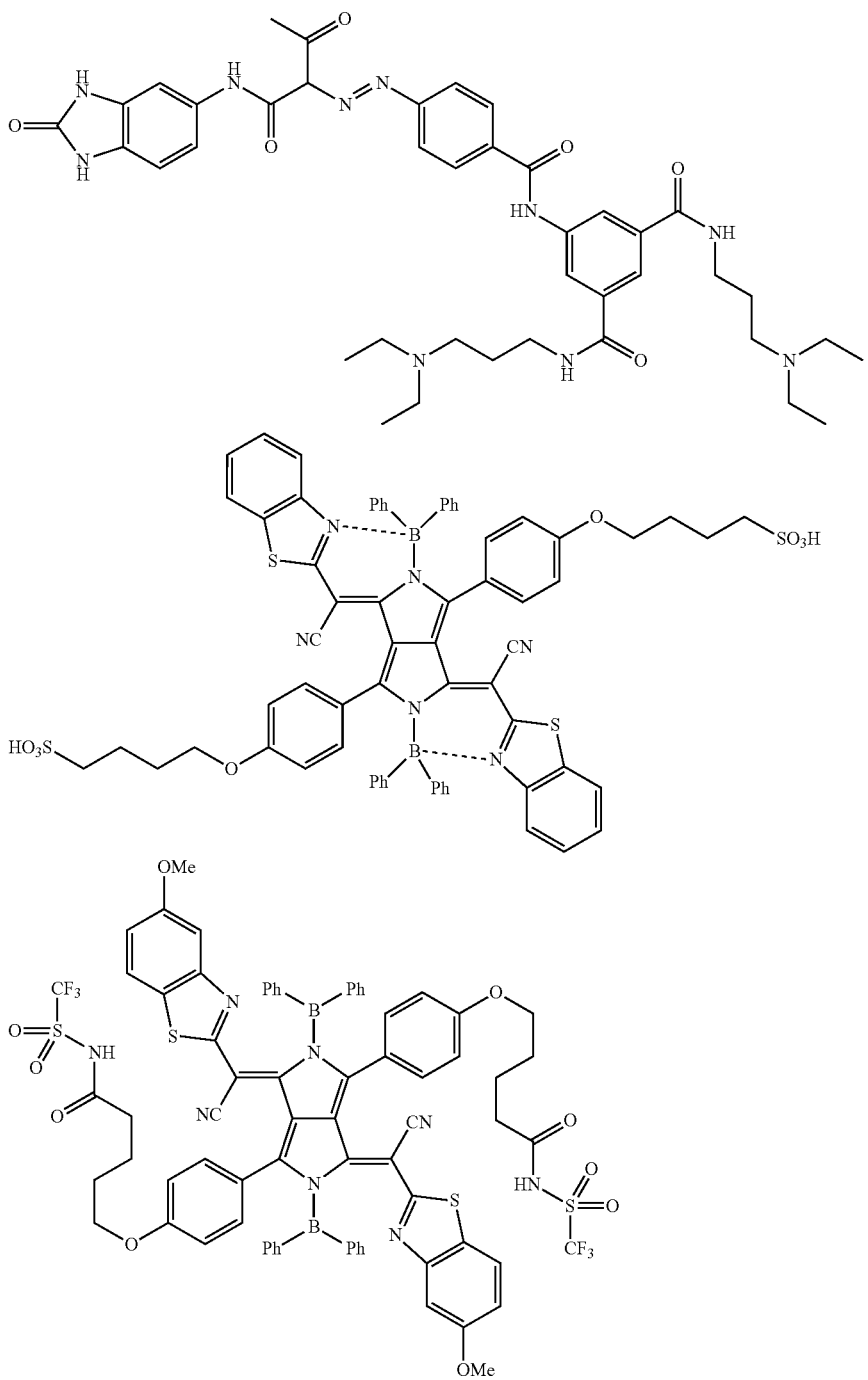

In a case where the near infrared transmitting filter-forming composition includes the pigment derivative, the content of the pigment derivative is preferably 1 to 50 parts by mass with respect to 100 parts by mass of the pigment. The lower limit value is preferably 3 parts by mass or more and more preferably 5 parts by mass or more. The upper limit value is preferably 40 parts by mass or less and more preferably 30 parts by mass or less. In a case where the content of the pigment derivative is in the above-described range, the pigment dispersibility can be improved, and aggregation of the pigment can be effectively suppressed. As the pigment derivative, one kind may be used alone, or two or more kinds may be used in combination. In a case where two or more pigment derivatives are used in combination, it is preferable that the total content of the two or more pigment derivatives is in the above-described range.

<<Solvent>>

The near infrared transmitting filter-forming composition may further include a solvent. Examples of the solvent include an organic solvent. Basically, the solvent is not particularly limited as long as it satisfies the solubility of the respective components and the application properties of the composition. Examples of the organic solvent include esters, ethers, ketones, and aromatic hydrocarbons. The details of the organic solvent can be found in paragraph "0223" of WO2015/166779A, the content of which is incorporated herein by reference. In addition, an ester solvent in which a cyclic alkyl group is substituted or a ketone solvent in which a cyclic alkyl group is substituted can also be preferably used. Specific examples of the organic solvent include dichloromethane, methyl 3-ethoxypropionate, ethyl 3-ethoxypropionate, ethyl cellosolve acetate, ethyl lactate, diethylene glycol dimethyl ether, butyl acetate, methyl 3-methoxypropionate, 2-heptanone, cyclohexanone, cyclohexyl acetate, cyclopentanone, ethyl carbitol acetate, butyl carbitol acetate, propylene glycol monomethyl ether, and propylene glycol monomethyl ether acetate. In the present invention, as the organic solvent, one kind may be used alone, or two or more kinds may be used in combination. In addition, 3-methoxy-N,N-dimethylpropanamide or 3-butoxy-N,N-dimethylpropanamide is also preferable from the viewpoint of improving solubility. In this case, it may be preferable that the content of the aromatic hydrocarbon (for example, benzene, toluene, xylene, or ethylbenzene) as the solvent is low (for example, 50 mass parts per million (ppm) or lower, 10 mass ppm or lower, or 1 mass ppm or lower with respect to the total mass of the organic solvent) in consideration of environmental aspects and the like.

In the present invention, a solvent having a low metal content is preferably used. For example, the metal content in the solvent is preferably 10 mass parts per billion (ppb) or lower. Optionally, a solvent having a metal content at a mass parts per trillion (ppt) level may be used. For example, such a high-purity solvent is available from Toyo Gosei Co., Ltd. (The Chemical Daily, Nov. 13, 2015).

Examples of a method of removing impurities such as metal from the solvent include distillation (for example, molecular distillation or thin-film distillation) and filtering using a filter. The pore size of a filter used for the filtering is preferably 10 μm or less, more preferably 5 μm or less, and still more preferably 3 μm or less. As a material of the filter, polytetrafluoroethylene, polyethylene, or nylon is preferable.

The solvent may include an isomer (a compound having the same number of atoms and a different structure). In addition, the organic solvent may include only one isomer or a plurality of isomers.

In the present invention, as the organic solvent, an organic solvent containing 0.8 mmol/L or lower of a peroxide is preferable, and an organic solvent containing substantially no peroxide is more preferable.

The content of the solvent is preferably 10 to 90% by mass with respect to the total content of the near infrared transmitting filter-forming composition. The upper limit is preferably 85% by mass or less, more preferably 80% by mass or less, and still more preferably 75% by mass or less. The lower limit is preferably 20% by mass or higher, more preferably 30% by mass or higher, still more preferably 40% by mass or higher, still more preferably 50% by mass or higher, and still most preferably 60% by mass or higher.

<<Polymerization Inhibitor>>

The near infrared transmitting filter-forming composition may further include a polymerization inhibitor. Examples of the polymerization inhibitor include hydroquinone, p-methoxyphenol, di-tert-butyl-p-cresol, pyrogallol, tert-butylcatechol, benzoquinone, 4,4'-thiobis(3-methyl-6-tert-butylphenol), 2,2'-methylenebis(4-methyl-6-t-butylphenol), and N-nitrosophenylhydroxyamine salt (for example, an ammonium salt or a cerium (III) salt). Among these, p-methoxyphenol is preferable. The content of the polymerization inhibitor is preferably 0.001 to 5% by mass with respect to the total solid content of the near infrared transmitting filter-forming composition.

<<Silane Coupling Agent>>

The near infrared transmitting filter-forming composition may include a silane coupling agent. In the present invention, the silane coupling agent refers to a silane compound having a functional group other than a hydrolyzable group. In addition, the hydrolyzable group refers to a substituent directly linked to a silicon atom and capable of forming a siloxane bond due to at least one of a hydrolysis reaction or a condensation reaction. Examples of the hydrolyzable group include a halogen atom, an alkoxy group, and an acyloxy group. Among these, an alkoxy group is preferable. That is, it is preferable that the silane coupling agent is a compound having an alkoxysilyl group. Examples of the functional group other than a hydrolyzable group include a vinyl group, a (meth)acryloyl group, a mercapto group, an epoxy group, an oxetanyl group, an amino group, an ureido group, a sulfide group, an isocyanate group, and a phenyl group. Among these, a (meth)acryloyl group or an epoxy group is preferable. Examples of the silane coupling agent include a compound described in paragraphs "0018" to "0036" of JP2009-288703A and a compound described in paragraphs "0056" to "0066" of JP2009-242604A, the contents of which are incorporated herein by reference.

The content of the silane coupling agent is preferably 0.01 to 15.0% by mass and more preferably 0.05 to 10.0% by mass with respect to the total solid content of the near infrared transmitting filter-forming composition. As the silane coupling agent, one kind may be used alone, or two or more kinds may be used. In a case where two or more silane coupling agents are used, it is preferable that the total content is in the above-described range.

<<Surfactant>>

The near infrared transmitting filter-forming composition can include a surfactant. As the surfactants, various surfactants such as a fluorine surfactant, a nonionic surfactant, a cationic surfactant, an anionic surfactant, or a silicone surfactant can be used. The details of the surfactant can be found in paragraphs "0238" to "0245" of WO2015/166779A, the content of which is incorporated herein by reference.

In the present invention, it is preferable that the surfactant is a fluorine surfactant. By the near infrared transmitting filter-forming composition including a fluorine surfactant, liquid characteristics (in particular, fluidity) are further improved, and liquid saving properties can be further improved. In addition, a film having reduced thickness unevenness can be formed.

The fluorine content in the fluorine surfactant is preferably 3 to 40% by mass, more preferably 5 to 30% by mass, and still more preferably 7 to 25% by mass. The fluorine surfactant in which the fluorine content is in the above-described range is effective from the viewpoints of the uniformity in the thickness of the coating film and liquid saving properties, and the solubility thereof in the composition is also excellent.

Specific examples of the fluorine surfactant include a surfactant described in paragraphs "0060" to "0064" of JP2014-041318A (paragraphs "0060" to "0064" of corresponding WO2014/017669A) and a surfactant described in paragraphs "0117" to "0132" of JP2011-132503A, the contents of which are incorporated herein by reference. Examples of a commercially available product of the fluorine surfactant include: MEGAFACE F171, F172, F173, F176, F177, F141, F142, F143, F144, R30, F437, F475, F479, F482, F554, F780, EXP, and MFS-330 (all of which are manufactured by DIC Corporation); FLUORAD FC430, FC431, and FC171 (all of which are manufactured by Sumitomo 3M Ltd.); SURFLON S-382, SC-101, SC-103, SC-104, SC-105, SC-1068, SC-381, SC-383, S-393, and KH-40 (all of which are manufactured by Asahi Glass Co., Ltd.); and POLYFOX PF636, PF656, PF6320, PF6520, and PF7002 (all of which are manufactured by OMNOVA Solutions Inc.).

In addition, as the fluorine surfactant, an acrylic compound in which, in a case where heat is applied to a molecular structure which has a functional group having a fluorine atom, the functional group having a fluorine atom is cut and a fluorine atom is volatilized can also be preferably used. Examples of the fluorine surfactant include MEGAFACE DS series (manufactured by DIC Corporation, The Chemical Daily, Feb. 22, 2016, Nikkei Business Daily, Feb. 23, 2016), for example, MEGAFACE DS-21.

In addition, as the fluorine surfactant, a polymer of a fluorine atom-containing vinyl ether compound having a fluorinated alkyl group or a fluorinated alkylene ether group and a hydrophilic vinyl ether compound is also preferable. The details of this fluorine surfactant can be found in JP2016-216602A, the content of which is incorporated herein by reference.

As the fluorine surfactant, a block polymer can also be used. Examples of the block polymer include a compound described in JP2011-089090A. As the fluorine surfactant, a fluorine-containing polymer compound can be preferably used, the fluorine-containing polymer compound including: a repeating unit derived from a (meth)acrylate compound having a fluorine atom; and a repeating unit derived from a (meth)acrylate compound having 2 or more (preferably 5 or more) alkyleneoxy groups (preferably an ethyleneoxy group and a propyleneoxy group). For example, the following compound can also be used as the fluorine surfactant used in the present invention.

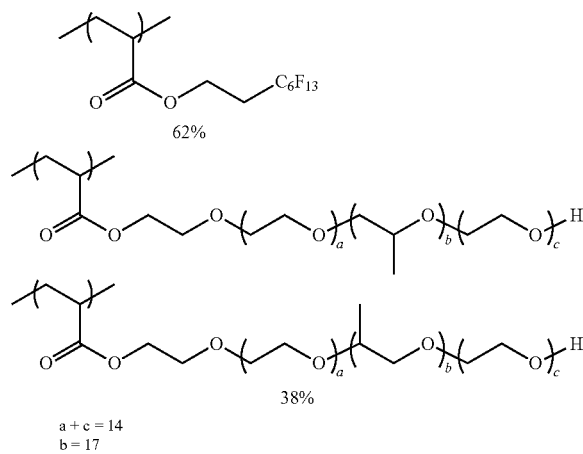

a + c = 14
b = 17

The weight-average molecular weight of the compound is preferably 3000 to 50000 and, for example, 14000. In the compound, "%" representing the proportion of a repeating unit is mol %.

In addition, as the fluorine surfactant, a fluorine-containing polymer having an ethylenically unsaturated group at a side chain can also be used. Specific examples include a compound described in paragraphs "0050" to "0090" and paragraphs "0289" to "0295" of JP2010-164965A, for example, MEGAFACE RS-101, RS-102, RS-718K, and RS-72-K manufactured by DIC Corporation. As the fluorine surfactant, a compound described in paragraphs "0015" to "0158" of JP2015-117327A can also be used.

Examples of the nonionic surfactant include glycerol, trimethylolpropane, trimethylolethane, an ethoxylate and a propoxylate thereof (for example, glycerol propoxylate or glycerol ethoxylate), polyoxyethylene lauryl ether, polyoxyethylenestearyl ether, polyoxyethyleneoleyl ether, polyoxyethyleneoctylphenyl ether, polyoxyethylenenonylphenyl ether, polyethylene glycol dilaurate, polyethylene glycol distearate, sorbitan fatty acid esters, PLURONIC L10, L31, L61, L62, 10R5, 17R2, and 25R2 (manufactured by BASF SE), TETRONIC 304, 701, 704, 901, 904, and 150R1 (manufactured by BASF SE), SOLSPERSE 20000 (manufactured by Lubrication Technology Inc.), NCW-101, NCW-1001, and NCW-1002 (all of which are manufactured by Wako Pure Chemical Industries, Ltd.), PIONIN D-6112, D-6112-W, and D-6315 (all of which are manufactured by Takemoto Oil&Fat Co., Ltd.), and OLFINE E1010 and SURFYNOL 104, 400, and 440 (all of which are manufactured by Nissin Chemical Co., Ltd.).

The content of the surfactant is preferably 0.001% to 5.0% by mass and more preferably 0.005 to 3.0% by mass with respect to the total solid content of the near infrared transmitting filter-forming composition. As the surfactant, one kind may be used alone, or two or more kinds may be used. In a case where two or more silane surfactants are used, it is preferable that the total content is in the above-described range.

<<Ultraviolet Absorber>>

The near infrared transmitting filter-forming composition may further include an ultraviolet absorber. As the ultraviolet absorber, for example, a conjugated diene compound, an aminobutadiene compound, a methyldibenzoyl compound, a coumarin compound, a salicylate compound, a benzophenone compound, a benzotriazole compound, an acrylonitrile compound, an azomethine compound, indole compound, or a triazine compound can be used. The details of these can be found in paragraphs "0052" to "0072" of JP2012-208374A, paragraphs "0317" to "0334" of JP2013-068814A, and paragraphs "0061" to "0080" of JP2016-162946A, the contents of which are incorporated herein by reference. Examples of a commercially available product of the conjugated diene compound include UV-503 (manufactured by Daito Chemical Co., Ltd.). Specific examples of the indole compound include compounds having the following structures. In addition, as the benzotriazole compound, MYUA series (manufactured by Miyoshi Oil&Fat Co., Ltd.; The Chemical Daily, Feb. 1, 2016) may be used.

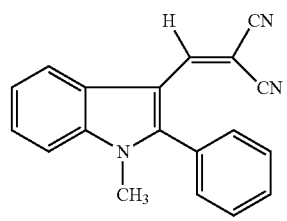 [SMILES: Cn1c(-c2ccccc2)c(C=C(C#N)C#N)c2ccccc21]

In the present invention, as the ultraviolet absorber, compounds represented by Formulae (UV-1) to (UV-3) can also be preferably used.

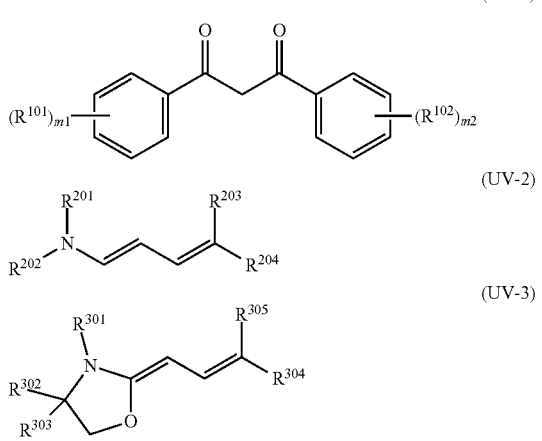

(UV-1)

(UV-2)

(UV-3)

In Formula (UV-1), $R^{101}$ and $R^{102}$ each independently represent a substituent, and m1 and m2 each independently represent 0 to 4. In Formula (UV-2), $R^{201}$ and $R^{202}$ each independently represent a hydrogen atom or an alkyl group, and $R^{203}$ and $R^{204}$ each independently represent a substituent. In Formula (UV-3), $R^{301}$ to $R^{303}$ each independently represent a hydrogen atom or an alkyl group, and $R^{304}$ and $R^{305}$ each independently represent a substituent.

Specific examples of the compounds represented by Formulae (UV-1) to (UV-3) include the following compounds.

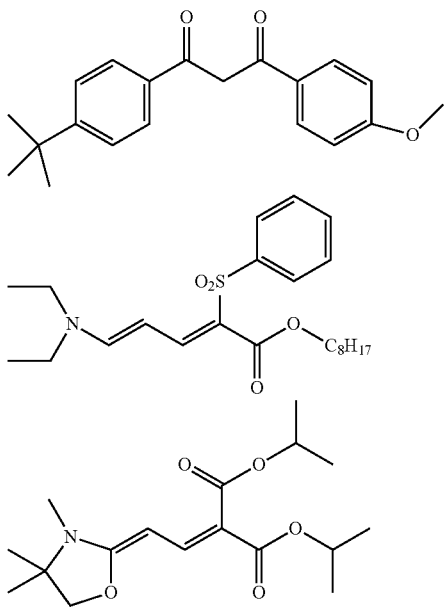

In the near infrared transmitting filter-forming composition, the content of the ultraviolet absorber is preferably 0.01 to 10% by mass and more preferably 0.01 to 5% by mass with respect to the total solid content of the near infrared transmitting filter-forming composition. In the present invention, as the ultraviolet absorber, one kind may be used alone, or two or more kinds may be used. In a case where two or more ultraviolet absorbers are used in combination, it is preferable that the total content of the two or more ultraviolet absorbers is in the above-described range.

<<Antioxidant>>

The near infrared transmitting filter-forming composition may further include an antioxidant. Examples of the antioxidant include a phenol compound, a phosphite compound, and a thioether compound. As the phenol compound, any phenol compound which is known as a phenol antioxidant can be used. As the phenol compound, for example, a hindered phenol compound is preferable. A compound having a substituent at a position (ortho position) adjacent to a phenolic hydroxyl group is preferable. As the substituent, a substituted or unsubstituted alkyl group having 1 to 22 carbon atoms is preferable. In addition, as the antioxidant, a compound having a phenol group and a phosphite group in the same molecule is also preferable. In addition, as the antioxidant, a phosphorus antioxidant can also be preferably used. Examples of the phosphorus antioxidant include tris [2-[[2,4,8,10-tetrakis(1,1-dimethylethyl)dibenzo[d,f][1,3,2] dioxaphosphepin-6-yl]oxy]ethyl]amine, tris[2-[(4,6,9,11-tetra-tert-butyldibenzo[d,f][1,3,2]dioxaphosphepin-2-yl) oxy]ethyl]amine, and ethyl bis(2,4-di-tert-butyl-6-methylphenyl)phosphite. Examples of the commercially available product of the antioxidant include ADEKA STAB AO-20, ADEKA STAB AO-30, ADEKA STAB AO-40, ADEKA STAB AO-50, ADEKA STAB AO-50F, ADEKA STAB AO-60, ADEKA STAB AO-60G, ADEKA STAB AO-80, and ADEKA STAB AO-330 (all of which are manufactured by Adeka Corporation). In addition, as the antioxidant, a polyfunctional hindered amine antioxidant described in WO 17/006600A can also be used.

In the near infrared transmitting filter-forming composition, the content of the antioxidant is preferably 0.01 to 20% by mass and more preferably 0.3 to 15% by mass with respect to the total solid content of the near infrared transmitting filter-forming composition. As the antioxidant, one kind may be used alone, or two or more kinds may be used in combination. In a case where two or more antioxidants are used, it is preferable that the total content is in the above-described range.

<<Other Components>>

Optionally, the near infrared transmitting filter-forming composition may further include a sensitizer, a curing accelerator, a filler, a thermal curing accelerator, a plasticizer, and other auxiliary agents (for example, conductive particles, a filler, an antifoaming agent, a flame retardant, a leveling agent, a peeling accelerator, an aromatic chemical, a surface tension adjuster, or a chain transfer agent). By including the components, properties such as film properties can be adjusted. The details of the components can be found in, for example, paragraph "0183" of JP2012-003225A (corresponding to paragraph "0237" of US2013/0034812A) and paragraphs "0101" to "0104" and "0107" to "0109" of JP2008-250074A, the contents of which are incorporated herein by reference. In addition, the near infrared transmitting filter-forming composition may optionally include a potential antioxidant. The potential antioxidant is a compound in which a portion that functions as the antioxidant is protected by a protective group and this protective group is desorbed by heating the compound at 100° C. to 250° C. or by heating the compound at 80° C. to 200° C. in the presence of an acid/a base catalyst. Examples of the potential antioxidant include a compound described in WO2014/021023A, WO2017/030005A, and JP2017-008219A. Examples of a commercially available product of the potential antioxidant include ADEKA ARKLS GPA-5001 (manufactured by Adeka Corporation).

For example, in a case where a film is formed by coating, the viscosity (23° C.) of the near infrared transmitting filter-forming composition is preferably 1 to 100 mPa×s.

The lower limit is more preferably 2 mPa×s or higher and still more preferably 3 mPa×s or higher. The upper limit is more preferably 50 mPa×s or lower, still more preferably 30 mPa×s or lower, and still more preferably 15 mPa×s or lower.

<Organic Layer-Forming Composition>

Next, the composition (organic layer-forming composition) used for forming the organic layer in the optical filter according to the embodiment of the present invention will be described. It is preferable that the organic layer-forming composition includes a resin and/or a curable compound. Examples of the resin and the curable compound can be found in the description of the above-described materials used in the near infrared transmitting filter-forming composition, and preferable ranges thereof are also the same.

In addition, it is preferable that the organic layer-forming composition does not substantially include a color material. The organic layer-forming composition substantially not including the color material represents that the content of the color material is preferably 1% by mass or lower, more preferably 0.5% by mass or lower, still more preferably 0.1% by mass or lower, and still more preferably 0% with respect to the total solid content of the organic layer-forming composition.

In addition, it is preferable that the organic layer-forming composition does not substantially include a near infrared absorber. The organic layer-forming composition substantially not including the near infrared absorber represents that the content of the near infrared absorber is preferably 1% by mass or lower, more preferably 0.5% by mass or lower, still more preferably 0.1% by mass or lower, and still more preferably 0% with respect to the total solid content of the organic layer-forming composition.

The organic layer-forming composition may further include additives such as a photoinitiator, a solvent, a surfactant, a silane coupling agent, a polymerization inhibitor, an ultraviolet absorber, an antioxidant, or a potential antioxidant. The details of the examples can be found in the description of the above-described materials used in the near infrared transmitting filter-forming composition, and preferable ranges thereof are also the same.

<Storage Container>

A storage container of each of the compositions is not particularly limited, and a well-known storage container can be used. In addition, as the storage container, in order to suppress infiltration of impurities into the raw materials or the composition, a multilayer bottle in which a container inner wall having a six-layer structure is formed of six kinds of resins or a bottle in which a container inner wall having a seven-layer structure is formed of six kinds of resins is preferably used. Examples of the container include a container described in JP2015-123351A.

<Method of Preparing Each of Compositions>

Each of the compositions can be prepared by mixing the above-described components with each other. During the preparation of the composition, all the components may be dissolved or dispersed in a solvent at the same time to prepare each of the compositions. Optionally, two or more solutions or dispersions to which the respective components are appropriately added may be prepared, and the solutions or dispersions may be mixed with each other during use (during application) to prepare each of the compositions.

<Method of Manufacturing Optical Filter>

Next, a method of manufacturing the optical filter according to the embodiment of the present invention will be described. In the optical filter according to the embodiment of the present invention, it is preferable that the near infrared transmitting filter-forming composition is applied to a support to form a near infrared transmitting filter.

Examples of the support include the above-described support. As a method of applying the near infrared transmitting filter-forming composition, a well-known method can be used. Examples of the well-known method include: a drop casting method; a slit coating method; a spray coating method; a roll coating method; a spin coating method; a cast coating method; a slit and spin method; a pre-wetting method (for example, a method described in JP2009-145395A); various printing methods including jet printing such as an ink jet method (for example, an on-demand method, a piezoelectric method, or a thermal method) or a nozzle jet method, flexographic printing, screen printing, gravure printing, reverse offset printing, and metal mask printing; a transfer method using a mold or the like; and a nanoimprint lithography method. The application method using an ink jet method is not particularly limited, and examples thereof include a method (in particular, 115 to 133 pages) described in "Extension of Use of Ink Jet—Infinite Possibilities in Patent-" (February, 2005, S.B. Research Co., Ltd.) and methods described in JP2003-262716A, JP2003-185831A, JP2003-261827A, JP2012-126830A, and JP2006-169325A. In addition, it is preferable that the application using a spin coating method is performed at a rotation speed of 1000 to 2000 rpm. In addition, during the coating using a spin coating method, the rotation speed may be increased as described in JP1998-142603A (JP-H10-142603A), JP1999-302413A (JP-H11-302413A), or JP2000-157922A. In addition, a spin coating process described in "Process Technique and Chemicals for Latest Color Filter" (Jan. 31, 2006, CMC Publishing Co., Ltd.) can also be suitably used.

A composition layer formed by applying the near infrared transmitting filter-forming composition may be dried (pre-baked). In a case where pre-baking is performed, the pre-baking temperature is preferably 150° C. or lower, more preferably 120° C. or lower, and still more preferably 110° C. or lower. The lower limit is, for example, 50° C. or higher or 80° C. or higher. The pre-baking time is preferably 10 to 3000 seconds, more preferably 40 to 2500 seconds, and still more preferably 80 to 220 seconds. Pre-baking can be performed using a hot plate, an oven, or the like.

During the formation of the near infrared transmitting filter, a step of forming a pattern may be further provided. Examples of a pattern forming method include a pattern forming method using a photolithography method and a pattern forming method using a dry etching method. Hereinafter, the step of forming a pattern will be described in detail.

It is preferable that the pattern forming method using a photolithography method includes: a step (exposure step) of exposing the composition layer on the support in a pattern shape; and a step (development step) of forming a pattern by removing a non-exposed portion of the composition layer by development.

In the exposure step, the composition layer is exposed in a pattern shape. For example, the composition layer can be exposed in a pattern shape using an exposure device such as a stepper through a mask having a predetermined mask pattern. As a result, an exposed portion can be cured. As radiation (light) used during the exposure, ultraviolet rays such as g-rays or i-rays are preferable, and i-rays are more preferable. For example, the irradiation dose (exposure dose) is preferably 0.03 to 2.5 $J/cm^2$, more preferably 0.05 to 1.0 $J/cm^2$, and most preferably 0.08 to 0.5 $J/cm^2$. The oxygen concentration during exposure can be appropriately selected. The exposure may be performed not only in air but also in a low-oxygen atmosphere having an oxygen concentration of 19 vol % or lower (for example, 15 vol %, 5 vol %, or substantially 0 vol %) or in a high-oxygen atmosphere having an oxygen concentration of higher than 21 vol % (for example, 22 vol %, 30 vol %, or 50 vol %). In addition, the exposure illuminance can be appropriately set and typically can be selected in a range of 1000 W/m$^2$ to 100000 W/m$^2$ (for example, 5000 W/m$^2$, 15000 W/m$^2$, or 35000 W/m$^2$). Conditions of the oxygen concentration and conditions of the exposure illuminance may be appropriately combined. For example, conditions are oxygen concentration: 10 vol % and illuminance: 10000 W/m$^2$, or oxygen concentration: 35 vol % and illuminance: 20000 W/m$^2$.

Next, a pattern is formed by removing a non-exposed portion of the exposed composition layer by development. The non-exposed portion of the composition layer can be removed by development using a developer. As a result, a non-exposed portion of the composition layer in the exposure step is eluted into the developer, and only the photo-cured portion remains on the support. As the developer, an alkali developer which does not cause damages to a solid image pickup element as an underlayer, a circuit or the like is desired. For example, the temperature of the developer is preferably 20° C. to 30° C. The development time is preferably 20 to 180 seconds. In addition, in order to further improve residue removing properties, a step of shaking the developer off per 60 seconds and supplying a new developer may be repeated multiple times.

Examples of the alkaline agent used as the developer include: an organic alkaline compound such as ammonia water, ethylamine, diethylamine, dimethylethanolamine, diglycolamine, diethanolamine, hydroxyamine, ethylenediamine, tetramethylammonium hydroxide, tetraethylammonium hydroxide, tetrapropylammonium hydroxide, tetrabutylammonium hydroxide, ethyltrimethylammonium hydroxide, benzyltrimethylammonium hydroxide, dimethyl bis(2-hydroxyethyl)ammonium hydroxide, choline, pyrrole, piperidine, or 1,8-diazabicyclo[5.4.0]-7-undecene; and an inorganic alkaline compound such as sodium hydroxide, potassium hydroxide, sodium carbonate, sodium bicarbonate, sodium silicate, or sodium metasilicate. From the viewpoints of environment and safety, it is preferable that the alkaline agent is a compound having a high molecular weight. As the developer, an alkaline aqueous solution in which the above alkaline agent is diluted with pure water is preferably used. A concentration of the alkaline agent in the alkaline aqueous solution is preferably 0.001 to 10% by mass and more preferably 0.01 to 1% by mass. In addition, the developer may include a surfactant to be used. Examples of the surfactant include the above-described surfactants. Among these, a nonionic surfactant is preferable. From the viewpoint of easiness of transport, storage, and the like, the developer may be obtained by temporarily preparing a concentrated solution and diluting the concentrated solution to a necessary concentration during use. The dilution factor is not particularly limited and, for example, can be set to be in a range of 1.5 to 100 times. In a case where a developer including the alkaline aqueous solution is used, it is preferable that the layer is rinsed with pure water after development.

After the development, the film can also be dried and then heated (post-baking). Post-baking is a heat treatment which is performed after development to completely cure the film. In a case where post-baking is performed, for example, the post-baking temperature is preferably 100° C. to 260° C., and more preferably 200° C. to 230° C. The film after the development is post-baked continuously or batchwise using heating means such as a hot plate, a convection oven (hot air circulation dryer), a high-frequency heater under the above-described conditions.

The formation of a pattern using a dry etching method can be performed using a method including: curing the composition layer on the support to form a cured layer; forming a patterned photoresist layer on the cured layer; and dry-etching the cured layer with etching gas by using the patterned photoresist layer as a mask. It is preferable that pre-baking is further performed in order to form the photoresist layer. In particular, in a preferable aspect, as a process of forming the photoresist layer, baking after exposure or baking after development (post-baking) is performed. The details of the pattern formation using the dry etching method can be found in paragraphs "0010" to "0067" of JP2013-064993A, the content of which is incorporated herein by reference.

This way, after forming the near infrared transmitting filter, a dielectric multi-layer film is formed on the near infrared transmitting filter. In a case where the optical filter having the structure illustrated in FIG. 2 is manufactured, the organic layer-forming composition is applied to the near infrared transmitting filter and dried to form an organic layer, and then the dielectric multi-layer film is formed on a surface of the organic layer. Examples of a method of applying the organic layer-forming composition include the above-described methods. The drying temperature is not particularly limited and is preferably 150° C. or lower, more preferably 120° C. or lower, and still more preferably 110° C. or lower. The lower limit is, for example, 50° C. or higher or 80° C. or higher. The drying time is preferably 10 to 3000 seconds, more preferably 40 to 2500 seconds, and still more preferably 80 to 220 seconds. In order to form the organic layer, the composition layer may be heated (post-baked) after drying. In a case where post-baking is performed, the post-baking temperature is preferably 100° C. to 260° C. and more preferably 200° C. to 230° C.

A method of forming the dielectric multi-layer film is not particularly limited, and a well-known method can be used. For example, the dielectric multi-layer film can be formed using a vacuum deposition method such as ion plating or ion beam, a physical vapor deposition method (PVD method) such as sputtering, and a chemical vapor deposition method (CVD method).

<Optical Sensor>

Next, an optical sensor according to the embodiment of the present invention will be described. The optical sensor according to the embodiment of the present invention includes the optical filter according to the embodiment of the present invention. Examples of an optical sensor include various sensors such as a solid image pickup element. The optical sensor of the present invention is incorporated can e preferably used for applications, for example, for iris recognition, for distance measurement, for a proximity sensor, for a gesture sensor, for a motion sensor, a Time-of-Flight (TOF) sensor, for a vein sensor, for blood vessel visualization, for sebum amount measurement, for fluorescent labeling, or for a surveillance camera.

EXAMPLES

Hereinafter, the present invention will be described in detail using examples. Materials, used amounts, ratios, treatment details, treatment procedures, and the like shown in the following examples can be appropriately changed within a range not departing from the scope of the present invention. Accordingly, the scope of the present invention is not limited to the following specific examples. Unless specified otherwise, "part(s)" and "%" represent "part(s) by mass" and "% by mass".

Test Example 1

<Preparation of Dispersion>
After mixing raw materials shown in the following table 1, 230 parts by mass of zirconia beads having a diameter of 0.3 mm were added to the mixture, and the solution was dispersed using a paint shaker for 5 hours. Next, the beads were separated by filtration. As a result, a dispersion was manufactured. Numerical values in the following table are represented by "part(s) by mass".

TABLE 1

|  | Colorant, Near Infrared Absorber | | Dispersing Auxiliary Agent (Pigment Derivative, Resin) | | Dispersant | | Solvent | |
|---|---|---|---|---|---|---|---|---|
|  | Type | Parts By Mass | Type | Parts By Mass | Type | Parts By Mass | Type | Parts By Mass |
| Pigment Dispersion R-1 | PR254 | 12.00 |  |  | C1 | 4.2 | J1 | 83.80 |
| Pigment Dispersion R-2 | PR254 PY139 | 8.3 3.7 | B1 | 2.3 | C2 | 4.4 | J1 | 81.30 |
| Pigment Dispersion Y-1 | PY139 | 11.00 | B1 | 1.59 | C2 | 4.4 | J1 | 83.01 |
| Pigment Dispersion Y-2 | PY150 | 11.00 | B1 | 1.59 | C2 | 4.4 | J1 | 83.01 |
| Pigment Dispersion V-1 | PV23 | 14.20 | P1 | 2 | C2 | 3.8 | J1 J2 | 70.00 10.00 |
| Pigment Dispersion B-1 | PB15:6 | 12.59 |  |  | C2 | 4.4 | J1 | 83.01 |
| Pigment Dispersion B-2 | PB15:6 PV23 | 10.00 2.59 |  |  | C2 | 4.4 | J1 | 83.01 |
| Pigment Dispersion Bk-1 | IB | 12.59 |  |  | C1 | 4.4 | J1 | 83.01 |
| Pigment Dispersion Bk-2 | PBk 32 | 12.59 |  |  | C2 | 4.4 | J1 | 83.01 |
| Pigment Dispersion Bk-3 | PR254 PY139 PB15:6 | 6.92 4.02 7.06 |  |  | C3 | 8.1 | J1 | 73.9 |
| Pigment Dispersion Bk-4 | IB PB15:6 | 11.3 3.75 |  |  | C4 | 5.63 | J1 | 79.32 |
| Pigment Dispersion IR-1 | K1 | 11.00 | B1 | 1.59 | C2 | 6 | J1 | 81.41 |
| Pigment Dispersion IR-2 | K2 | 6.70 | K3 | 0.8 | C3 | 6.0 | J1 | 86.50 |
| Pigment Dispersion IR-3 | K2 | 6.70 | K4 | 0.8 | C3 | 6.0 | J1 | 86.50 |

<Preparation of Composition>
Near infrared transmitting filter-forming compositions 1 to 11 according to Preparation Examples 1 to 11 were prepared by mixing raw materials shown below in Table 2.
Numerical values in the following table are represented by "part(s) by mass".

TABLE 2

|  |  | Preparation Example 1 | Preparation Example 2 | Preparation Example 3 | Preparation Example 4 | Preparation Example 5 | Preparation Example 6 | Preparation Example 7 |
|---|---|---|---|---|---|---|---|---|
| Pigment Dispersant | R-1 |  |  |  |  |  | 20.45 |  |
|  | R-2 | 17.16 | 18.49 | 44.37 |  |  |  |  |
|  | Y-1 | 13.14 | 14.28 |  | 16.95 | 7.82 | 13.14 |  |
|  | Y-2 |  |  |  |  |  |  |  |
|  | V-1 | 7.68 |  |  |  |  | 7.68 |  |
|  | B-1 | 38.27 | 48.72 |  | 16.95 |  | 38.27 |  |
|  | B-2 |  |  | 38.04 |  | 20.34 |  |  |
|  | Bk-1 |  |  |  |  | 54.77 |  |  |
|  | Bk-2 |  |  |  | 52.16 |  |  |  |
|  | Bk-3 |  |  |  |  |  |  |  |
|  | Bk-4 |  |  |  |  |  |  | 73.20 |
|  | IR-1 |  |  |  |  |  |  |  |
|  | IR-2 |  |  |  |  |  |  |  |
|  | IR-3 |  |  |  |  |  |  |  |
| Polymerizable Compound | D1 | 0.80 | 0.92 | 0.54 | 1.89 |  | 2.60 |  |
|  | D2 | 1.00 | 0.26 |  |  |  |  |  |
|  | D3 | 0.80 | 0.20 |  |  |  |  |  |
|  | D4 |  | 0.92 |  |  |  |  |  |
|  | D5 |  |  |  | 1.00 | 1.98 |  |  |
|  | D6 |  |  |  |  |  |  | 2.56 |
| Silane Coupling Agent | H1 |  | 0.53 |  |  |  |  |  |
| Photoradical | I1 |  | 0.876 |  |  |  | 0.940 |  |

TABLE 2-continued

|  |  | | | | | | | |
|---|---|---|---|---|---|---|---|---|
| Polymerization | I2 |  | 0.793 |  |  | 0.344 |  |  |
| Initiator | I3 | 0.540 |  |  | 0.555 |  |  |  |
|  | I4 | 0.400 |  |  |  | 0.340 |  |  |
|  | I5 |  |  |  |  |  |  |  |
|  | I6 |  |  |  |  |  |  | 0.210 |
| Resin | P1 |  | 2.45 | 3.41 | 2.53 | 2.95 | 2.88 |  |
|  | P2 | 2.99 |  |  |  |  |  |  |
|  | P3 |  |  |  |  |  |  | 5.7 |
| Ultraviolet Absorber | L1 |  |  |  | 0.1 |  |  |  |
| Polyfunctional Thiol | M1 |  |  |  |  |  |  |  |
| Surfactant | F1 | 0.04 | 0.04 | 0.04 | 0.04 | 0.04 | 0.04 | 0.04 |
| Polymerization Inhibitor | G1 | 0.0013 | 0.0011 | 0.0013 | 0.0009 | 0.001 | 0.0013 | 0.0013 |
| Solvent | J1 | 17.22 | 12.98 | 11.20 | 8.86 | 10.23 | 12.02 | 18.29 |
|  | J3 |  |  |  |  |  | 2.02 |  |
|  | J4 |  |  |  |  | 1.23 |  |  |

|  |  | Preparation Example 8 | Preparation Example 9 | Preparation Example 10 | Preparation Example 11 | Preparation Example 12 | Preparation Example 13 |
|---|---|---|---|---|---|---|---|
| Pigment | R-1 |  |  | 25.69 |  |  |  |
| Dispersant | R-2 |  |  |  |  |  |  |
|  | Y-1 | 30.83 |  | 14.23 | 12.50 | 12.50 | 7.90 |
|  | Y-2 |  |  |  |  |  |  |
|  | V-1 | 12.11 |  |  |  |  |  |
|  | B-1 | 31.70 |  | 24.99 | 12.50 | 12.50 |  |
|  | B-2 |  |  |  |  |  | 15.64 |
|  | Bk-1 |  |  |  |  |  | 41.66 |
|  | Bk-2 |  |  |  | 45.20 | 43.20 |  |
|  | Bk-3 |  | 49.01 |  |  |  |  |
|  | Bk-4 |  |  |  |  |  |  |
|  | IR-1 |  |  |  | 16.10 |  | 17.75 |
|  | IR-2 |  |  | 23.73 |  | 20.10 |  |
|  | IR-3 |  | 26.11 |  |  |  |  |
| Polymerizable | D1 | 4.20 |  | 1.13 | 1.04 | 1.89 |  |
| Compound | D2 |  |  | 0.72 |  |  |  |
|  | D3 |  |  |  |  |  |  |
|  | D4 |  | 2.87 |  | 0.85 |  |  |
|  | D5 |  |  | 0.76 |  |  | 1.98 |
|  | D6 |  |  |  |  |  |  |
| Silane Coupling Agent | H1 |  |  |  |  |  |  |
| Photoradical | I1 |  | 0.261 |  | 0.315 |  |  |
| Polymerization | I2 | 0.500 | 0.910 |  | 0.340 |  | 0.344 |
| Initiator | I3 |  |  | 1.065 |  |  |  |
|  | I4 |  |  |  |  |  | 0.340 |
|  | I5 |  |  |  |  | 0.655 |  |
|  | I6 |  |  |  |  |  |  |
| Resin | P1 | 2.05 | 1.64 | 2.3 | 2.33 | 0.53 | 2.95 |
|  | P2 |  |  |  |  |  |  |
|  | P3 |  |  |  |  |  |  |
| Ultraviolet Absorber | L1 |  |  |  |  |  |  |
| Polyfunctional Thiol | M1 | 0.2 |  |  |  |  |  |
| Surfactant | F1 | 0.04 | 0.05 | 0.05 | 0.04 | 0.04 | 0.04 |
| Polymerization Inhibitor | G1 | 0.0013 | 0.0014 | 0.0013 | 0.0009 | 0.0009 | 0.001 |
| Solvent | J1 | 18.37 | 19.20 | 5.39 | 8.86 | 8.66 | 10.23 |
|  | J3 |  |  |  |  |  |  |
|  | J4 |  |  |  |  |  | 1.23 |

The raw materials shown above in the table 1, 2 are as follows.

(Near Infrared Absorber)

K1, K2: compounds having the following structures. In the following formulae, Me represents a methyl group, and Ph represents a phenyl group.

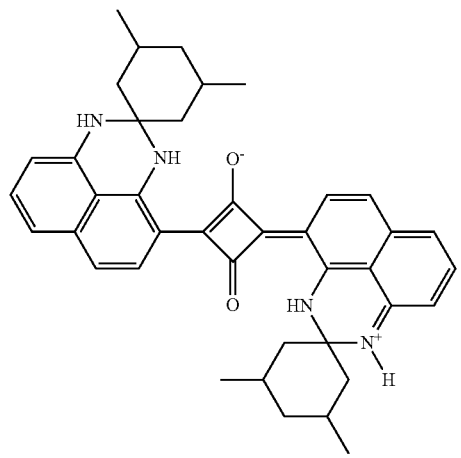
(K1)

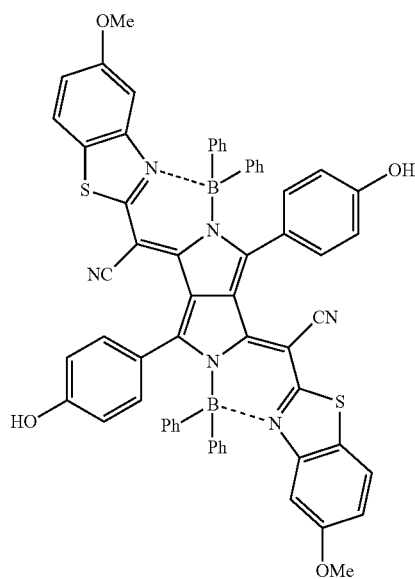
(K2)

(Colorant)

PR254: C.I. Pigment Red 254
PY139: C.I. Pigment Yellow 139
PY150: C.I. Pigment Yellow 150
PB 15:6: C.I. Pigment Blue 15:6
PV23: C.I. Pigment Violet 23
PBk 32: C.I. Pigment Black 32
IB: IRGAPHOR BLACK (manufactured by BASF SE, a compound having the following structure)

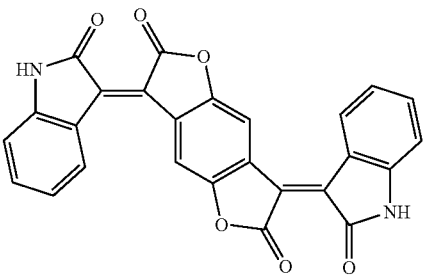 [SMILES: O=C1Nc2ccccc2/C1=C1/C(=O)Oc2cc3c(cc21)OC(=O)/C3=C1\C(=O)Nc2ccccc21]

(Pigment Derivative)

B1, K3, K4: compounds having the following structures. In the following structural formulae, Ph represents a phenyl group, and Me represents a methyl group.

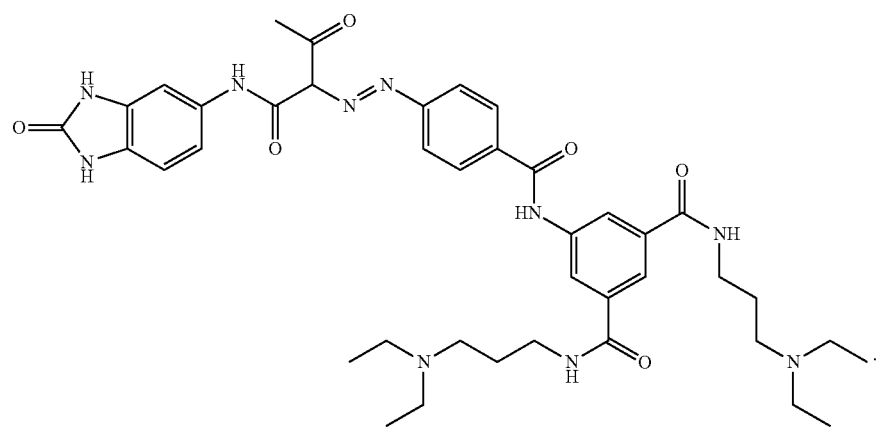
(B1)

(K3)

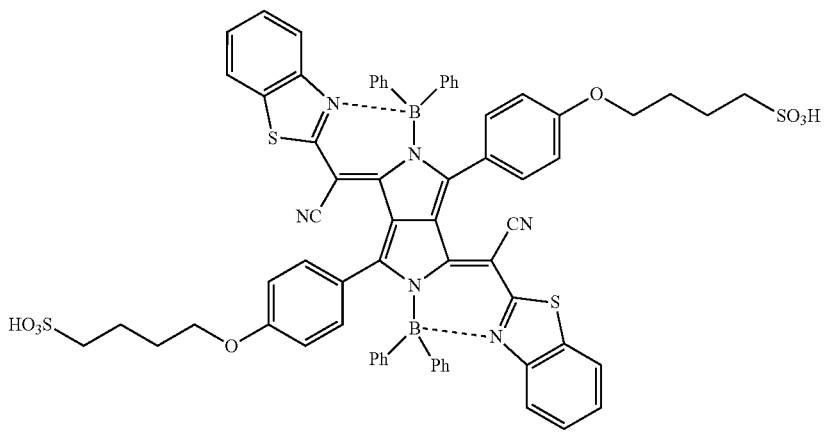

(K4)

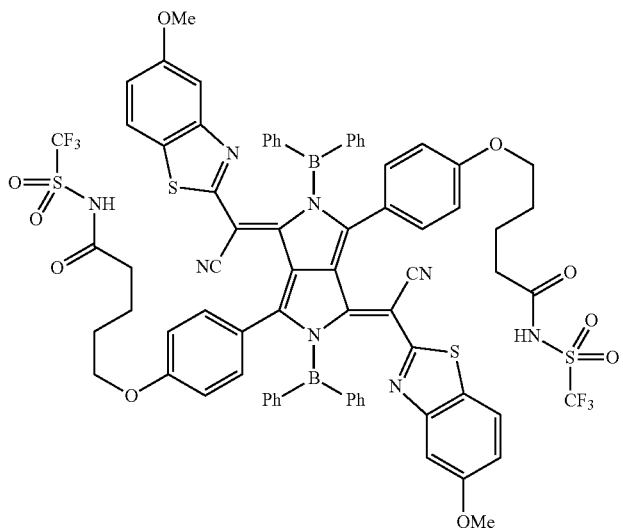

(Dispersant)

C1: a resin having the following structure (a numerical value added to a main chain represents a molar ratio, and a numerical value added to a side chain represents the number of repeating units; Mw=20,000)

C2: a resin having the following structure (a numerical value added to a main chain represents a molar ratio, and a numerical value added to a side chain represents the number of repeating units; Mw=24,000)

C3: a resin having the following structure (a numerical value added to a main chain represents a molar ratio, and a numerical value added to a side chain represents the number of repeating units; Mw=20,000)

C4: BYK 2000 (concentration of solid contents: 40% by mass, manufactured by BYK Japan KK)

(C1)

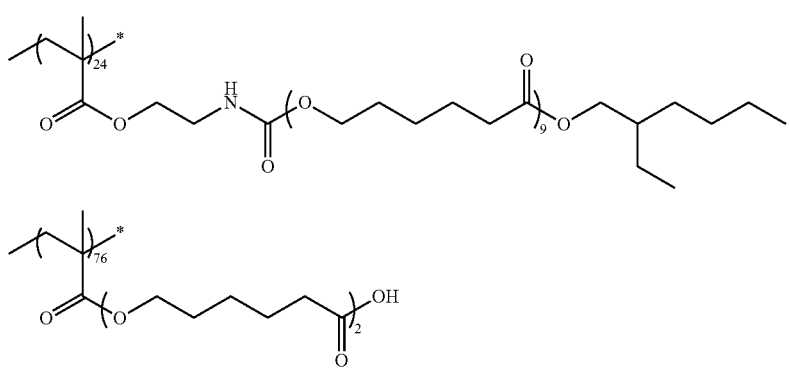

-continued
(C2)
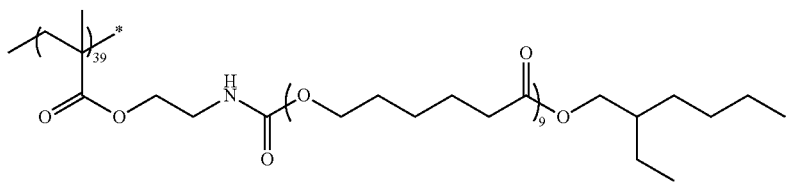
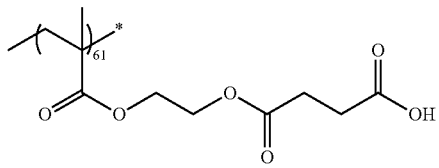
(C3)
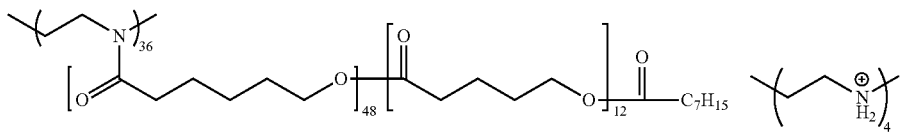
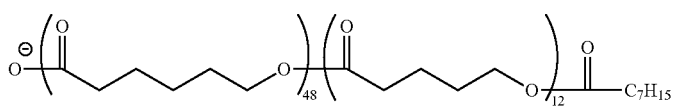
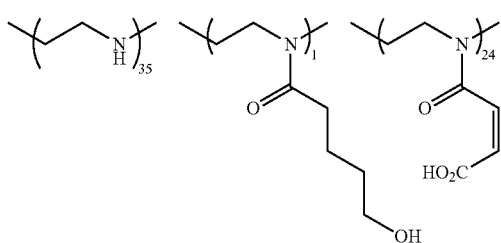
(Resin)
P1: a resin having the following structure (Mw=11,000, a numerical value added to a main chain represents a molar ratio, Me is a methyl group).
(P1)
-continued
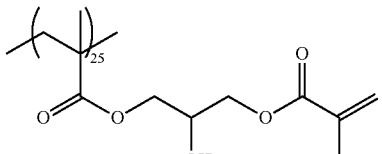
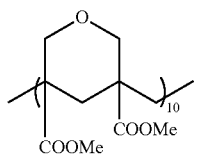 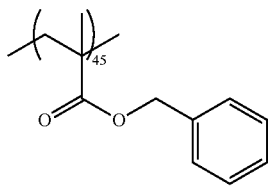
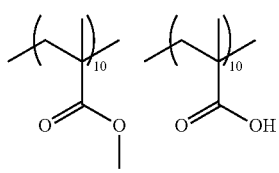
P2: a resin having the following structure (Mw-4400, acid value=95 mgKOH/g; in the following structural formula, M represents a phenyl group, and A represents a biphenyltetracarboxylic anhydride residue)

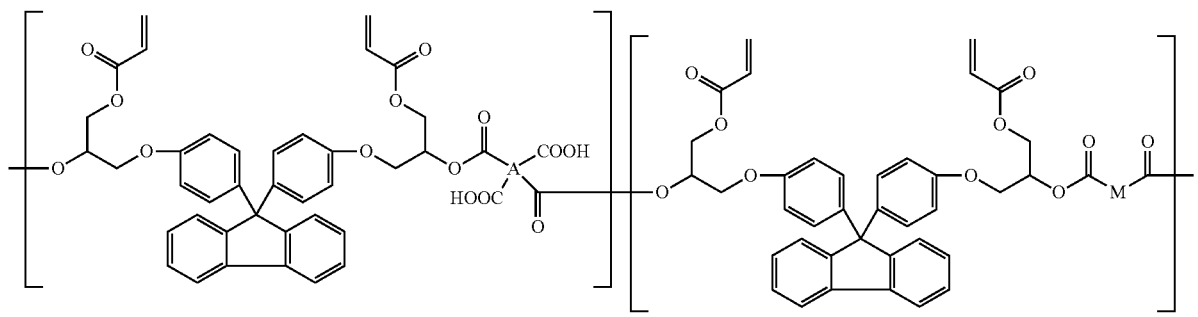

P3: CYCLOMER ACA250 (solid content concentration: 45% by mass, manufactured by Daicel Corporation)

(Polymerizable Compound)

D1: a compound having the following structure (a+b+c=3)

D2: a compound having the following structure (a+b+c=4)

D3: a mixture of compounds having the following structures (compound in which a+b+c=5:compound in which a+b+c=6=3:1 (molar ratio))

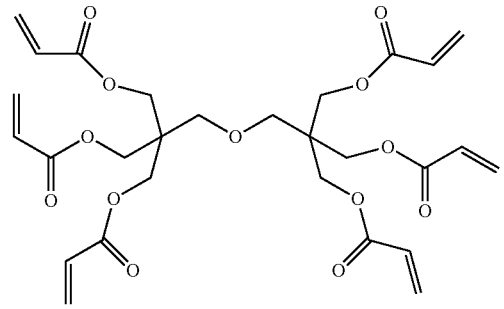

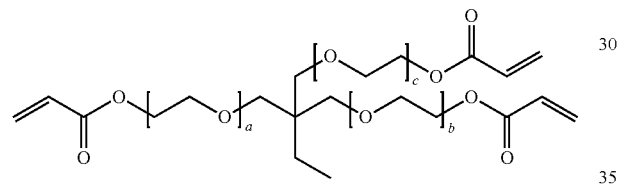

D4: compounds having the following structures.

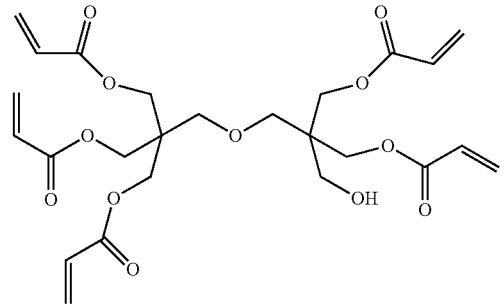

D6: ARONIX M-520 (manufactured by Toagosei Co., Ltd.)

(Silane Coupling Agent)

H1: a compound having the following structure (in the following structural formulae, Et represents an ethyl group)

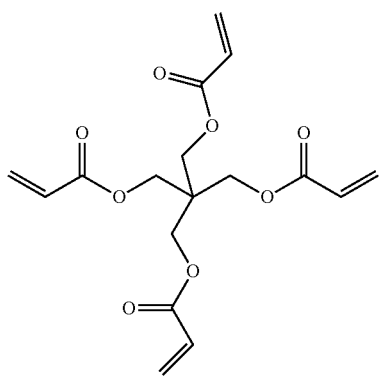 [SMILES: C=CC(=O)OCC(COC(=O)C=C)(COC(=O)C=C)COC(=O)C=C]

D5: compounds having the following structures (a mixture in which a molar ratio between a left compound and a right compound is 7:3)

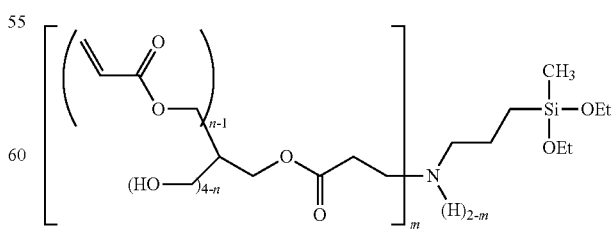

N = 4,3,2
(n = 4 main reactant)

M = 2 or 1
(m = 2 main product)

(Photoradical Polymerization Initiator)
I1 to I5: compounds having the following structures.

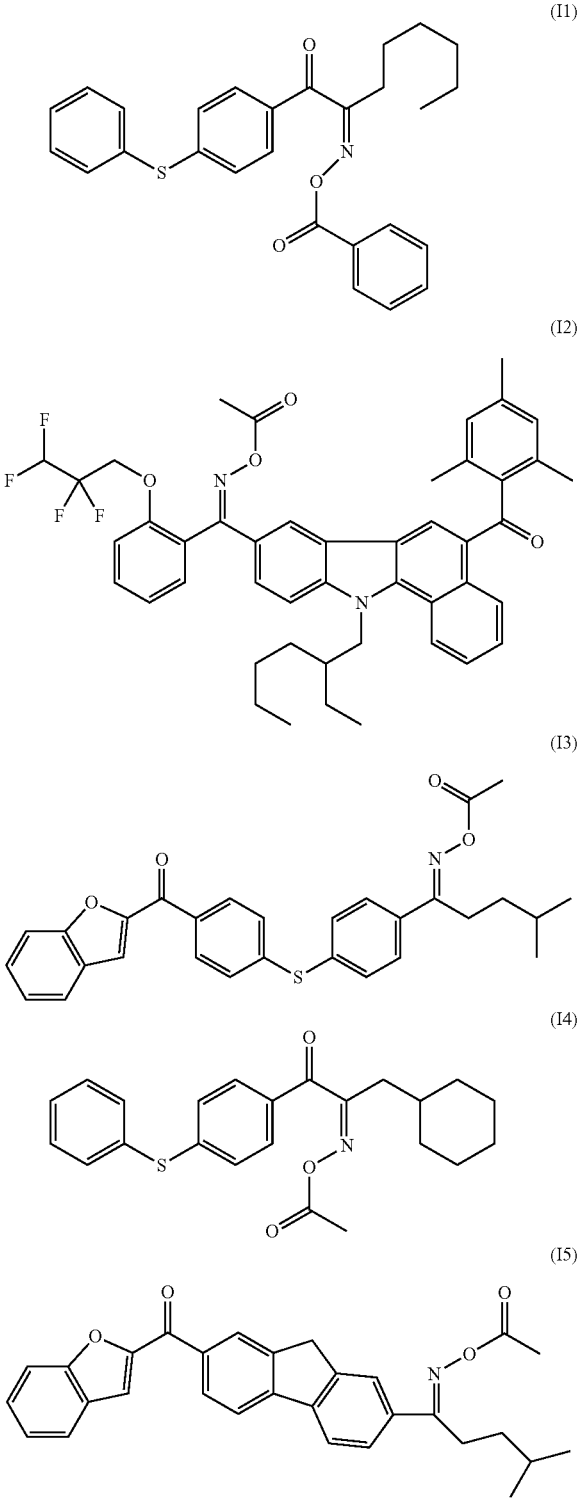

I6: ADEKA ARKLS NCI-831 (manufactured by Adeka Corporation)
(Polyfunctional Thiol)
M1: trimethylolpropane tris(3-mercaptobutyrate)

(Surfactant)
F1: the following mixture (Mw=14000, in the following formula, "%" representing the proportion of a repeating unit is mol %)

a + c = 14
b = 17

(Polymerization Inhibitor)
G1: p-methoxyphenol
(Solvent)
J1: propylene glycol monomethyl ether acetate (PGMEA)
J2: cyclohexanone
J3: 3-methoxy-N,N-dimethylpropanamide
J4: 3-butoxy-N,N-dimethylpropanamide
(Ultraviolet Absorber)
L1: compounds having the following structures.

<Manufacturing of Optical Filter>

Example 1

A silicon wafer or a glass wafer having a size of 8 inch (20.32 cm) was used as a support. CT-4000L (manufactured by Fujifilm Electronic Materials Co., Ltd.) was uniformly applied to the support by spin coating to form a coating film. The formed coating film was further heated in an oven at 220° C. for 1 hour to cure the coating film. As a result, an undercoat layer was formed. The rotation speed during the spin coating was adjusted such that the thickness of the heated coating film was about 0.1 μm.

Next, the near infrared transmitting filter-forming composition according to Preparation Example 1 was applied to the undercoat layer of the support using a spin coater such that the thickness of the film after drying was as 1.5 μm, and was dried using a hot plate at 100° C. for 120 seconds.

Next, in a case where a silicon wafer was used as the support, using an i-ray stepper exposure device FPA-i5+ (manufactured by Canon Corporation), the coating film was irradiated with light having a wavelength of 365 nm at an exposure dose of 1000 mJ/cm² through a 100 μm×100 μm island pattern mask. After the exposure, the exposed film was developed using an alkali developer (CD-2000, manufactured by Fujifilm Electronic Materials Co., Ltd.) at 25° C. for 40 seconds. Next, the developed film was rinsed with flowing water for 30 seconds was dried by spraying, and then was baked using a hot plate at 220° C. for 5 minutes As a result, a near infrared transmitting filter was formed. A dielectric multi-layer film 1 having a layer configuration shown in the following table was formed on a surface of the obtained near infrared transmitting filter. As a result, an optical filter (a laminate including the near infrared transmitting filter and the dielectric multi-layer film) was manufactured on the support.

Next, in a case where a glass wafer was used as the support, using an i-ray stepper exposure device FPA-i5+ (manufactured by Canon Corporation), the entire surface of the coating film was irradiated with light having a wavelength of 365 nm at an exposure dose of 1000 mJ/cm$^2$. After the exposure, the exposed film was developed using an alkali developer (CD-2000, manufactured by Fujifilm Electronic Materials Co., Ltd.) at 25° C. for 40 seconds. Next, the developed film was rinsed with flowing water for 30 seconds was dried by spraying, and then was baked using a hot plate at 220° C. for 5 minutes As a result, a near infrared transmitting filter was formed. A dielectric multi-layer film 1 having a layer configuration shown in the following table was formed on a surface of the obtained near infrared transmitting filter. As a result, an optical filter (a laminate including the near infrared transmitting filter and the dielectric multi-layer film) was manufactured on the support.

Examples 2 to 14

Optical filters (laminates including the near infrared transmitting filter and the dielectric multi-layer film) were manufactured using the same method as that of Example 1, except that the kinds of the near infrared transmitting filter-forming composition and the dielectric multi-layer film were changed as shown in the following table, the near infrared transmitting filter-forming composition was applied such that the thickness of the film after drying was 1.5 µm in Examples 2 to 9, and the near infrared transmitting filter-forming composition was applied such that the thickness of the film after drying was 2.0 µm in Examples 10 to 14.

Comparative Example 1

A silicon wafer or a glass wafer having a size of 8 inch (20.32 cm) was used as a support. CT-4000L (manufactured by Fujifilm Electronic Materials Co., Ltd.) was uniformly applied to the support by spin coating to form a coating film. The formed coating film was further heated in an oven at 220° C. for 1 hour to cure the coating film. As a result, an undercoat layer was formed. The rotation speed during the spin coating was adjusted such that the thickness of the heated coating film was about 0.1 µm.

Next, the near infrared transmitting filter-forming composition according to Preparation Example 4 was applied to the undercoat layer of the support using a spin coater such that the thickness of the film after drying was as 1.5 µm, and was dried using a hot plate at 100° C. for 120 seconds.

Next, in a case where a silicon wafer was used as the support, using an i-ray stepper exposure device FPA-i5+ (manufactured by Canon Corporation), the coating film was irradiated with light having a wavelength of 365 nm at an exposure dose of 1000 mJ/cm2 through a 100 µm×100 µm island pattern mask. After the exposure, the exposed film was developed using an alkali developer (CD-2000, manufactured by Fujifilm Electronic Materials Co., Ltd.) at 25° C. for 40 seconds. Next, the developed film was rinsed with flowing water for 30 seconds was dried by spraying, and then was baked using a hot plate at 220° C. for 5 minutes As a result, a near infrared transmitting filter was formed on the support, and this laminate was set as an optical filter according to Comparative Example 1.

In addition, in a case where a glass wafer was used as the support, using an i-ray stepper exposure device FPA-i5+ (manufactured by Canon Corporation), the entire surface of the coating film was irradiated with light having a wavelength of 365 nm at an exposure dose of 1000 mJ/cm$^2$. After the exposure, the exposed film was developed using an alkali developer (CD-2000, manufactured by Fujifilm Electronic Materials Co., Ltd.) at 25° C. for 40 seconds. Next, the developed film was rinsed with flowing water for 30 seconds was dried by spraying, and then was baked using a hot plate at 220° C. for 5 minutes As a result, a near infrared transmitting filter was formed, and this laminate was set as an optical filter according to Comparative Example 1.

The layer configurations of the dielectric multi-layer films 1 to 4 are as shown in the following table. In addition, in the following table, the more the number in "Layer", the closer to the near infrared transmitting filter side. No. 1 represents the outermost surface.

In the dielectric multi-layer film 1, a maximum value of a light transmittance in a wavelength range of 400 to 750 nm was 30% or lower, a light transmittance at a wavelength of 850 nm was 70% or higher, and a maximum value of a light transmittance in a wavelength range of 950 to 1100 nm was 30% or lower. In addition, in the dielectric multi-layer film 2, a minimum value of a light transmittance in a wavelength range of 400 to 850 nm was 70% or higher, and a maximum value of a light transmittance in a wavelength range of 950 to 1100 nm was 30% or lower. In addition, in the dielectric multi-layer film 3, a maximum value of a light transmittance in a wavelength range of 400 to 830 nm was 30% or lower, a light transmittance at a wavelength of 940 nm was 70% or higher, and a maximum value of a light transmittance in a wavelength range of 1050 to 1100 nm is 30% or lower. In addition, in the dielectric multi-layer film 4, a minimum value of a light transmittance in a wavelength range of 400 to 830 nm was 70% or higher, and a maximum value of a light transmittance in a wavelength range of 1050 to 1100 nm was 30% or lower.

TABLE 3

| Layer | Material | Thickness (nm) |
|---|---|---|
| Dielectric Multi-Layer Films 1 | | |
| 1 | TiO$_2$ | 56.8 |
| 2 | SiO$_2$ | 70 |
| 3 | TiO$_2$ | 40.71 |
| 4 | SiO$_2$ | 87.4 |
| 5 | TiO$_2$ | 166.13 |
| 6 | SiO$_2$ | 29.46 |
| 7 | TiO$_2$ | 58.61 |
| 8 | SiO$_2$ | 96.61 |
| 9 | TiO$_2$ | 69.46 |
| 10 | SiO$_2$ | 110.17 |
| 11 | TiO$_2$ | 67.38 |
| 12 | SiO$_2$ | 113.47 |
| 13 | TiO$_2$ | 107.27 |
| 14 | SiO$_2$ | 408.9 |
| 15 | TiO$_2$ | 45.57 |
| 16 | SiO$_2$ | 76.37 |
| 17 | TiO$_2$ | 52.4 |

TABLE 3-continued

| Layer | Material | Thickness (nm) |
|---|---|---|
| 18 | $SiO_2$ | 204.31 |
| 19 | $TiO_2$ | 126.72 |
| 20 | $SiO_2$ | 133.57 |
| 21 | $TiO_2$ | 135.09 |
| 22 | $SiO_2$ | 175.99 |
| 23 | $TiO_2$ | 35.9 |
| 24 | $SiO_2$ | 11.04 |
| 25 | $TiO_2$ | 65.77 |
| 26 | $SiO_2$ | 35.45 |
| 27 | $TiO_2$ | 28.38 |
| 28 | $SiO_2$ | 95.89 |
| 29 | $TiO_2$ | 58.64 |
| 30 | $SiO_2$ | 16.15 |
| 31 | $TiO_2$ | 55.68 |
| 32 | $SiO_2$ | 225.86 |
| 33 | $TiO_2$ | 29.5 |
| 34 | $SiO_2$ | 95.12 |
| Dielectric Multi-Layer Films 2 | | |
| 1 | $SiO_2$ | 88.38 |
| 2 | $TiO_2$ | 23.48 |
| 3 | $SiO_2$ | 11.55 |
| 4 | $TiO_2$ | 100.84 |
| 5 | $SiO_2$ | 4.21 |
| 6 | $TiO_2$ | 311.22 |
| 7 | $SiO_2$ | 20.4 |
| 8 | $TiO_2$ | 20.98 |
| 9 | $SiO_2$ | 170.42 |
| 10 | $TiO_2$ | 9.43 |
| 11 | $SiO_2$ | 23.53 |
| 12 | $TiO_2$ | 114.25 |
| 13 | $SiO_2$ | 39.05 |
| 14 | $TiO_2$ | 11.68 |
| 15 | $SiO_2$ | 412.34 |
| 16 | $TiO_2$ | 18.45 |
| 17 | $SiO_2$ | 50.72 |
| 18 | $TiO_2$ | 19.96 |
| 19 | $SiO_2$ | 183.69 |
| 20 | $TiO_2$ | 9.1 |
| 21 | $SiO_2$ | 23.95 |
| 22 | $SiO_2$ | 75.12 |
| 23 | $SiO_2$ | 7.63 |
| 24 | $TiO_2$ | 29.24 |
| 25 | $SiO_2$ | 184.02 |
| 26 | $TiO_2$ | 113.59 |
| 27 | $SiO_2$ | 184.92 |
| 28 | $TiO_2$ | 30.8 |
| 29 | $SiO_2$ | 7.85 |
| 30 | $TiO_2$ | 75.45 |
| 31 | $SiO_2$ | 31.98 |
| 32 | $TiO_2$ | 5.74 |
| 33 | $SiO_2$ | 147 |
| 34 | $TiO_2$ | 25.74 |
| 35 | $SiO_2$ | 12.55 |
| 36 | $TiO_2$ | 81.78 |
| 37 | $SiO_2$ | 28.2 |
| 38 | $TiO_2$ | 15.72 |
| 39 | $SiO_2$ | 153.62 |
| Dielectric Multi-Layer Films 3 | | |
| 1 | $TiO_2$ | 93.21 |
| 2 | $SiO_2$ | 91.03 |
| 3 | $TiO_2$ | 45.96 |
| 4 | $SiO_2$ | 77.73 |
| 5 | $TiO_2$ | 148.05 |
| 6 | $SiO_2$ | 24.73 |
| 7 | $TiO_2$ | 38.96 |
| 8 | $SiO_2$ | 37.47 |
| 9 | $TiO_2$ | 60.26 |
| 10 | $SiO_2$ | 72.98 |
| 11 | $TiO_2$ | 60.2 |
| 12 | $SiO_2$ | 113.95 |
| 13 | $TiO_2$ | 94.29 |
| 14 | $SiO_2$ | 139.74 |
| 15 | $TiO_2$ | 16.76 |
| 16 | $SiO_2$ | 352.7 |
| 17 | $TiO_2$ | 84.99 |
| 18 | $SiO_2$ | 19.03 |
| 19 | $TiO_2$ | 32.5 |
| 20 | $SiO_2$ | 159.69 |
| 21 | $TiO_2$ | 50.28 |
| 22 | $SiO_2$ | 21.02 |
| 23 | $TiO_2$ | 50.6 |
| 24 | $SiO_2$ | 39.51 |
| 25 | $TiO_2$ | 64.58 |
| 26 | $SiO_2$ | 123.69 |
| 27 | $TiO_2$ | 102.72 |
| 28 | $SiO_2$ | 150.25 |
| 29 | $TiO_2$ | 119.27 |
| 30 | $SiO_2$ | 127.91 |
| 31 | $TiO_2$ | 226.6 |
| 32 | $SiO_2$ | 166.06 |
| 33 | $TiO_2$ | 17.97 |
| 34 | $SiO_2$ | 43.14 |
| 35 | $TiO_2$ | 54.92 |
| 36 | $SiO_2$ | 95.98 |
| 37 | $TiO_2$ | 19.73 |
| 38 | $SiO_2$ | 37.32 |
| 39 | $TiO_2$ | 66.54 |
| 40 | $SiO_2$ | 49.85 |
| Dielectric Multi-Layer Films 4 | | |
| 1 | $SiO_2$ | 89.24 |
| 2 | $TiO_2$ | 113.59 |
| 3 | $SiO_2$ | 28.61 |
| 4 | $TiO_2$ | 12.35 |
| 5 | $SiO_2$ | 146.56 |
| 6 | $TiO_2$ | 14.98 |
| 7 | $SiO_2$ | 24.85 |
| 8 | $TiO_2$ | 113.59 |
| 9 | $SiO_2$ | 26.76 |
| 10 | $TiO_2$ | 14.26 |
| 11 | $SiO_2$ | 430.6 |
| 12 | $TiO_2$ | 12.79 |
| 13 | $SiO_2$ | 31.56 |
| 14 | $TiO_2$ | 124.2 |
| 15 | $SiO_2$ | 32.5 |
| 16 | $TiO_2$ | 14.27 |
| 17 | $SiO_2$ | 418.51 |
| 18 | $TiO_2$ | 14.1 |
| 19 | $SiO_2$ | 32 |
| 20 | $TiO_2$ | 114.45 |
| 21 | $SiO_2$ | 21.26 |
| 22 | $TiO_2$ | 12.31 |
| 23 | $SiO_2$ | 168.55 |
| 24 | $TiO_2$ | 17.82 |
| 25 | $SiO_2$ | 18.29 |
| 26 | $TiO_2$ | 94.33 |
| 27 | $SiO_2$ | 22.98 |
| 28 | $TiO_2$ | 14.87 |
| 29 | $SiO_2$ | 160.83 |
| 30 | $TiO_2$ | 13.67 |
| 31 | $SiO_2$ | 25.44 |
| 32 | $TiO_2$ | 115.07 |
| 33 | $SiO_2$ | 23.68 |
| 34 | $SiO_2$ | 12.7 |
| 35 | $SiO_2$ | 9.46 |
| 36 | $TiO_2$ | 3.24 |

<Spectral Characteristics>

Using a spectrophotometer U-4100 (manufactured by Hitachi High-Technologies Corporation), a transmittance of the optical filter in a wavelength range of 400 to 1100 nm and an absorbance of the near infrared transmitting filter including the optical filter in a wavelength range of 400 to 1100 m were measured.

The transmittance of the near infrared transmitting filter including the optical filter was measured as follows. The near infrared transmitting filter-forming composition was applied to the glass wafer using a spin coater such that the thickness of the film after drying was 1.5 μm or 2.0 μm (1.5 μm in Examples 1 to 9 and Comparative Example 1 and 2.0 μm in Examples 10 to 14). Next, using an i-ray stepper exposure device FPA-i5+ (manufactured by Canon Corporation), the entire surface of the coating film was irradiated with light having a wavelength of 365 nm at an exposure dose of 1000 mJ/cm². Next, the exposed film was developed using an alkali developer (CD-2000, manufactured by Fujifilm Electronic Materials Co., Ltd.) at 25° C. for 40 seconds. Next, the developed film was rinsed with flowing water for 30 seconds was dried by spraying, and then was baked using a hot plate at 220° C. for 5 minutes to form a film. Using this film, the transmittance was measured.

In addition, the spectral characteristics of the optical filter including the optical filter in which the glass wafer was used as the support were evaluated.

In the optical filters according to Examples 1 to 9, a maximum value of a light transmittance in a wavelength range of 400 to 750 nm was 5% or lower, a light transmittance at a wavelength of 850 nm was 70% or higher, and a maximum value of a light transmittance in a wavelength range of 900 to 1100 nm was 30% or lower. In addition, in the near infrared transmitting filter including each of the optical filters according to Examples 1 to 9, a ratio Amin/Bmax of a minimum value Amin of an absorbance of the near infrared transmitting filter in a wavelength range of 400 to 750 nm to a maximum value Bmax of an absorbance of the near infrared transmitting filter in a wavelength range of 900 to 1100 nm was 4.5 or higher.

In addition, in the optical filters according to Examples 10 to 14, a maximum value of a light transmittance in a wavelength range of 400 to 830 nm was 5% or lower, a light transmittance at a wavelength of 940 nm was 70% or higher, and a maximum value of a light transmittance in a wavelength range of 1050 to 1100 nm was 30% or lower. In addition, in the near infrared transmitting filter including each of the optical filters according to Examples 10 to 14, a ratio Amin/Bmax of a minimum value Amin of an absorbance of the near infrared transmitting filter in a wavelength range of 400 to 830 nm to a maximum value Bmax of an absorbance of the near infrared transmitting filter in a wavelength range of 1000 to 1100 nm was 4.5 or higher.

In addition, in each of the optical filters according to Examples and Comparative Examples, a light transmittance at a wavelength of (λ1, λ2), or (λ1–100) nm at which the transmittance was 50%, a maximum value of a light transmittance at a wavelength of λ1 to λ2, and a maximum value of a light transmittance at a wavelength of (λ2+50) nm to 1100 nm are shown in the following table. λ1 and λ2 are wavelengths at which the transmittance of the optical filter is 50%, λ1 is a wavelength on a short wavelength side, and λ2 is a wavelength on a longer wavelength side.

<Distance Recognition>

Distance recognition was evaluated using the optical filter formed on the silicon wafer. The above-described optical filter was cut out as a chip and was incorporated into a time-of-flight (TOF) sensor. Using a laser at a wavelength of 850 nm or 940 nm, distance measurement was performed under the following illuminance at an air mass of 1.5 G or lower. In Examples 1 to 9 and Comparative Example 1, distance measurement was performed using a 850 nm laser. In addition, in Examples 10 to 14, distance measurement was performed using a 940 nm laser.

5: the upper limit of the illuminance at which the distance measurement was able to be performed was higher than 1000 W/m²

4: the upper limit of the illuminance at which the distance measurement was able to be performed was higher than 700 W/m² and 1000 W/m² or lower 3: the upper limit of the illuminance at which the distance measurement was able to be performed was higher than 400 W/m² and 700 W/m² or lower 2: the upper limit of the illuminance at which the distance measurement was able to be performed was higher than 100 W/m² and 400 W/m² or lower 1: the upper limit of the illuminance at which the distance measurement was able to be performed was 100 W/m² or lower <Moisture Resistance>

Moisture resistance was evaluated using the optical filter formed on the glass wafer. Using the optical filter formed on the glass wafer, a moisture-resistance test was performed under a condition of 85° C. and a relative humidity of 85% for 1008 hours. After performing the moisture-resistance test, a light transmittance at a wavelength of 400 to 1100 nm was measured, a maximum value of a change in the transmittance of the optical filter before and after the moisture-resistance test was obtained, and moisture resistance was evaluated based on the following standards. The maximum value of the change in the transmittance refers to a change of a transmittance at a wavelength at which the change in the transmittance of the optical filter in a wavelength range of 400 to 1100 nm before and after the moisture-resistance test was the maximum. In addition, the change in the transmittance was σ value obtained from the following expression.

Change in Transmittance=|Transmittance of Film before Moisture-Resistance Test−Transmittance of Film after Moisture-Resistance Test|

5: the maximum value of the change in the transmittance was 1% or lower

4: the maximum value of the change in the transmittance was higher than 1% and 2% or lower 3: the maximum value of the change in the transmittance was higher than 2% and 3% or lower 2: the maximum value of the change in the transmittance was higher than 3% and 4% or lower 1: the maximum value of the change in the transmittance was higher than 4% and 5% or lower <Light Fastness>

Light fastness was evaluated using the optical filter formed on the glass wafer. Regarding the optical filter formed on the glass wafer, a light fastness test was performed using a light fastness tester (SX-75, manufactured by Suga Test Instruments Co., Ltd.) for 50 hours under conditions of a black panel temperature of 63° C., a quartz inner filter, a 275 nm cut outer filter, a illuminance of 75 mw/m² (300 to 400 nm), and a humidity of 50%. After performing the light fastness test, a light transmittance at a wavelength of 400 to 1100 nm was measured, a maximum value of a change in the transmittance of the optical filter before and after the light fastness test was obtained, and light fastness was evaluated based on the following standards. The maximum value of the change in the transmittance refers to a change of a transmittance at a wavelength at which the change in the transmittance of the optical filter in a wavelength range of 400 to 1100 nm before and after the light fastness test was the maximum. In addition, the change in the transmittance was σ value obtained from the following expression.

Change in Transmittance=|Transmittance of Film before Light Fastness Test−Transmittance of Film after Light Fastness Test|

5: the maximum value of the change in the transmittance was 1% or lower

4: the maximum value of the change in the transmittance was higher than 1% and 2% or lower 3: the maximum value of the change in the transmittance was higher than 2% and 3% or lower 2: the maximum value of the change in the transmittance was higher than 3% and 4% or lower 1: the maximum value of the change in the transmittance was higher than 4% and 5% or lower organic layer. With this optical filter, the same effects as those of Example 1 were obtained.

EXPLANATION OF REFERENCES

1: near infrared transmitting filter
2: dielectric multi-layer film
3: organic layer

TABLE 4

|  |  | Example 1 | Example 2 | Example 3 | Example 4 | Example 5 | Example 6 | Example 7 | Example 8 | Example 9 |
|---|---|---|---|---|---|---|---|---|---|---|
| Type Of Near Infrared Transmitting Filter-Forming Composition |  | 1 | 1 | 2 | 3 | 4 | 5 | 6 | 7 | 8 |
| Type Of Dielectric Multi-layer Film |  | 1 | 2 | 1 | 2 | 2 | 2 | 1 | 1 | 2 |
| Distance Recognition |  | 5 | 4 | 5 | 4 | 3 | 3 | 5 | 5 | 5 |
| Light Resistance |  | 5 | 5 | 5 | 5 | 5 | 5 | 5 | 5 | 5 |
| Moisture Resistance |  | 5 | 5 | 5 | 5 | 5 | 5 | 5 | 5 | 5 |
| Spectral Characteristic Of Optical Filter | $\lambda 1$(nm) | 795 | 795 | 800 | 795 | 795 | 795 | 795 | 800 | 795 |
|  | $\lambda 2$(nm) | 905 | 905 | 905 | 905 | 905 | 905 | 905 | 905 | 905 |
|  | Transmittance (%) of ($\lambda 1$ − 100)nm | 0.5 | 4.6 | 0.3 | 4.9 | 4.7 | 4.3 | 0.2 | 0.2 | 0.6 |
|  | Maximum Value (%) Of Transmittance For Light Having $\lambda 1$ Or More And $\lambda 2$ Or Less Wavelength | 98.8 | 98.1 | 98.1 | 98.6 | 98.4 | 98.1 | 98.2 | 98.5 | 98.4 |
|  | Maximum Value (%) Of Transmittance For Light Of ($\lambda 2$ + 50)nm Or More And 1100 nm Or Less | 21 | 12 | 21 | 12 | 12 | 12 | 21 | 21 | 12 |

TABLE 5

|  |  | Example 10 | Example 11 | Example 12 | Example 13 | Example 14 | Example 1 |
|---|---|---|---|---|---|---|---|
| Type Of Near Infrared Transmitting Filter-Forming Composition |  | 9 | 10 | 11 | 12 | 13 | 4 |
| Type Of Dielectric Multi-layer Film |  | 3 | 4 | 4 | 4 | 3 | none |
| Distance Recognition |  | 5 | 4 | 3 | 4 | 4 | 1 |
| Light Resistance |  | 5 | 5 | 5 | 5 | 5 | 1 |
| Moisture Resistance |  | 5 | 5 | 5 | 5 | 5 | 1 |
| Spectral Characteristic Of Optical Filter | $\lambda 1$(nm) | 900 | 900 | 895 | 900 | 895 | 795 |
|  | $\lambda 2$(nm) | 1005 | 1005 | 1005 | 1005 | 1005 | — |
|  | Transmittance (%) of ($\lambda 1$ − 100)nm | 0.1 | 2.5 | 4.7 | 2.5 | 0.4 | 4.7 |
|  | Maximum Value (%) Of Transmittance For Light Having $\lambda 1$ Or More And $\lambda 2$ Or Less Wavelength | 98.3 | 98.6 | 98.4 | 98.5 | 98.4 | — |
|  | Maximum Value (%) Of Transmittance For Light Of ($\lambda 2$ + 50)nm Or More And 1100 nm Or Less | 5.0 | 7.2 | 7.2 | 7.2 | 5.0 | 99.7 |

As illustrated in the table, in the optical filters according to Examples, light fastness and moisture resistance were excellent. In addition, the TOF sensor into which the optical filter was incorporated, distance recognition was able to be performed with high accuracy under a condition of a high illuminance, and the detection accuracy was excellent.

An optical filter was formed using the same method as that of Example 1, except that the near infrared transmitting filter was formed, CT-4000L (manufactured by Fujifilm Electronic Materials Co., Ltd.) was uniformly applied to the near infrared transmitting filter by spin coating to form a coating film, the formed coating film was heated using an oven at 220° C. for 1 hour, the coating film was cured to form an organic layer having a thickness of about 0.1 µm, and the dielectric multi-layer film 1 was formed on the 10, 10a, 10b: optical filter
20: color filter
100: structure

What is claimed is:

1. An optical filter comprising:
a near infrared transmitting filter; and
a dielectric multi-layer film that is provided on the near infrared transmitting filter on a side where light is incident into the near infrared transmitting filter,
wherein the near infrared transmitting filter is a single-layer film formed by a composition for a near infrared transmitting filter-forming composition, which includes a color material and a curable compound,
the color material includes two or more chromatic colorants and forms black using a combination of the two or more chromatic colorants, or the color material includes an organic black colorant, a content of the color material is 40 to 70% by mass with respect to the total solid content of the near infrared transmitting filter-forming composition, the dielectric multi-layer film and the near infrared transmitting filter are in contact with each other, or an organic layer having one surface in contact with the dielectric multi-layer film and having another surface in contact with the near infrared transmitting filter is provided between the dielectric multi-layer film and the near infrared transmitting filter, at least two wavelengths at which a transmittance in a wavelength range of 600 nm or longer and shorter than 1050 nm is 50% are present, and in a case where a wavelength on a shortest wavelength side is represented by $\lambda 1$ and a wavelength on a longest wavelength side is represented by $\lambda 2$ among the wavelengths at which the transmittance is 50%, characteristics of the following conditions 1 to 3 are satisfied, Condition 1: a light transmittance at a wavelength of $(\lambda 1-100)$ nm is 5% or lower, Condition 2: a maximum value of a light transmittance at a wavelength of $\lambda 1$ to $\lambda 2$ is 70% or higher, and Condition 3: a maximum value of a light transmittance at a wavelength of $(\lambda 2+50)$ nm to 1100 nm is 30% or lower.

2. The optical filter according to claim 1,
wherein a difference between $\lambda 2$ and $\lambda 1$ is 120 nm or lower.

3. The optical filter according to claim 1,
wherein a maximum value of a light transmittance in a wavelength range of 400 to 830 nm is 5% or lower, a light transmittance at a wavelength of 940 nm is 70% or higher, and a maximum value of a light transmittance in a wavelength range of 1050 to 1100 nm is 30% or lower.

4. The optical filter according to claim 1,
wherein a ratio Amin/Bmax of a minimum value Amin of an absorbance of the near infrared transmitting filter in a wavelength range of 400 to 830 nm to a maximum value Bmax of an absorbance of the near infrared transmitting filter in a wavelength range of 1000 to 1100 nm is 4.5 or higher.

5. The optical filter according to claim 1,
wherein a maximum value of a light transmittance in a wavelength range of 400 to 750 nm is 5% or lower, a light transmittance at a wavelength of 850 nm is 70% or higher, and a maximum value of a light transmittance in a wavelength range of 940 to 1100 nm is 30% or lower.

6. The optical filter according to claim 1,
wherein a ratio Amin/Bmax of a minimum value Amin of an absorbance of the near infrared transmitting filter in a wavelength range of 400 to 750 nm to a maximum value Bmax of an absorbance of the near infrared transmitting filter in a wavelength range of 900 to 1100 nm is 4.5 or higher.

7. The optical filter according to claim 1,
wherein the dielectric multi-layer film is a film that blocks at least a part of light having a wavelength shorter than $\lambda 1$ and at least a part of light having a wavelength longer than $\lambda 2$ in a wavelength range of 400 to 1100 nm.

8. The optical filter according to claim 1,
wherein a maximum value of a light transmittance of the dielectric multi-layer film in a wavelength range of 1050 to 1100 nm is 30% or lower.

9. The optical filter according to claim 1,
wherein the near infrared transmitting filter further includes a near infrared absorber.

10. The optical filter according to claim 9,
wherein the near infrared absorber includes at least one selected from a pyrrolopyrrole compound, a squarylium compound, or a cyanine compound.

11. An optical sensor comprising:
the optical filter according to claim 1.

12. The optical filter according to claim 1, wherein
the curable compound includes radically polymerizable compound, and
the near infrared transmitting filter-forming composition further includes a radically photoradical polymerization initiator and a resin having an acid group.

* * * * *